(12) United States Patent
Isozaki et al.

(10) Patent No.: US 9,538,255 B2
(45) Date of Patent: Jan. 3, 2017

(54) INFORMATION OUTPUT DEVICE, INFORMATION MANIPULATION DEVICE, AND COMPUTER PROGRAM PRODUCT

(71) Applicant: Kabushiki Kaisha Toshiba, Minato-ku (JP)

(72) Inventors: Hiroshi Isozaki, Kawasaki (JP); Tatsuya Uehara, Akishima (JP); Yasuhiro Fujiyoshi, Tokorozawa (JP); Noriya Sakamoto, Ome (JP); Jun Kano, Ome (JP); Takayasu Tsuchiuchi, Sagamihara (JP); Jun Kanai, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 121 days.

(21) Appl. No.: 14/196,128

(22) Filed: Mar. 4, 2014

(65) Prior Publication Data

US 2014/0298375 A1 Oct. 2, 2014

(30) Foreign Application Priority Data

Mar. 26, 2013 (JP) .................................. 2013-065228

(51) Int. Cl.
*H04N 7/16* (2011.01)
*H04N 7/173* (2011.01)
(Continued)

(52) U.S. Cl.
CPC .... *H04N 21/6371* (2013.01); *H04N 21/25816* (2013.01); *H04N 21/4367* (2013.01); *H04N 21/43615* (2013.01)

(58) Field of Classification Search
CPC H04N 21/40; H04N 21/4104; H04N 21/4108; H04N 21/4126; H04N 21/4182; H04N 21/4367; H04N 21/441
(Continued)

(56) References Cited

U.S. PATENT DOCUMENTS 7,024,690 B1\* 4/2006 Young et al. ...................... 726/5
2010/0281107 A1\* 11/2010 Fallows et al. ................ 709/203
(Continued)

FOREIGN PATENT DOCUMENTS

JP 2005-348142 A 12/2005
JP 2007-310872 11/2007
(Continued)

OTHER PUBLICATIONS

"Hybrid Broadcast Broadband TV" ETSI TS 102 796 V1.1.1 (Jun. 2010), 2010, 75 pages.
(Continued)

*Primary Examiner* — Kyu Chae
(74) *Attorney, Agent, or Firm* — Oblon, McClelland, Maier & Neustadt, L.L.P.

(57) ABSTRACT

According to an embodiment, a tuner unit, a managing unit, a private code verifying unit, an application origin verifying unit, and a device operation command processing unit. The tuner unit is configured to perform a decoding process of a broadcast program and program related information from broadcasting waves. The managing unit is configured to store a private code on a device-by-device basis. The private code verifying unit is configured to verify whether the private code obtained from an information manipulation device matches with the stored private code. The application origin verifying unit is configured to determine whether first origin information that has been received matches with second origin information of the application being executed. The device operation command processing unit is configured to allow execution of the device operation command when the first origin information and the second origin information match and when the private codes match.

20 Claims, 42 Drawing Sheets

(51) Int. Cl.
*H04N 21/6371* (2011.01)
*H04N 21/258* (2011.01)
*H04N 21/436* (2011.01)
*H04N 21/4367* (2011.01)

(58) Field of Classification Search
USPC .................................... 725/25, 30, 131, 151
See application file for complete search history.

(56) References Cited

U.S. PATENT DOCUMENTS

2013/0246905 A1    9/2013   Isozaki
2014/0214967 A1*   7/2014   Baba et al. ................... 709/205
2014/0344846 A1*  11/2014   Yamamura et al. ............ 725/25

FOREIGN PATENT DOCUMENTS

| JP | 2008-516476 A | 5/2008 |
| JP | 2012-109981 A | 6/2012 |
| JP | 2012-252451 A | 12/2012 |
| WO | WO 2013/031556 A1 | 3/2013 |

OTHER PUBLICATIONS

Office Action issued Aug. 30, 2016 in Japanese Patent Application No. 2013-065228 (with unedited computer generated English translation).

* cited by examiner

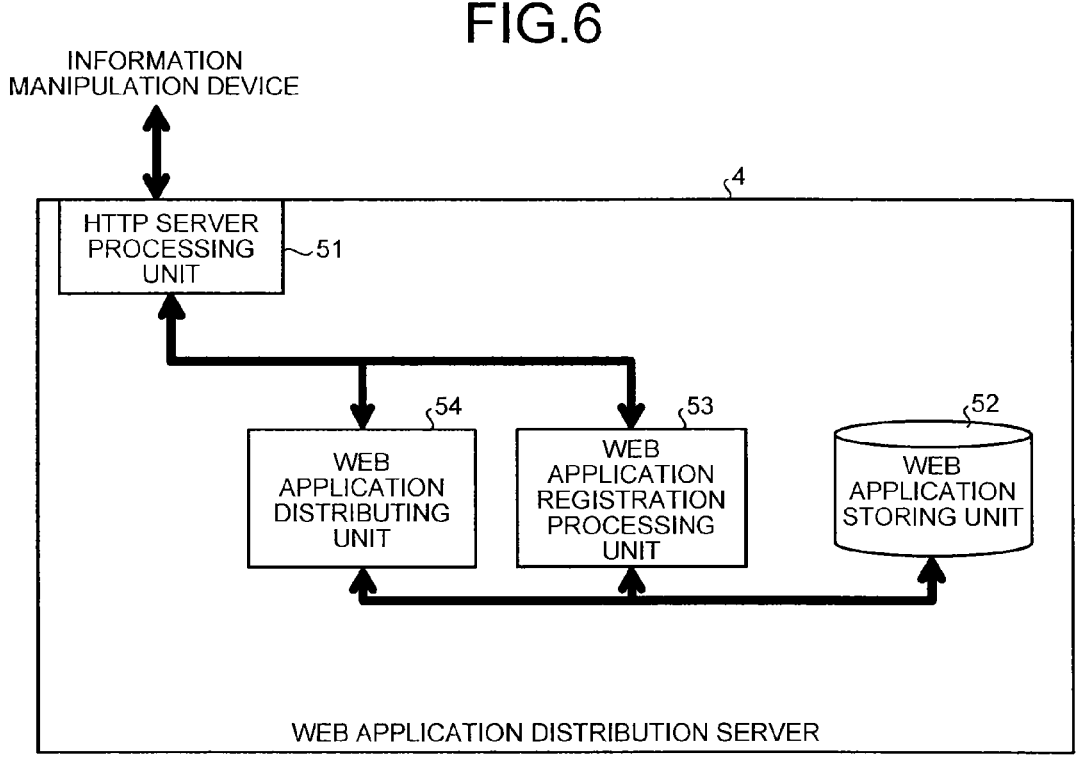
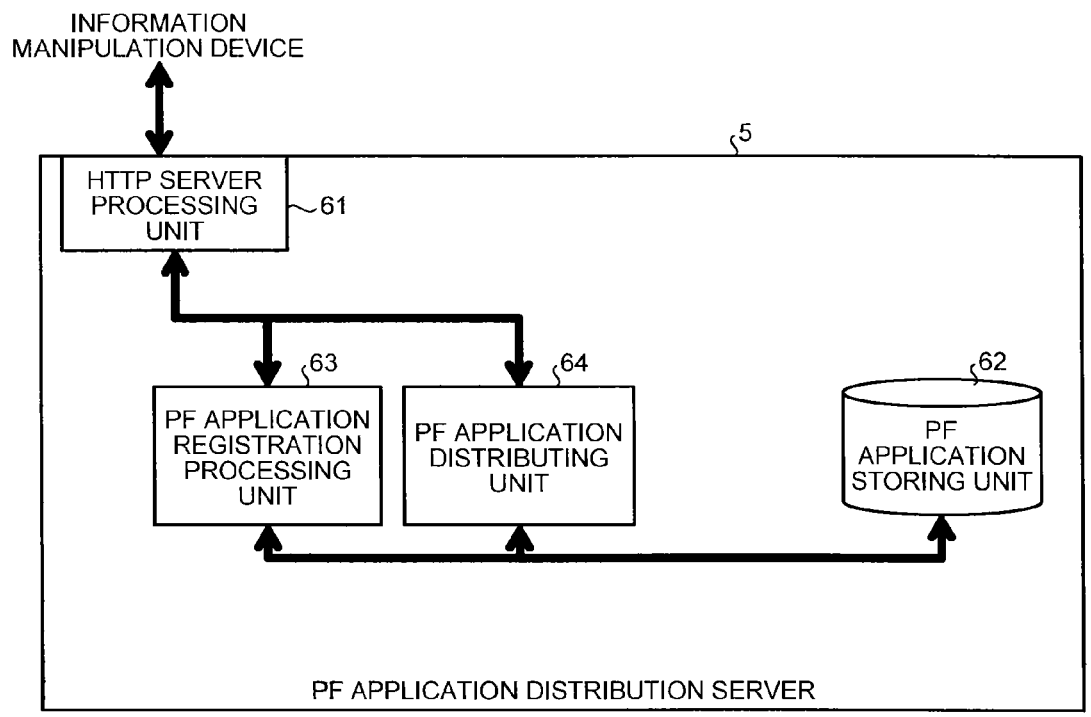

FIG.43

| WEB APPLICATION ORIGIN (DOMAIN NAME) |
| --- |
| LIST OF ALLOWED OPERATION COMMANDS (OPTIONAL) |
| VALIDITY (OPTIONAL) |
| SIGNATURE (OPTIONAL) |
| SIGNATURE FORMAT (OPTIONAL) |

INFORMATION OUTPUT DEVICE, INFORMATION MANIPULATION DEVICE, AND COMPUTER PROGRAM PRODUCT

CROSS-REFERENCE TO RELATED APPLICATION

This application is based upon and claims the benefit of priority from Japanese Patent Application No. 2013-065228, filed on Mar. 26, 2013; the entire contents of which are incorporated herein by reference.

FIELD

Embodiments described herein relate generally to an information output device, an information manipulation device, and a computer program product.

BACKGROUND

In recent years, a technology has been developed that enables an information manipulation terminal, such as a smartphone or a tablet, to connect to a TV via an interface for the purpose of operating the TV. For example, in the information manipulation terminal, a TV operation application is installed that is capable of obtaining TV program information as well as switching TV programs.

However, in the abovementioned conventional technology, no concrete technical measures are disclosed to deal with a situation in which the TV gets operated without a clear permission from the user.

BRIEF DESCRIPTION OF THE DRAWINGS

FIG. 6 is a block diagram illustrating an internal configuration of a Web application distribution server according to the first embodiment;

FIG. 7 is a block diagram illustrating an internal configuration of a PF application distribution server according to the first embodiment;

FIG. 43 is a diagram illustrating an exemplary format of a domain list according to the second embodiment.

DETAILED DESCRIPTION

According to an embodiment, an information output device includes a device operation command receiving unit, an origin information receiving unit, a tuner unit, a private code managing unit, a private code verifying unit, an application executing unit, an application origin verifying unit, and a device operation command processing unit. The device operation command receiving unit is configured to receive a device operation command via a first network interface by which the information output device is connected to an information manipulation device. The origin information receiving unit is configured to receive a first set of origin information of an application that sends the device operation command, via the first network interface. The application is executed in the information manipulation device. The tuner unit is configured to perform a decoding process of a broadcast program and program related information from broadcasting waves that are received. The private code managing unit is configured to store a private code on a device-by-device basis. The private code verifying unit is configured to obtain the private code from the information manipulation device, and verify whether the obtained private code matches with the private code stored in the private code managing unit. The application executing unit is configured to execute an application. The application origin verifying unit is configured to determine whether the first set of origin information that has been received matches with a second set of origin information of the application being executed by the application executing unit. The device operation command processing unit is configured to allow execution of the device operation command when the application origin verifying unit verifies that the sets of origin information match and when the private code verifying unit verifies that the private codes match, and execute the device operation command when the execution is allowed.

First Embodiment

Figure 1A:
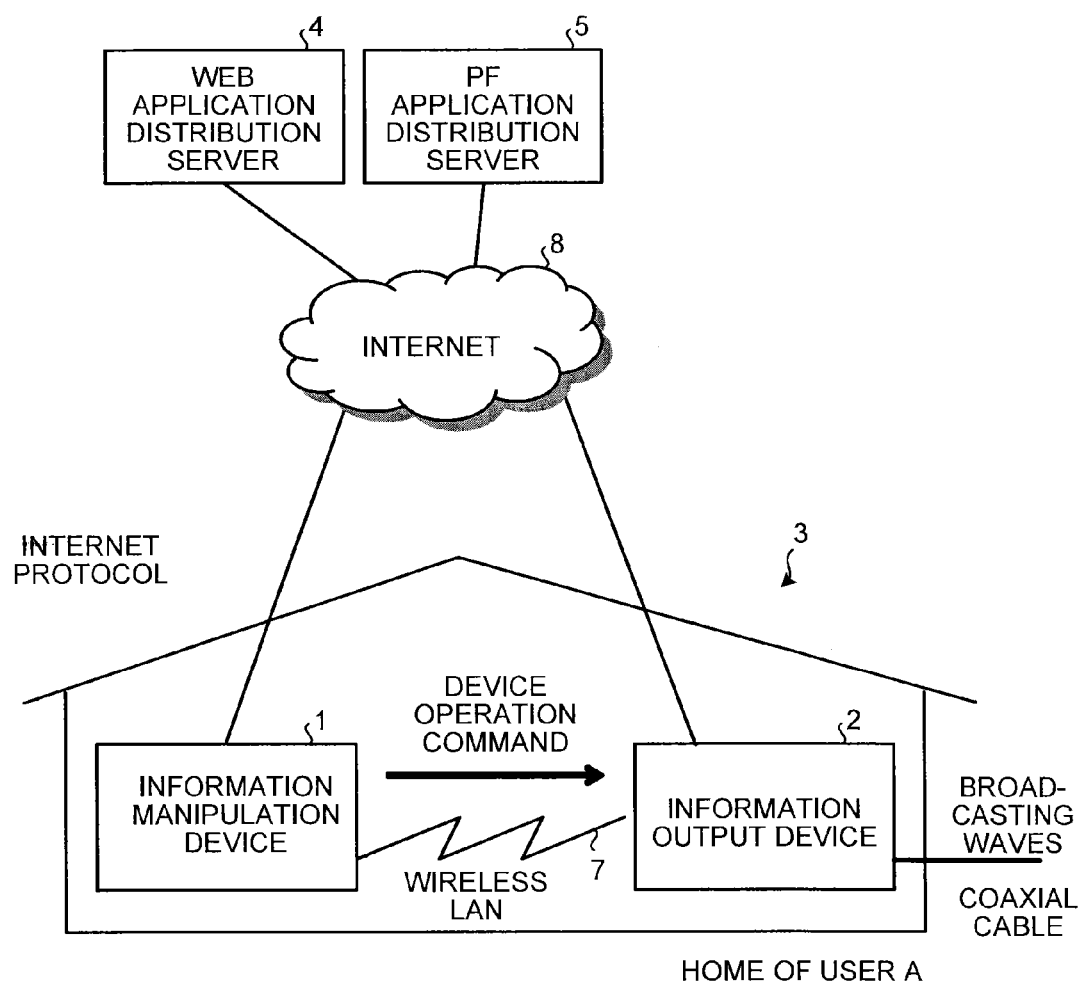
FIG. 1A is a diagram illustrating an overall configuration of an information processing system according to a first embodiment.

Exemplary embodiments of the invention are described below. FIG. 1A is a diagram illustrating an overall configuration of an information processing system 3 according to a first embodiment. In the first embodiment, an example is explained in which the information processing system 3 is used in digital broadcasting. The information processing system 3 includes an information output device 2, an information manipulation device 1, a WEB application distribution server 4, and a PF application distribution server 5. The information output device 2 outputs audio-video (AV) data and character information, which is included in the digital broadcasting waves, in the form of pictures. The information manipulation device 1 is used to operate the information output device 2. The WEB application distribution server 4 distributes web applications (hereinafter, referred to as WEB applications). The PF application distribution server 5 distributes platform-specific applications (hereinafter, referred to as PF applications).

A WEB application points to an application that is executable in the execution environment of a WEB browser, which is capable of interpreting the HTML (which stands for HyperText Markup Language) or JavaScript (registered trademark). Herein, it is possible to use the HTML version 4 or the HTML version 5. Generally, a WEB application includes a plurality of page files and media files. A media file points to a file containing still image or movie data in a format such as the JPEG format, the GIF format, or the MPEG format; or points to a file containing audio data in the MP3 format or the like. In contrast, a page file sometimes contains arrangement information of characters and images that is written in the HTML; contains display character data; and contains control program information such as JavaScript (registered trademark). Moreover, from the HTML5 or JavaScript (registered trademark), it is possible to communicate with an HTTP server or a WebSocket server using the HTTP protocol (HTTP stands for HyperText Transfer Protocol) or the WebSocket protocol.

A platform-specific application points to an application that is executed not in a WEB browser but in an operating system or in a virtual machine; and is installed in a processor or in a virtual machine. Such a platform-specific application is distributed as a package in which an application execution file (an execution binary file) and data, such as still image data or text data, used in the application are packaged in a single file.

Meanwhile, as far as the method of digital broadcasting is concerned; various methods such as the ISDB method, the DVB method, and the ATSC method can be implemented. In the first embodiment, there is no restriction about using a particular method. In the following explanation, it is assumed as an example that the ISDB method is implemented and the broadcasting contents are transmitted in the MPEG2-TS format. The information manipulation device 1 and the information output device 2 are connected by a network (wireless LAN) 7 that is either a wired network or a wireless network. The information manipulation device 1 sends device operation commands to the information output device 2 for the purpose of manipulating a variety of functionality of the information output device 2.

Herein, as an example, the information manipulation device 1 is assumed to be a handheld terminal such as a tablet or a smartphone. Moreover, as an example, the information output device 2 is assumed to be a terminal such as a digital television, a set-top box, or a digital recorder that receives broadcasting waves.

The information manipulation device 1 is connected to the WEB application distribution server 4 and the PF application distribution server 5 via Internet 8; and receives WEB applications from the WEB application distribution server 4 and receives PF applications from the PF application distribution server 5. The information output device 2 is connected to a usage permit distribution server (not illustrated) via the Internet 8.

Regarding the physical layer and the link layer to be used to send device operation commands from the information manipulation device 1 to the information output device 2, it is possible to implement various communication configurations such as infrared rays, a wireless local area network (LAN) compatible to the IEEE802.11 standard, or Ethernet (registered trademark). With reference to FIG. 1A, a wireless LAN is illustrated as an example. Meanwhile, it does not matter whether a wired interface is used or a wireless interface is used. As far as the network layer is concerned; in the case of using the Internet protocol (IP), either IPv4 or IPv6 can be used. In the case when the IP is used as the interface, a wireless access point device (not illustrated) or a router device (not illustrated) may be connected in between the information manipulation device 1 and the information output device 2. Herein, the explanation is given about an example in which the information manipulation device 1 sends device operation commands to the information output device 2 via the wireless LAN 7.

A device operation command is issued with the aim of controlling a function of the information output device 2. Thus, a device operation command can be an acquisition command that is issued to obtain program related information included in a broadcast program received from the broadcasting waves by the information output device 2. Alternatively, a device operation command can be an acquisition command that is issued to obtain program related information stored in a memory in the information output device 2. Still alternatively, a device operation command or can be an acquisition command that is issued to obtain identification information stored in a memory in the information output device 2. Such commands are categorized as broadcast related commands.

Similarly, a device operation command can also be a channel selection command or a volume adjustment command; an input switching command that is issued to switching from a broadcasting tuner input to an external input; a list display command that is issued to display a list of recorded contents; a playback command that is issued to playback specified recorded contents; a playback command that is issued to instruct playback of specified recorded contents starting from a particular position; or a deletion command that is issued to delete specified recorded contents. Such commands are categorized as independent operation commands.

The information manipulation device 1 includes, as a separate connection other than the connection established for communicating with the information output device 2, an IP interface for the purpose of communicating with the WEB application distribution server 4 and with the PF application distribution server 5. In an identical manner, the information output device 2 also includes, as a separate connection other than the connection established for communicating with the information manipulation device 1, an IP interface for the purpose of communicating with the WEB application distribution server 4. Regarding the physical layer and the link layer to be used in the IP interfaces, it is possible to implement various communication configurations such as a wireless LAN compatible to the IEEE802.11 standard or Ethernet (registered trademark). As far as the network layer is concerned; in the case of using the Internet protocol (IP), either IPv4 or IPv6 can be used. Herein, it is assumed that such communication protocols are implemented using the HTTP (which stands for Hypertext Transfer Protocol) or the HTTPS (which stands for Hypertext Transfer Protocol over Secure Socket Layer) of the Internet protocol.

The information manipulation device 1 downloads a PF application from the PF application distribution server 5; downloads a WEB application from the WEB application distribution server 4; and executes those applications. The information manipulation device 1 can download a plurality of different PF applications from a plurality of PF application distribution servers 5 and can download a plurality of WEB applications from a plurality of WEB application distribution servers 4.

The information output device 2 downloads a WEB application from the WEB application distribution server 4 and executes that WEB application. The information output device 2 can download a plurality of WEB applications from the WEB application distribution server 4. Moreover, the information output device 2 receives broadcasting waves through a coaxial cable. The broadcasting waves contain the broadcast programs, the program related information, uniform resource locators (URLs) of WEB applications, and WEB applications. In the example illustrated in FIG. 1, although the broadcasting waves are received through a coaxial cable, it is also possible to receive the broadcasting waves by means of IP broadcasting. In that case, there is no need to use a coaxial cable; and the broadcasting waves can be received using the Internet protocol from an IP broadcasting server (not illustrated) via the Internet 8 or via a management network (not illustrated) of a telecommunications operator. Meanwhile, in the case when the information output device 2 executes a WEB application included in the broadcasting waves, it is not always necessary that the WEB application is downloaded from the WEB application distribution server 4.

Figure 2:
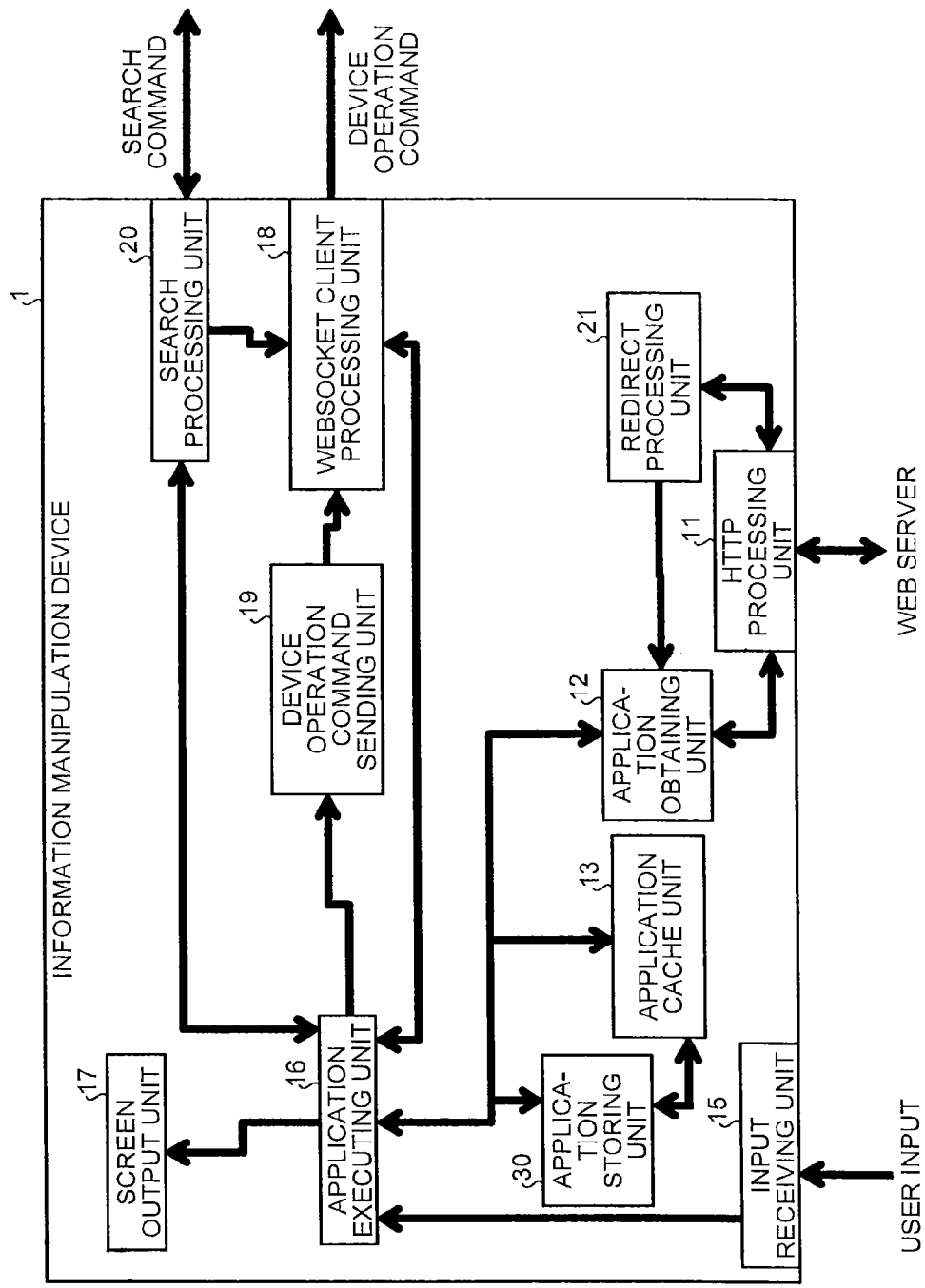
FIG. 2 is a block diagram of an information manipulation device according to the first embodiment.

FIG. 2 is a block diagram illustrating an internal configuration of the information manipulation device 1 according to the first embodiment. The information manipulation device 1 illustrated in FIG. 2 includes an HTTP processing unit 11, an application obtaining unit 12, an application cache unit 13, an input receiving unit 15, an application executing unit 16, a screen output unit 17, a WebSocket client processing unit 18, a device operation command sending unit 19, a search processing unit 20, a redirect processing unit 21, and an application storing unit 30.

The application storing unit 30 records the cache of PF applications and WEB applications, records the data used by PF applications, and records the data stored by WEB applications. As far as the medium in which the application storing unit 30 records the data is concerned; it is possible to use a general-purpose recording medium such as a built-in hard disk drive of the information manipulation device 1, a built-in flash memory of the information manipulation device 1, an external hard disk drive, or an SD card.

The HTTP processing unit 11 performs communication with a WEB server using the HTTP protocol or the HTTPS protocol; and performs operations such as HTTP client processing, TCP/IP processing, link layer processing, and physical layer processing that are required in obtaining a WEB application as described later. Moreover, the HTTP processing unit 11 performs a connection establishing operation for the purpose of obtaining a WEB application from the Web application distribution server 4. Furthermore, in response to a request (described later) received from the application obtaining unit 12, the HTTP processing unit 11 sends an acquisition request (described later) to the WEB server for obtaining a PF application and a WEB application, and receives the PF application and the WEB application specified in the acquisition request. Then, the HTTP processing unit 11 sends the PF application and the WEB application to the application obtaining unit 12.

Thus, the application obtaining unit 12 makes use of the HTTP processing unit 11 and obtains a PF application and a WEB application from the WEB server. The application cache unit 13 stores, either entirely or partially, the data of the PF application and the data of the WEB application, which are obtained by the application obtaining unit 12, as cache in the application storing unit 30. The details regarding which portion of a WEB application is to be stored as cache in the application storing unit 30 are written in advance in a configuration file by the developer of that WEB application. According to that configuration file, the application cache unit 13 stores the specified portion as cache in the application storing unit 30.

The input receiving unit 15 receives information that is input by a user using an input device such as a touchpad, a keyboard, or a mouse; and notifies the application executing unit 16 about the received information. The application executing unit 16 executes the WEB application and the PF application obtained by the application obtaining unit 12, or executes a WEB application and a PF application stored in the application storing unit 30. When an application is a WEB application, it is executed using a WEB browser. The screen output unit 17 displays a screen, which is generated by the application executing unit 16, on a monitor (not illustrated) of the information manipulation device 1. Alternatively, the screen output unit 17 outputs the screen on an external output interface, which points to an interface such as an HDMI (which stands for High-Definition Multimedia Interface), a composite interface, an S-Video interface, or a component interface. Of course, it is possible to use a wireless interface such as The WiFi Display interface or the WiDi interface.

The WebSocket client processing unit 18 performs client processing with the aim of performing communication with the information output device 2 using a protocol called the WebSocket protocol that is defined in the RFC6455 specification. The data (a device operation command) that is sent from the device operation command sending unit 19 or the application executing unit 16 is processed by the WebSocket client processing unit 18 in such a way that the data is appended with a header according to the format defined in the RFC6455 specification and is then sent to the information output device 2. The WebSocket client processing unit 18 appends, to the header of a WebSocket connection, the domain name (origin information) of a WEB application that is being executed by a WEB application executing unit 22*a* (described later) and that has issued a command for sending data to the information output device 2. Moreover, the WebSocket client processing unit 18 performs a connection establishment operation for the purpose of sending a device operation command to the information output device 2.

In response to a command from the application executing unit 16, the device operation command sending unit 19 sends a device operation command to the information output device 2 using the WebSocket client processing unit 18. When a message received by the HTTP processing unit 11 contains an HTTP redirect command, the redirect processing unit 21 obtains the URL specified in that command and instructs the application obtaining unit 12 to obtain the WEB application specified by that URL. However, it is not mandatory to dispose the redirect processing unit 21.

The search processing unit 20 searches, in response to a request from an application, whether or not other devices such as the information output device 2 are present on the network. If the information output device 2 is present, the search processing unit 20 obtains the IP address of the information output device 2 and the TCP port number of the WebSocket. More particularly, in response to a request from an application, the application executing unit 16 sends a device search request to the search processing unit 20. Then, the search processing unit 20 notifies the application executing unit 16 about the search result, and in turn the application executing unit 16 notifies the application about the search result. That is, the search processing unit 20 performs a network session establishment operation in which it sends a device search request to the information output device 2 and receives the name (such as an ID or the domain name) and the IP address of the information output device 2 from the information output device 2. However, it is not mandatory to dispose the search processing unit 20.

More particularly, the search processing unit 20 has an in-built third connection unit for performing the network session establishment operation so as to obtain identification information such as the IP address of the information output device 2. Once the third connection unit obtains the IP address of the information output device 2, the WebSocket client processing unit 18 performs a connection establishment operation for sending a device operation command and a usage permit to the information output device 2 based on the IP address of the information output device 2 received by the search processing unit 20. Herein, for the sake of simplicity in explanation, the expression "third connection unit" is used. In that regard, it is also possible to use a connectionless protocol such as the user datagram protocol (UDP) for the purpose of device search. In that case, it is not always necessary that the connection is established using a handshake.

Figure 3A:
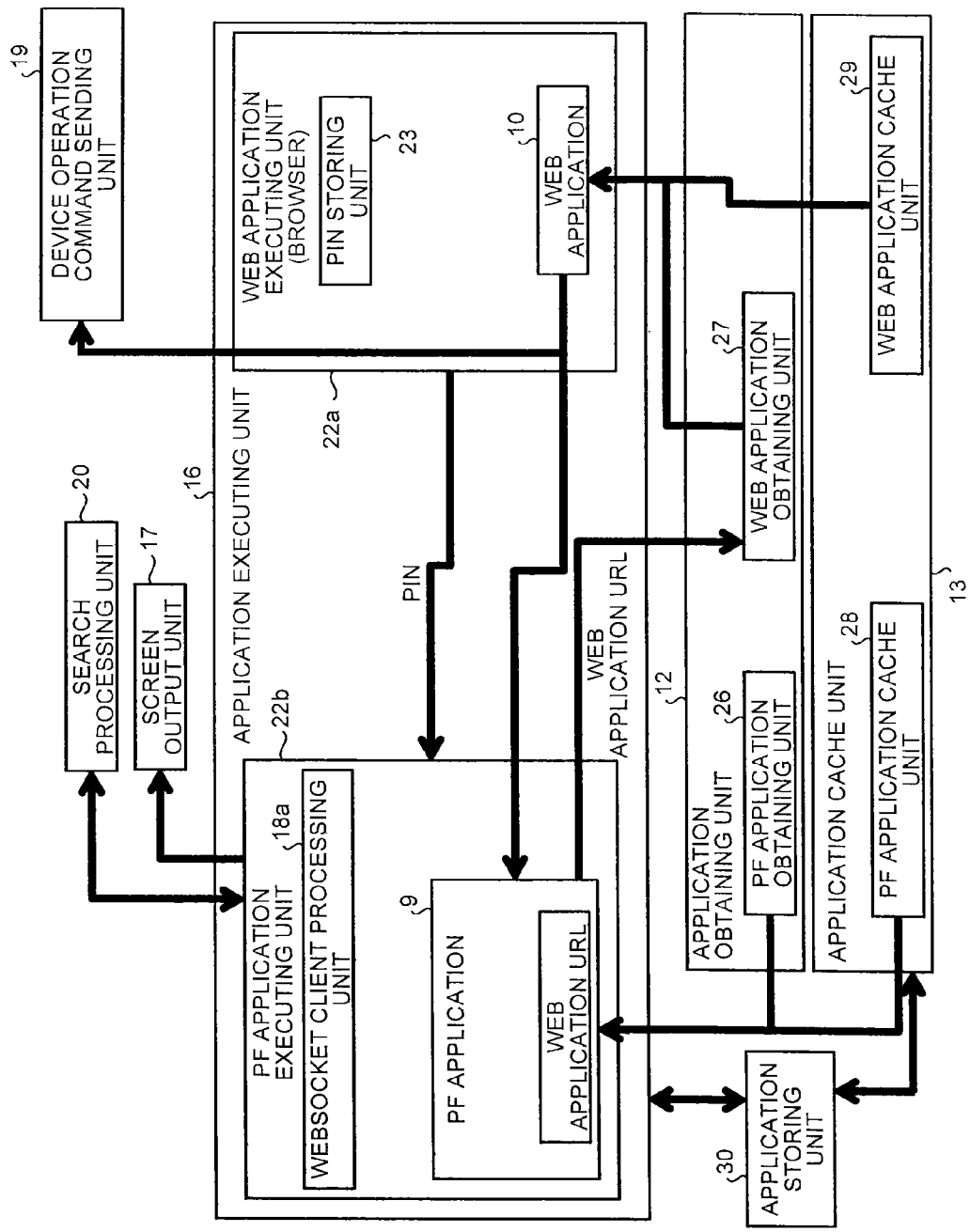
FIG. 3A is a block diagram of an application executing unit, an application obtaining unit, and an application cache unit according to the first embodiment.

FIG. 3A is a block diagram illustrating a detailed configuration of the application executing unit 16, the application obtaining unit 12, and the application cache unit 13 of the information manipulation device 1. The application executing unit 16 includes a PF application executing unit 22b that executes a PF application 9; and includes the WEB application executing unit 22a that executes a Web application 10. Apart from the function of executing the PF application 9, the PF application executing unit 22b also includes a WebSocket client processing unit 18a.

The WebSocket client processing unit 18a performs client processing with the aim of performing communication with the information output device 2 using the WebSocket protocol. Thus, the WebSocket client processing unit 18a performs an equivalent operation to the operation performed by the WebSocket client processing unit 18 illustrated in FIG. 2. Meanwhile the information manipulation device 1 can include the WebSocket client processing unit 18 as well as the WebSocket client processing unit 18a for performing client processing to perform communication using the WebSocket protocol.

A Web application obtains a PIN (authentication information) stored in a PIN storing unit 23, and sends the PIN to the PF application executing unit 22b. Herein, a PIN points to a password (a private code or a PIN code) and is used in the authentication with the information output device 2. The WebSocket client processing unit 18a of the PF application executing unit 22b sends the PIN to the information output device 2 using the WebSocket protocol.

The WEB application executing unit 22a is implemented in a general-purpose Web browser; executes Web applications as a function of the Web browser; and includes the PIN storing unit 23. Herein, the PIN storing unit 23 temporarily stores the PIN value received by the input receiving unit 15. Thus, in response to a request from the Web application 10, the PIN storing unit 23 stores therein the PIN value received by the input receiving unit 15 and manages the PIN value on a domain-by-domain basis of the Web application distribution server 4 that is the source of the Web application 10. There is a possibility that the information manipulation device 1 communicates with a plurality of Web application distribution servers 4; obtains a plurality of different Web applications 10; and executes those Web applications 10. In order to restrict the Web applications 10 that are allowed using the stored PIN; the range of domains of the Web applications 10 for which the PIN is allowed to be used is specified and is stored in the information manipulation device 1. More particularly, in the case of storing the PIN as a cookie in the information manipulation device 1; a Web application can specify the domain name thereof as a parameter such as Set-Cookie header, which is defined in the RFC2965 specification or the RFC6265 specification, of a command for storing a cookie.

When a PIN usage request is received from a Web application 10, the PIN storing unit 23 verifies whether or not the domain name of that Web application 10 is included in the range of domains specified by the Web application 10 that stored the PIN. Only when the domain name is included in the range of domains, the corresponding Web application 10 is allowed to use the PIN. For example, assume that a Web application 10 stores the PIN as a cookie in the information manipulation device 1. At that time, if the range of usage (domains) is specified to be "example.foo.bar.com", then any Web application 10 wishing to use the PIN needs to have the domain name such as "example.foo.bar.com" or "a.example.foo.bar.com" that contains "example.foo.bar.com". If the domain of a Web application 10 is "foo.foo.bar.com", then that domain is not included in the range of domains specified by the Web application 10 that stored the PUN. Hence, if the Web application 10 having "foo.foo.bar.com" as the domain issues a PIN usage request, the PIN storing unit 23 imposes a restriction to not return the PIN.

Thus, if the domain name of the Web application 10 that wishes to request for the PIN is outside the range of domains specified by the Web application 10 that stored the PIN, and if the former Web application 10 issues a PIN usage request for the PIN stored in the PIN storing unit 23; then the PIN storing unit 23 either does not return anything or returns an error.

The application obtaining unit 12 further includes a PF application obtaining unit 26 (a first application obtaining unit), which obtains the PF application 9 by communicating with the PF application distribution server 5 via the HTTP processing unit 11; and includes a Web application obtaining unit 27, which obtains the Web application 10 by communicating with the Web application distribution server 4 via the HTTP processing unit 11.

The application cache unit 13 further includes a PF application cache unit 28 that stores the PF application 9, which is obtained by the PF application obtaining unit 26, in the application storing unit 30; and includes a Web application cache unit 29 that stores the Web application 10, which is obtained by the Web application obtaining unit 27, in the application storing unit 30. As far as the technology for storing a Web application 10 as cache in the application storing unit 30 is concerned, it is possible to use the AppCache function of the HTML5 specifications standardized by W3C.

Explained below are the details of the WEB application executing unit 22a. Since the WEB application executing unit 22a is a WEB browser, it can store Web applications in the application storing unit 30 of the information manipulation device 1 according to the web storage specifications that are being standardized by W3C. Alternatively, the WEB application executing unit 22a can store Web applications in the application storing unit 30 of the information manipulation device 1 according to HTTP Cookie defined in the RFC6265 specification.

Figure 3B:
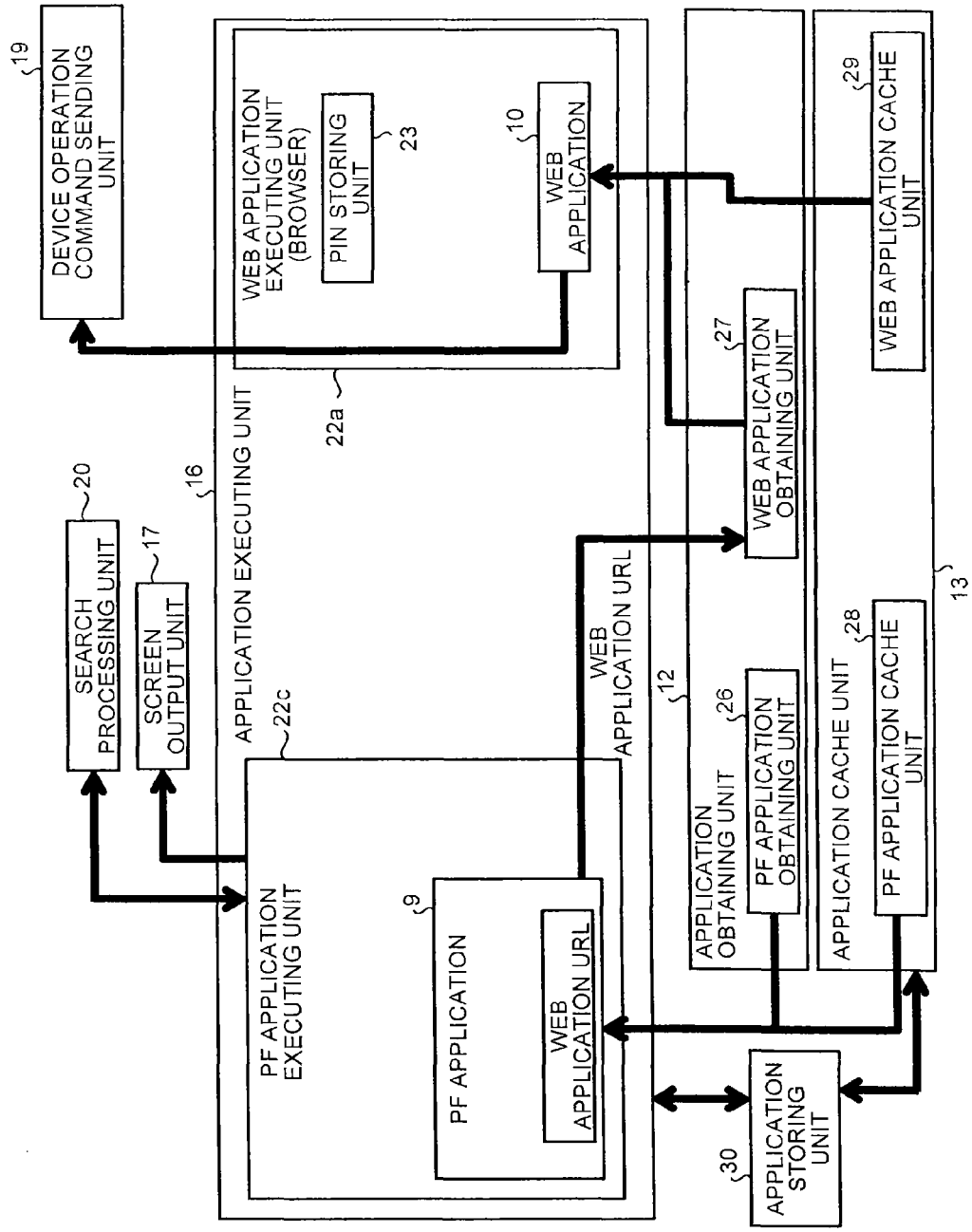
FIG. 3B is an another block diagram of the application executing unit, the application obtaining unit, and the application cache unit according to the first embodiment.

FIG. 3B is a block diagram illustrating another example of the internal configuration of the application executing unit 16, the application obtaining unit 12, and the application cache unit 13 of the information manipulation device 1. As compared to the configuration illustrated in FIG. 3A, the configuration illustrated in FIG. 3B differs in the way that a PF application executing unit 22c does not include the WebSocket client processing unit 18a. With reference to FIG. 3A, it is assumed that the WebSocket client processing unit 18a sends the PIN to the information output device 2 using the WebSocket protocol. In contrast, in the configuration illustrated in FIG. 3B; in response to an instruction from a Web application, the WebSocket client processing unit 18 sends the PIN to the information output device 2 using the WebSocket protocol.

Figure 3C:
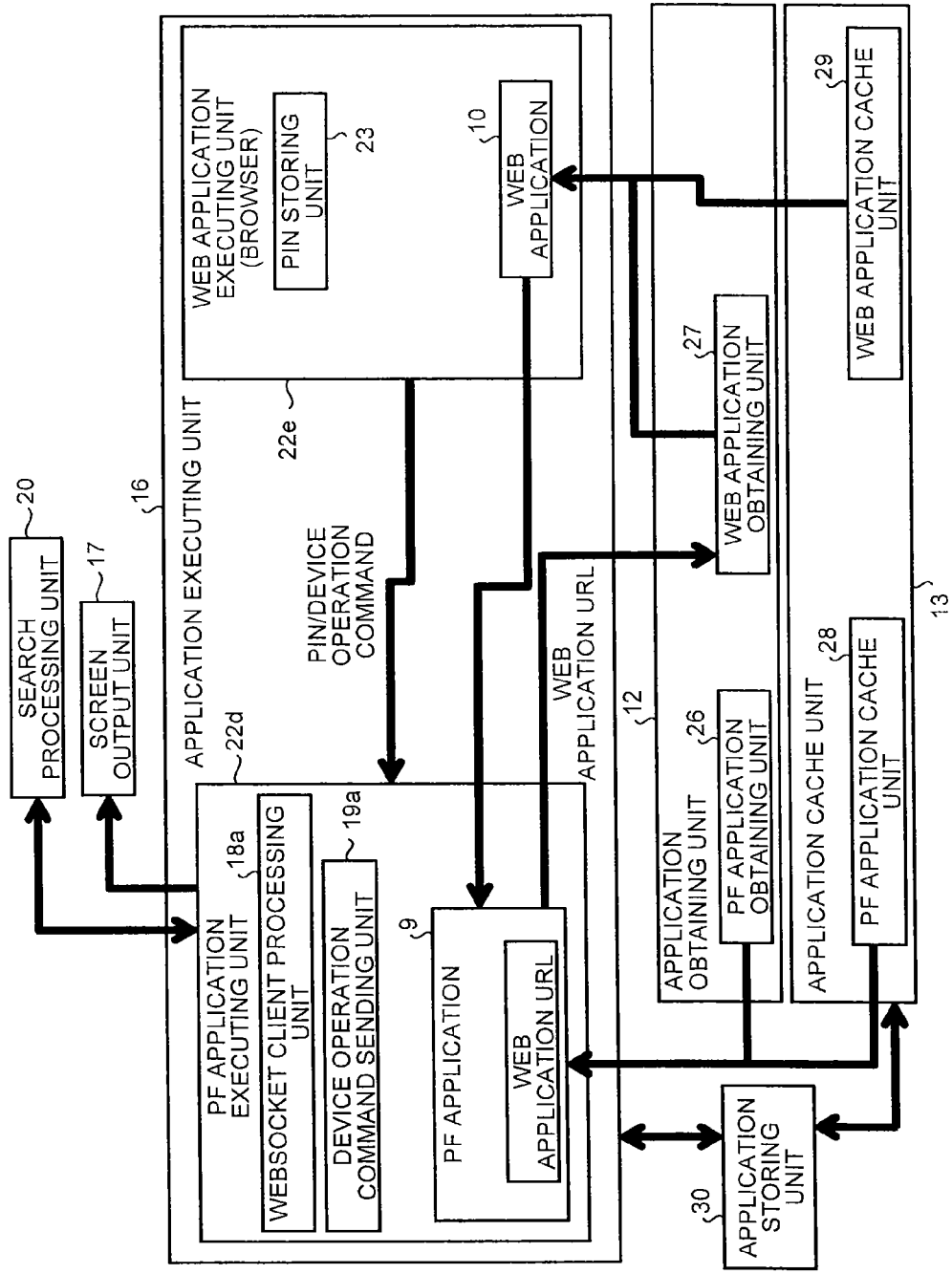
FIG. 3C is an another block diagram of the application executing unit, the application obtaining unit, and the application cache unit according to the first embodiment.

FIG. 3C is a block diagram illustrating still another example of the internal configuration of the application executing unit 16, the application obtaining unit 12, and the application cache unit 13 of the information manipulation device 1. As compared to the configuration illustrated in FIG. 3A, the configuration illustrated in FIG. 3C differs in the way that a PF application executing unit 22d includes a device operation command sending unit 19a. Herein, in response to a command from a PF application, the device operation command sending unit 19a sends a device operation command to the information output device 2 using the WebSocket client processing unit 18a. Thus, the device operation command sending unit 19a performs an equivalent operation to the operation performed by the device operation command sending unit 19 illustrated in FIG. 2. In this case, the information manipulation device 1 can be configured to include the WebSocket client processing unit 18 as well as the WebSocket client processing unit 18a for performing client processing to perform communication using the WebSocket protocol. Moreover, the information manipulation device 1 can also be configured to not include the device operation command sending unit 19 so that all device operation commands are issued from the device operation command sending unit 19a. Meanwhile, the device operation commands issued from the Web application 10, which is executed in a WEB application executing unit 22e, are also sent to the PF application executing unit 22d.

Figure 4:
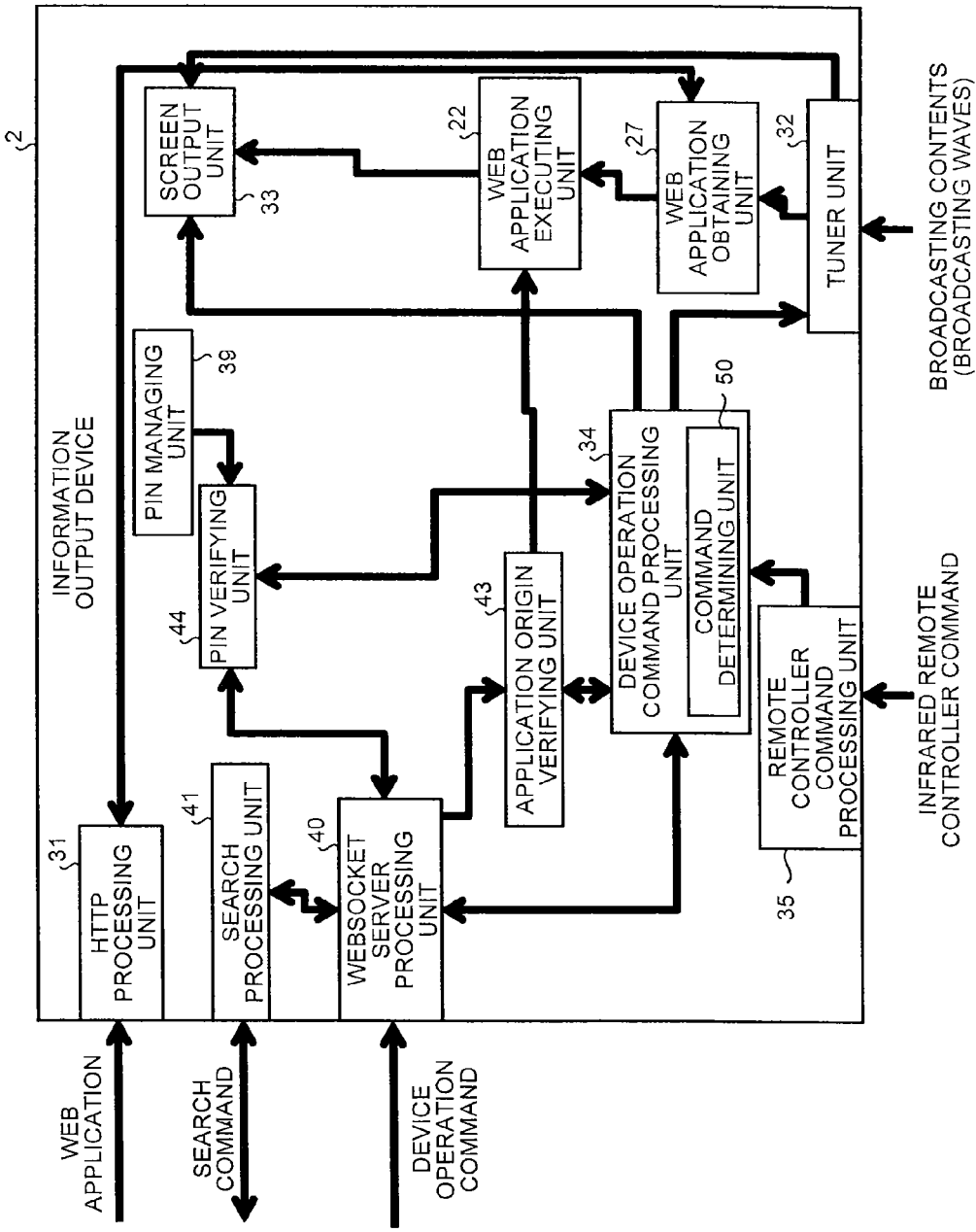
FIG. 4 is a block diagram illustrating an internal configuration of an information output device according to the first embodiment.

FIG. 4 is a block diagram illustrating an internal configuration of the information output device 2 according to the first embodiment. The information output device 2 illustrated in FIG. 4 includes an HTTP processing unit 31, a tuner unit 32, a screen output unit 33, a device operation command processing unit 34, a remote controller command processing unit 35, a PIN managing unit 39, a PIN verifying unit 44, a WebSocket server processing unit 40, a search processing unit 41, an application origin verifying unit 43, the Web application obtaining unit 27, and a WEB application executing unit 22.

The HTTP processing unit 31 (a second network interface) communicates with a Web server using the HTTP protocol; and performs operations such as HTTP client processing, TCP/IP processing, link layer processing/physical layer processing that are required in obtaining a WEB application as described later. The tuner unit 32 extracts, from the broadcasting waves received from an antenna, a particular broadcast program and program related information, a Web application to be executed by the WEB application executing unit 22, and the URL indicating the location of the Web application to be executed by the WEB application executing unit 22. Then, the tuner unit 32 performs decoding of the broadcast programs and the program related information.

The screen output unit 33 outputs moving image data and audio data, which is output from the tuner unit 32, to an internal liquid crystal display (LCD) monitor (not illustrated) or an external output interface (not illustrated). Herein, the external output interface points to an interface such as an HDMI (which stands for High-Definition Multimedia Interface), a composite interface, an S-Video interface, or a component interface.

The device operation command processing unit 34 processes a device operation command, which is received from the information manipulation device 1 or an from infrared remote controller, based on verification results of the application origin verifying unit 43 and the PIN verifying unit 44; controls the tuner unit 32; obtains the program related information from the tuner unit 32; and sends instructions for switching the pictures to be displayed on the screen output unit 33.

The remote controller command processing unit 35 processes a command received from an infrared remote controller (not illustrated) and notifies the device operation command processing unit 34 about the command. However, it is not mandatory to dispose the remote controller command processing unit 35.

The PIN managing unit 39 (a private code managing unit) manages a password (a private code; more particularly, a PIN code; hereinafter abbreviated as PIN) corresponding to each information output device. As far as the PIN generating method is concerned, any one of the following methods can be implemented: a method in which the PIN value is written at the time of factory shipment; a method in which the information output device 2 generates a random number using a random number generator (not illustrated) and sets that random number as the PIN value; a method in which the information output device 2 receives a PIN generation command via an infrared remote controller command based on an instruction from the user, generates a random number using a random number generator (not illustrated), and sets that random number as the PIN value; a method in which the information output device 2 receives character string data or numeric string data via an infrared remote controller command based on an instruction from the user, and sets the received data as the PIN value; a method in which the PIN value is generated based on the MAC address of the HTTP processing unit 31; and a method in which the abovementioned methods are combined.

The PIN verifying unit 44 (a private code verifying unit) verifies whether or not the PIN that has been sent from the information manipulation device 1 via a WebSocket connection is identical to the value registered in the PIN managing unit 39, and notifies the device operation command processing unit 34 about the verification result.

The WebSocket server processing unit 40 (corresponding to a WebSocket processing unit, a first network interface, a device operation command receiving unit, and an origin information receiving unit) performs server processing with the aim of performing communication with the information manipulation device 1 according to a protocol called WebSocket that is defined in the RFC6455 specification. The WebSocket server processing unit 40 receives data such as a device operation command or a PIN that is sent from the information manipulation device 1; and distributes the data to the PIN verifying unit 44, the application origin verifying unit 43, and the device operation command processing unit 34.

The search processing unit 41 returns the name and the IP address of the information output device 2 as well as the TCP port number of the WebSocket server processing unit 40 in response to a device search request (described later) received from the information manipulation device 1. As far as the protocol for device searching is concerned, it is possible to implement a name retrieval method according to the DLNA standard (DLNA stands for Digital Living Network Alliance), the UPnP standard (UPnP stands for Universal Plug and Play), or the NetBIOS (which stands for Network Basic Input Output System). In this way, in response to a device search request received from the information manipulation device 1, the search processing unit 41 performs a network session establishment operation for returning the name and the IP address of the information output device 2. However, it is not mandatory to dispose the search processing unit 41.

The application origin verifying unit 43 verifies whether or not header information specified in a device operation command, which is sent from the information manipulation device 1 and received by the WebSocket server processing unit 40, is correct; and notifies the device operation command processing unit 34 about the verification result. For that reason, the application origin verifying unit 43 inquires the WEB application executing unit 22 about the origin of the Web application being executed by the WEB application executing unit 22, that is, inquires the WEB application executing unit 22 about the domain name of the Web server from which the Web application was downloaded; and obtains the origin information (the domain name).

The Web application obtaining unit 27 communicates with the Web application distribution server 4 based on the URL that is included in the broadcasting waves received by the tuner unit 32, and obtains a Web application using the HTTP processing unit 31. The WEB application executing unit 22 is implemented using a general-purpose Web browser, and executes the Web applications obtained by the Web application obtaining unit 27 or the Web applications obtained from the tuner unit 32. Moreover, the WEB application executing unit 22 manages the origin information of the Web application that is being currently executed. That is, the WEB application executing unit 22 manages the domain name of the Web application distribution server 4 from which the Web application being currently executed was obtained. If the WEB application executing unit 22 switches to another Web application that is to be executed, then the WEB application executing unit 22 manages the domain name of the Web application distribution server 4 from which the Web application to be executed was obtained.

Figure 5:
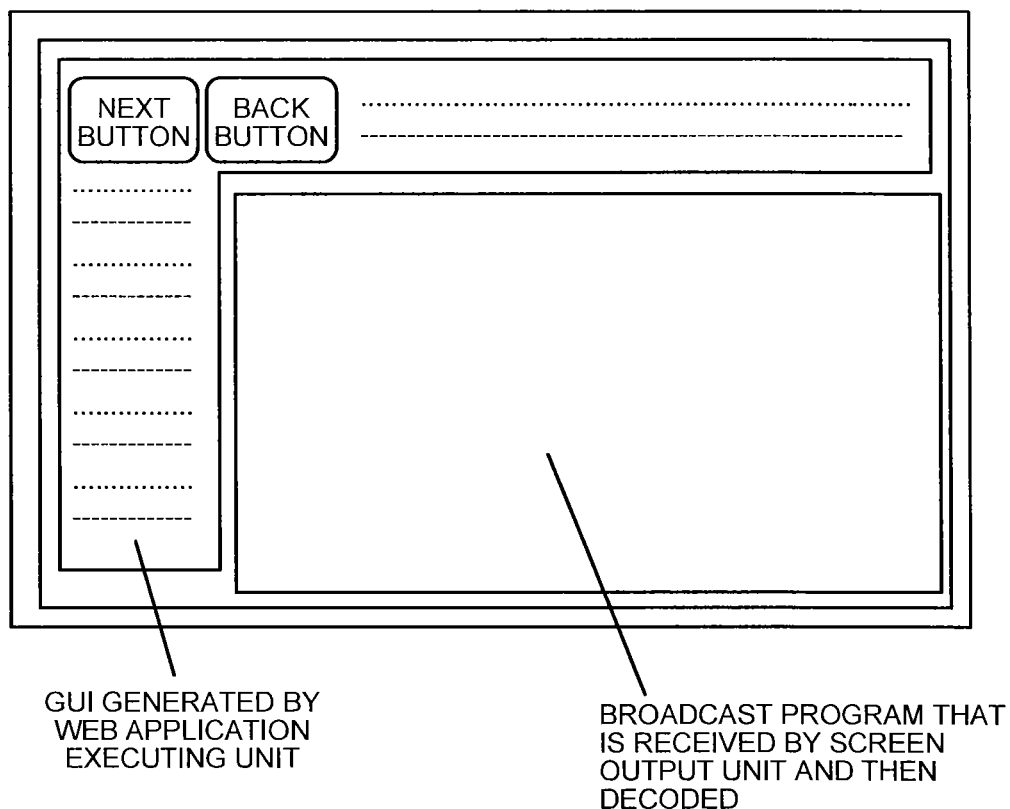
FIG. 5 is a diagram illustrating a screen that is displayed by the information output device according to the first embodiment.

FIG. 5 is a diagram illustrating a screen that is displayed by the information output device 2 using the screen output unit 33. In a typical digital broadcast receiver that receives broadcasting waves (i.e., in, what is called, a digital television); broadcast programs are displayed as moving images over the entire screen. Herein, it is assumed that a screen generated by the WEB application executing unit 22 and a moving-image-type broadcast program decoded by the tuner unit 32 are output at the same time on the screen output unit 33. In FIG. 5, a graphic user interface (GUI) portion is separated from a moving image portion, and is displayed in an L-shaped manner. However, alternatively, it is also possible to superimpose (overlay) the GUI portion on the moving image portion. Moreover, the WEB application executing unit 22 need not always generate a GUI screen as illustrated in FIG. 5. Alternatively, the WEB application executing unit 22 can be run in the background for sending data to the information manipulation device 1, and the GUI may not be displayed at all.

FIG. 6 is a block diagram illustrating an internal configuration of the Web application distribution server 4. Herein, the Web application distribution server 4 performs communication with the information manipulation device 1 and the information output device 2 using the HTTP protocol or the HTTPS protocol, and distributes a Web application in response to a request received from the information manipulation device 1 or the information output device 2. The Web application distribution server 4 includes an HTTP server processing unit 51, a Web application storing unit 52, a Web application registration processing unit 53, and a Web application distributing unit 54.

The HTTP server processing unit 51 performs communication with the information manipulation device 1 and the information output device 2 using the HTTP protocol or the HTTPS protocol; and performs operations such as HTTP server processing, TCP/IP processing, link layer processing/ physical layer processing that are required in obtaining WEB application acquisition requests and performing Web application distribution processing. The Web application storing unit 52 is used to store Web applications. Each Web application is stored after being assigned a unique ID (Web application ID) thereto.

The Web application registration processing unit 53 stores Web applications in the Web application storing unit 52. With reference to FIG. 6, the explanation is given about a configuration in which the Web applications are stored via the HTTP server processing unit 51 and via a network. However, it is not always necessary to store the Web applications via a network. Alternatively, the Web applications can be stored via an external memory such as a USB memory. Meanwhile, it is not mandatory to dispose the Web application registration processing unit 53. The Web application distributing unit 54 receives, from the information manipulation device 1 or the information output device 2 via a network, specification of an application-specific ID and an instruction for sending the corresponding Web application. In response to that instruction, the Web application distributing unit 54 searches the Web applications stored in the Web application storing unit 52 for the Web application corresponding to the specified ID; and sends various resources belonging to that Web application to the information manipulation device 1 or the information output device 2 via the HTTP server processing unit 51. Herein, the application-specific ID can be a URL. Moreover, the Web application distribution server 4 may distribute a plurality of Web applications. In that case, either the Web applications may be stored in the same domain of the Web application distribution server 4, or each Web application may be stored in a different domain. Storing a plurality of Web applications in the same domain indicates the following: for example, a Web application X and a Web application Y are stored in a domain represented by domain1.example-Webserver.com. As a concrete example, it indicates the case in which the URL for obtaining the Web application X is set to be http://domain1.example-Webserver.com/appIDX/, and the URL for obtaining the Web application Y is set to be http://domain1.example-Webserver.com/appIDY/.

FIG. 7 is a block diagram illustrating an internal configuration of the PF application distribution server 5 according to the first embodiment. The PF application distribution server 5 performs communication with the information manipulation device 1 using the HTTP protocol or the HTTPS protocol, and distributes a PF application in response to a request from the information manipulation device 1. The PF application distribution server 5 illustrated in FIG. 7 includes an HTTP server processing unit 61, a PF application storing unit 62, a PF application registration processing unit 63, and a PF application distributing unit 64. The HTTP server processing unit 61 performs identical operations to the operations performed by the HTTP server processing unit 51 of the Web application distribution server 4.

The PF application storing unit 62 is used to store the PF applications. Each PF application is stored after being assigned a unique ID thereto. Meanwhile, as described above, usually a Web application is configured with a plurality of resources (files) such as still image data and text data. In contrast, a PF file is distributed by compressing those resources in a single file. Thus, corresponding to a single unique ID, a single PF application file is provided. The PF application registration processing unit 63 stores (registers) the PF applications in the PF application storing unit 62. In FIG. 7 is illustrated a configuration in which the PF applications are registered via the HTTP server processing unit 61 and via a network. However, it is not always necessary to register the PF applications via a network.

Alternatively, the Web applications can be stored via an external memory such as a USB memory. Meanwhile, it is not mandatory to dispose the PF application registration processing unit 63.

The PF application distributing unit 64 receives, from the information manipulation device 1 via a network, specification of an application-specific ID and an instruction for sending the corresponding PF application. In response to that instruction, the PF application distributing unit 64 searches the PF applications stored in the PF application storing unit 62 for the PF application corresponding to the specified ID; and sends the file representing that PF application to the information manipulation device 1 via the HTTP server processing unit 61.

Figure 8:
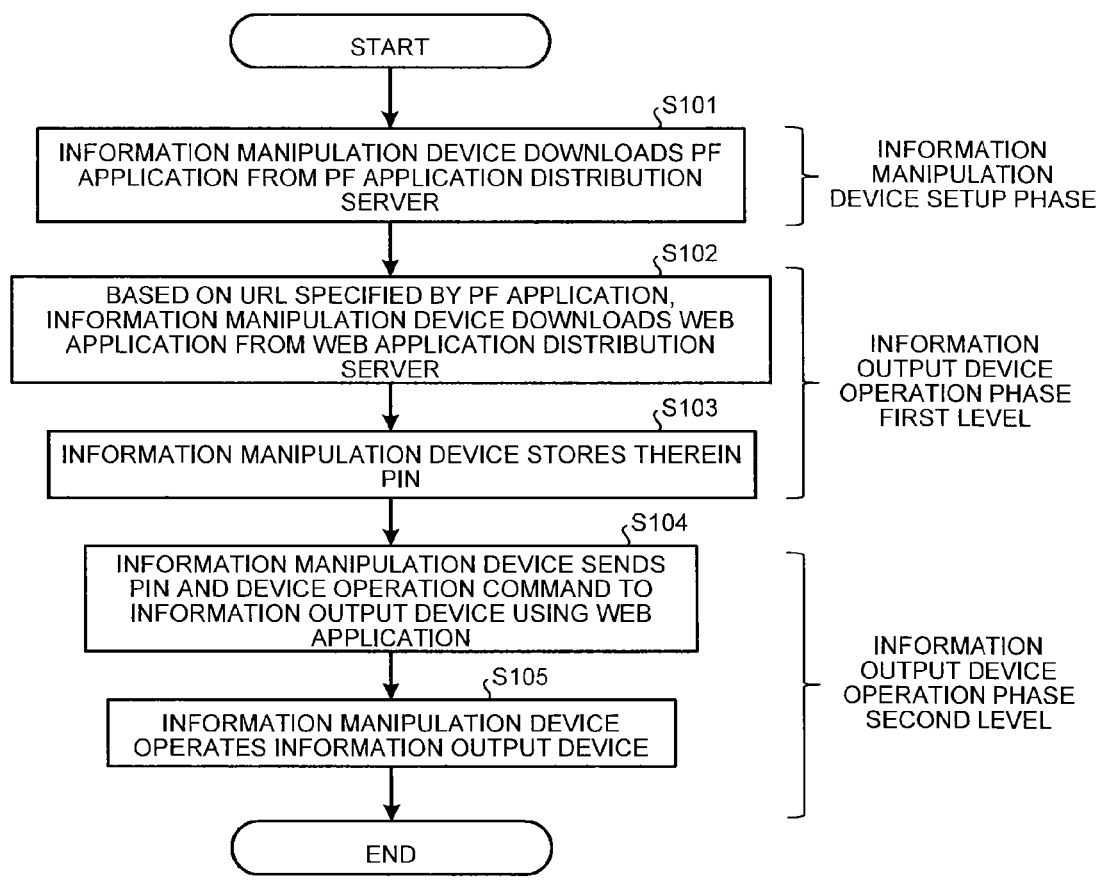
FIG. 8 is a flowchart of operations performed by the information manipulation device, the information output device, the PF application distribution server, and the Web application distribution server according to the first embodiment.

FIG. 8 is a flowchart for explaining a sequence of operations performed by the information manipulation device 1, the information output device 2, the PF application distribution server 5, and the Web application distribution server 4. As illustrated in FIG. 8, the sequence of operations is broadly divided into two phases, namely, an information manipulation device setup phase and an information output device operation phase. Firstly, the explanation is given about the entire sequence of operations; while the detailed sequence of operations in each phase is described later.

During the information manipulation device setup phase, the information manipulation device 1 communicates with the PF application distribution server 5; downloads a PF application from the PF application distribution server 5; and installs therein the PF application (Step S101). The information output device operation phase is divided into two levels, namely, a first level and a second level. In the first level, based on the URL specified in the PF application, the information manipulation device 1 communicates with the Web application distribution server 4 and downloads a Web application from the Web application distribution server 4 (Step S102); and stores therein the PIN that is input to the input receiving unit 15 (Step S103). The operation of downloading and executing the Web application performed by the information manipulation device 1 is triggered by the PF application installed during the information manipulation device setup phase.

In the second level, the information manipulation device 1 communicates with the information output device 2 using a Web application and sends the PIN and a device operation command (Step S104); and operates the information output device 2 (Step S105).

Figure 9:
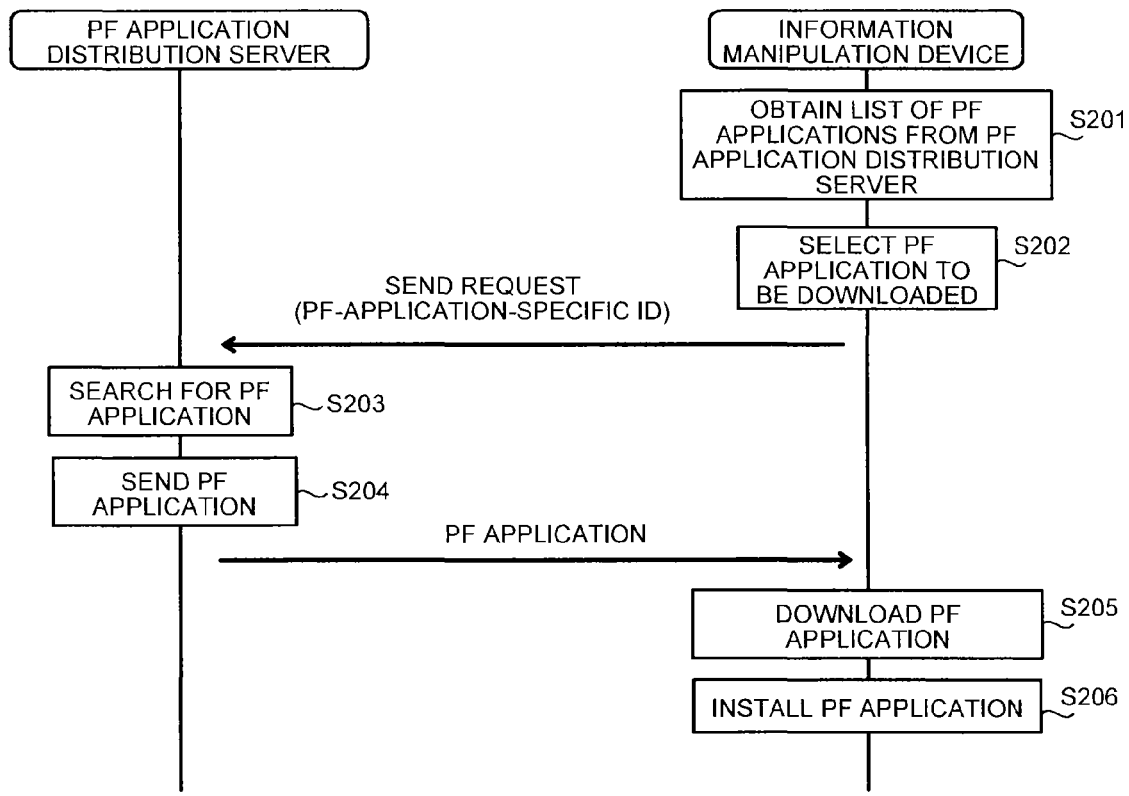
FIG. 9 is a sequence diagram of operations during an information manipulation device setup phase according to the first embodiment.
Figure 10:
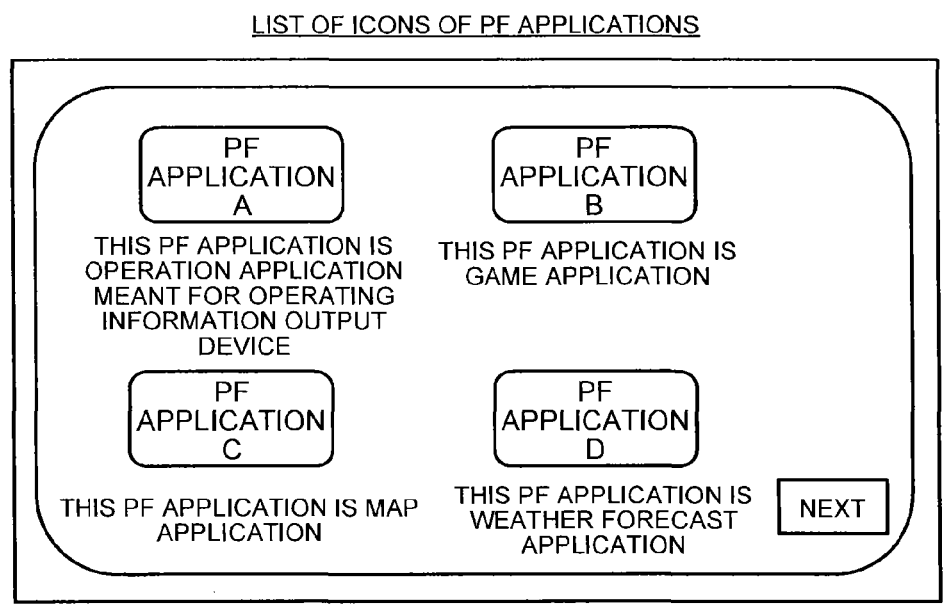
FIG. 10 is a diagram illustrating a display example of a list of PF applications according to the first embodiment.

FIG. 9 is a sequence diagram illustrating a sequence of operations performed by the information manipulation device 1 and the PF application distribution server 5 during the information manipulation device setup phase. In the case when a PF application for operating the information output device 2 is preinstalled in the information manipulation device 1, there is no need to follow the sequence of operations illustrated in FIG. 9. Herein, firstly, the information manipulation device 1 obtains a list of PF applications from the PF application distribution server 5 (Step S201). In FIG. 10 is illustrated a display example of the list of PF applications that is output at that time on the screen of the screen output unit 17 of the information manipulation device 1. The screen for the list of PF applications can be generated as, for example, Web contents by the WEB application executing unit 22a of the information manipulation device 1. In that case, based on the URL set in advance at the time of the device shipment, the Web contents for displaying the list can be obtained from the PF application distribution server 5.

In the example illustrated in FIG. 10, the PF applications in the list are displayed as icons along with simple explanation written below the icons. The user of the information manipulation device 1 selects a PF application from the input receiving unit 15 using a mouse or a touchpad (Step S202). In the example illustrated in FIG. 10, a PF application A is meant for operating the information output device 2, and thus it is assumed that the PF application A is selected. Then, the information manipulation device 1 sends a PF application send request (URL), which contains an application-specific ID associated to the PF application A, to the PF application distribution server 5 (Step S203). Herein, the information manipulation device 1 sends a PF application send request to the PF application distribution server 5 using the HTTP protocol (or the HTTPS protocol).

Then, the PF application distribution server 5 searches the PF applications stored in the PF application storing unit 62 for the PF application having the application-specific ID specified by the information manipulation device 1, and obtains that PF application (Step S204). Subsequently, the PF application distributing unit 64 sends the obtained PF application to the information manipulation device 1 as the response to the PF application send request (Step S205). Thus, the information manipulation device 1 receives and downloads the PF application A from the PF application distribution server 5 using the PF application obtaining unit 26 (Step S206); and installs therein the PF application A (Step S207). The installed PF application A is stored in the application storing unit 30.

Figure 11A:
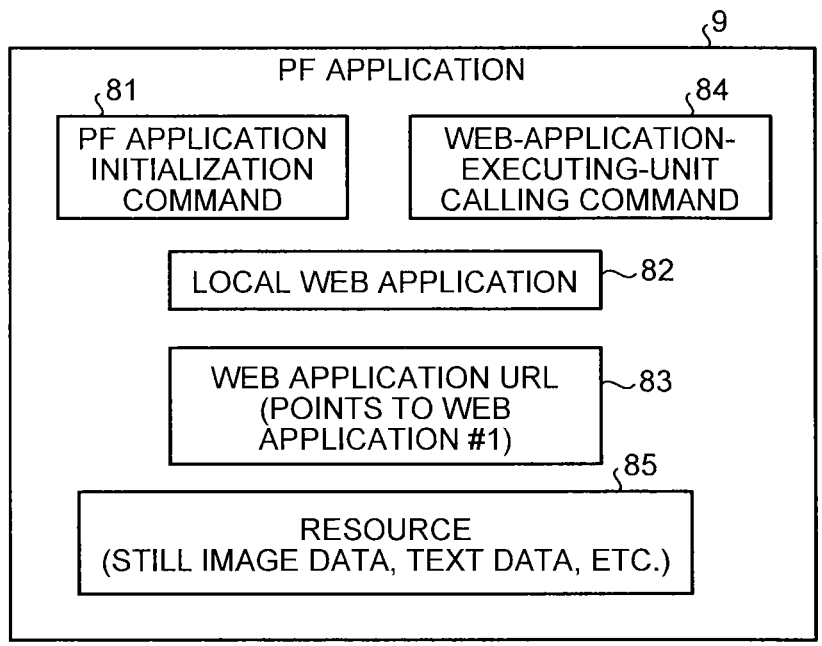
FIG. 11A is a block diagram illustrating a functional configuration of a PF application according to the first embodiment.

FIG. 11A is a block diagram illustrating a functional configuration of the PF application. Herein, the PF application includes a PF application initialization command 81, a local Web application 82, a Web application URL 83, a Web-application-executing-unit calling command 84, and a resource 85. The PF application initialization command 81 points to a computer program that performs general-purpose operations, such as an initialization operation, at the start when the PF application is executed in the PF application executing unit 22b; and that calls the Web-application-executing-unit calling command 84.

The local Web application 82 verifies whether or not the PIN is stored in the PIN storing unit 23. The local Web application 82 is written in the HTML4/HTML5 or JavaScript (registered trademark), and is executed by the WEB application executing unit 22a (browser) of the information manipulation device 1. Moreover, the local Web application 82 can either be included in a package of the corresponding PF application or be placed in the Web application distribution server 4 in an obtainable manner via a network using the application obtaining unit 12. In the case of obtaining the local Web application 82 via a network, the local Web application 82 is not included in the PF application. The Web application URL 83 is the URL indicating the location of the corresponding Web application. In the case when a Web application is distributed by being included in the package of the corresponding PF application, the Web application URL 83 indicates the location at which the local Web application is stored in the information manipulation device 1. On the other hand, if a Web application is stored in the Web application distribution server 4, the Web application URL 83 indicates the location at which the local Web application is placed in the Web application distribution server 4. When a Web application is included in the package of the corresponding PF application, the Web application URL 83 indicates the location (file path) at which the local Web application is stored. In the following explanation;

firstly a case is explained in which a WEB application is distributed by being included in the package of the corresponding PF application.

The Web-application-executing-unit calling command 84 is a computer program written in order to run the WEB application executing unit 22a, with the Web application URL 83 serving as the argument. Thus, the Web application indicated by the Web application URL 83 gets executed by the WEB application executing unit 22a. The resource 85 points to the icon (still image data), the explanatory text, or the version number of the corresponding PF application at the time of displaying a list of PF applications installed in the information manipulation device 1.

Figure 12A:
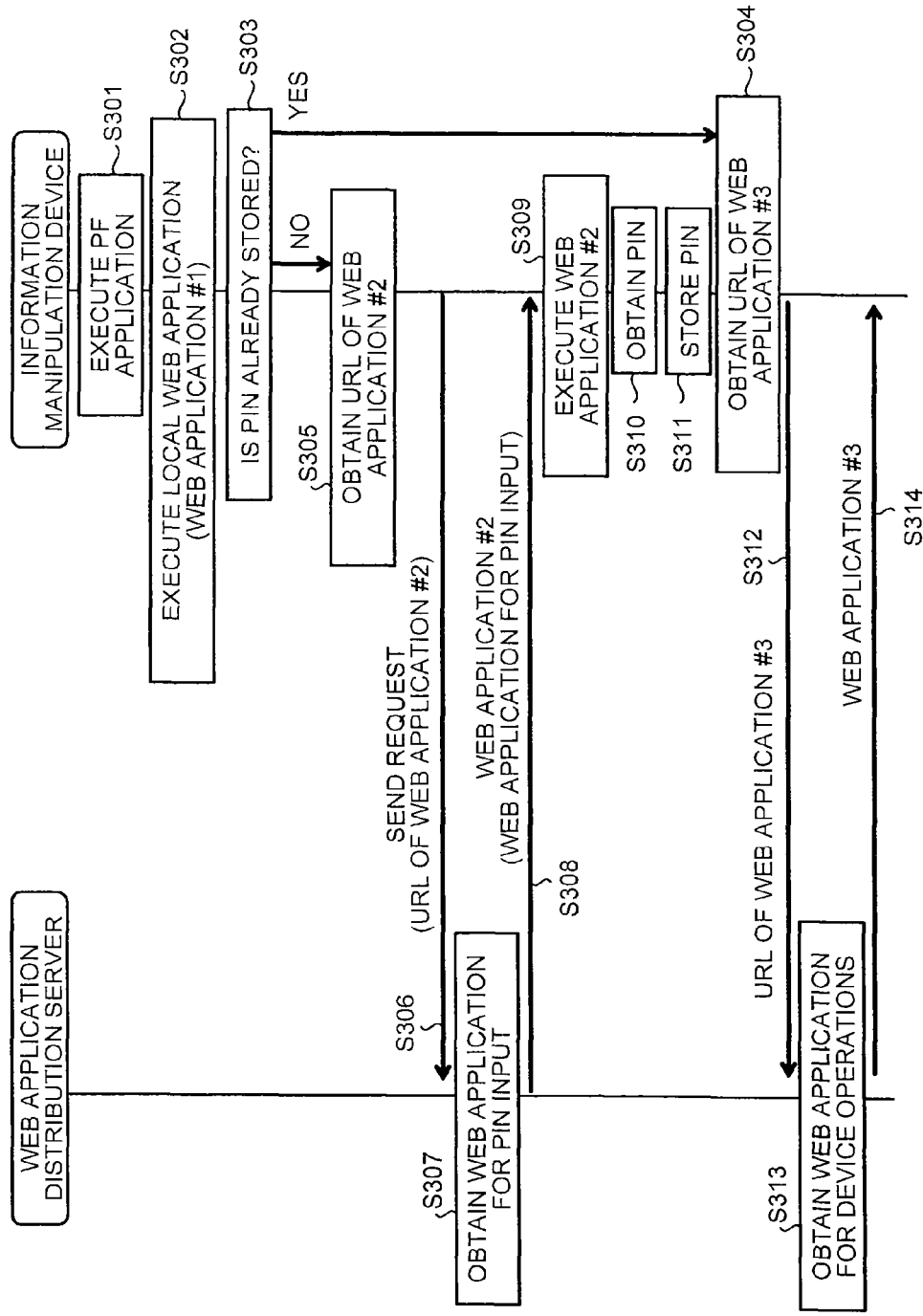
FIG. 12A is a sequence diagram illustrating a sequence of operations during an information output device operation phase (first level) according to the first embodiment.

FIG. 12A is a sequence diagram illustrating a sequence of operations performed among the information manipulation device 1 and the Web application distribution server 4 during the information output device operation phase (first level) according to the first embodiment. As illustrated in FIG. 12, firstly, the information manipulation device 1 executes a PF application using the PF application executing unit 22b (Step S301). Herein, the execution of a PF application is triggered when that PF application is selected using the input receiving unit 15. Once the PF application performs an initialization operation using the PF application initialization command 81, it executes the Web-application-executing-unit calling command 84. In turn, the Web-application-executing-unit calling command 84 executes the local Web application (a Web application #1), which is specified by the Web application URL 83 and which is included in the PF application, using the WEB application executing unit 22a (Step S302).

The subsequent operations are performed by the WEB application executing unit 22a. As described above, the Web application #1 verifies whether or not the PIN is stored in the PIN storing unit 23 (Step S303). If the Web application #1 determines that the PIN is not stored in the PIN storing unit 23 (No at Step S303), then the WEB application executing unit 22a refers to the local Web application #1 for the URL of a Web application #2 that obtains the PIN input; obtains the Web application indicated by that URL (i.e., obtains the Web application #2) from the Web application distribution server 4; and executes that Web application (Step S306 to Step S309). More particularly, the information manipulation device 1 sends a Web application send request to the Web application distribution server 4 using the HTTP processing unit 31 and using the HTTP protocol (or the HTTPS protocol); obtains the Web application #2 from the Web application distribution server 4; and executes the Web application #2. Then, the Web application #2 obtains the PIN that is input using the input receiving unit 15 (Step S310) and stores the PIN value in the PIN storing unit 23 (Step S311).

In this example, since the storage destination of the Web application #2 is set to be the Web application distribution server 4, the information manipulation device 1 obtains the Web application #2 from the Web application distribution server 4 and executes the Web application #2 using the WEB application executing unit 22a.

Meanwhile, if it is determined that the PIN is already stored in the PIN storing unit 23 (Yes at Step S303), then the WEB application executing unit 22a refers to the local Web application #1 for the URL of a Web application #3 and executes the Web application indicated by that URL (i.e., executes the Web application #3). Meanwhile, prior to the operation of determining whether or not the PIN of the Web application #1 is stored; the search processing unit 20 of the information manipulation device 1 can be used to search the information output device 2, which is to be operated from now, and to obtain the unique ID of that information output device 2.

Figure 13:
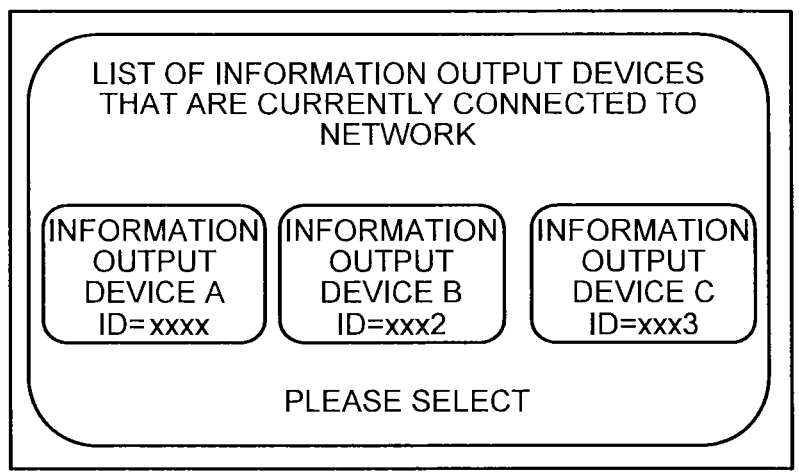
FIG. 13 is a diagram illustrating an example in which information output devices are displayed as icons in a list on the screen according to the first embodiment.

FIG. 13 is a diagram illustrating an example in which the obtained information output devices 2 are displayed as icons in a list on the screen of the screen output unit 17 of the information manipulation device 1. The user of the information manipulation device 1 selects one of the information output devices 2 from the input receiving unit 15 using a mouse or a touchpad. Herein, it is assumed that an information output device A is selected.

Given below is the explanation regarding the Web application #2. Herein, the Web application #2 provides a user interface for allowing the input of a PIN from the input receiving unit 15 of the information manipulation device 1, obtains the PIN from the input receiving unit 15, and stores the PIN in the PIN storing unit 23 (i.e., the Web application #2 is a PIN input obtaining Web application). In order to obtain the Web application #2, the information manipulation device 1 sends a URL, such as http://example-Webserver.com/input_PIN.php?appID=x, to the Web application distribution server 4.

In this example, a Web application acquisition request, in which a unique Web application ID "X" is specified, is sent to the Web application distribution server 4 represented by "example-WEBserver.com". An example of another URL can be http://example-Webserver.com/appIDx/. In this example, it is assumed that the Web applications are stored by directories in the Web application distribution server. Meanwhile, in these examples, the user interface for allowing the input of the PIN is different for each Web application. However, alternatively, the Web application distribution server 4 can provide the same user interface for allowing PIN input in a plurality of Web applications.

Figure 14:
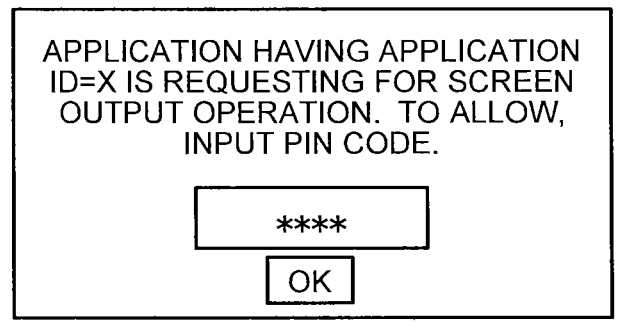
FIG. 14 is a diagram illustrating an example of a screen that prompts the input of a PIN in the information output device according the first embodiment.

As illustrated in FIG. 14, on the screen of the screen output unit 17 of the information manipulation device 1, the Web application #2 displays a message prompting the input of the PIN of the information output device 2. When the PIN of the information output device 2 is input from the input receiving unit 15, the Web application #2 generates a request message for the Web application for device operations (i.e., the Web application #3), and sends the request message to the Web application distribution server 4. Herein, the information manipulation device 1 uses the HTTP processing unit 31 and the HTTP protocol (or the HTTPS protocol) to send the request message for the Web application for device operations. At that time, it is necessary that the PIN obtained at Step S310 is made available to the Web application #3.

As far as the method of storing the PIN is concerned, it is possible to implement either of the following two methods: a method of storing the PIN as a file in a cookie of the browser; and a method of storing the PIN as a hash fragment. In the case of storing the PIN as a cookie, the Web application #2 sets the URL range in such a way that the PIN value stored by the Web application #2 is obtainable by the Web application #3. While the Web application #3 obtains the PIN value from the cookie, it is determined whether or not the PIN value is obtainable by the Web application #3. Since the setting is done to enable the Web application #3 to obtain the PIN value, the determination result indicates a success. In the case of storing the PIN as a hash fragment, the Web application #2 can configure a computer program in the following manner to allow the screen input of the PIN.
<form method="POST" action="http://example-Webserver.com/Webapp3.php?getWebapp.php#"> <input type="text" name="PIN"> <input type="submit" value="send">

When the PIN is input, the Web application #2 instructs the Web application distribution server 4 to send a message about obtaining the Web application #3. Because of being a hash fragment, the PIN is not sent to the Web application distribution server 4. However, when the Web application #3 obtains its own URL, the PIN value included in the hash fragment can be obtained. Meanwhile, in order to simplify the configuration of the PIN input obtaining Web application, the PIN value may be sent to the Web application distribution server 4.

Figure 11B:
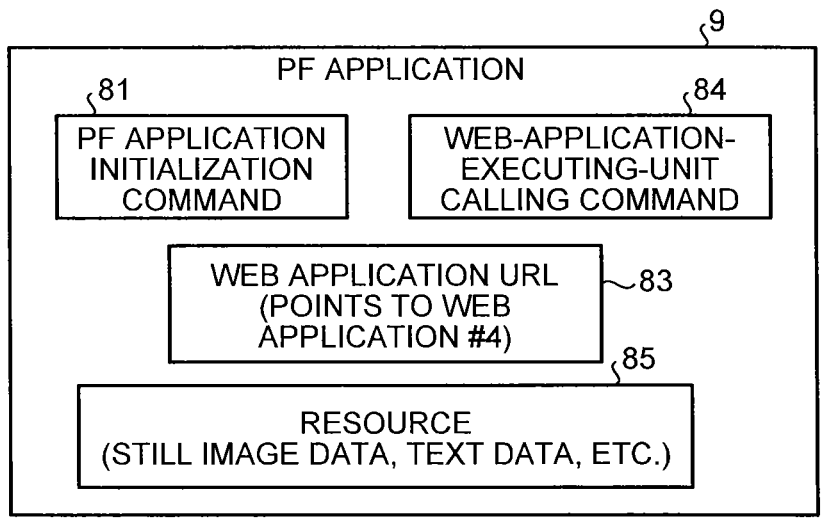
FIG. 11B is a block diagram illustrating a functional configuration of another example of the PF application according to the first embodiment.

The abovementioned explanation is given for the configuration in which a PF application distributed by the PF application distribution server 5 includes local Web applications. Alternatively, it is also possible to have a configuration a PF application distributed by the PF application distribution server 5 does not include local Web applications. FIG. 11B is a block diagram illustrating a configuration of the PF application that does not include the local Web application. Herein, as compared to the configuration illustrated in FIG. 11A, the configuration illustrated in FIG. 11B differs in the way that the Web application #1 is not present and that the value of the Web application URL 83 indicates not a local URL but the URL of a Web application #4.

Figure 12B:
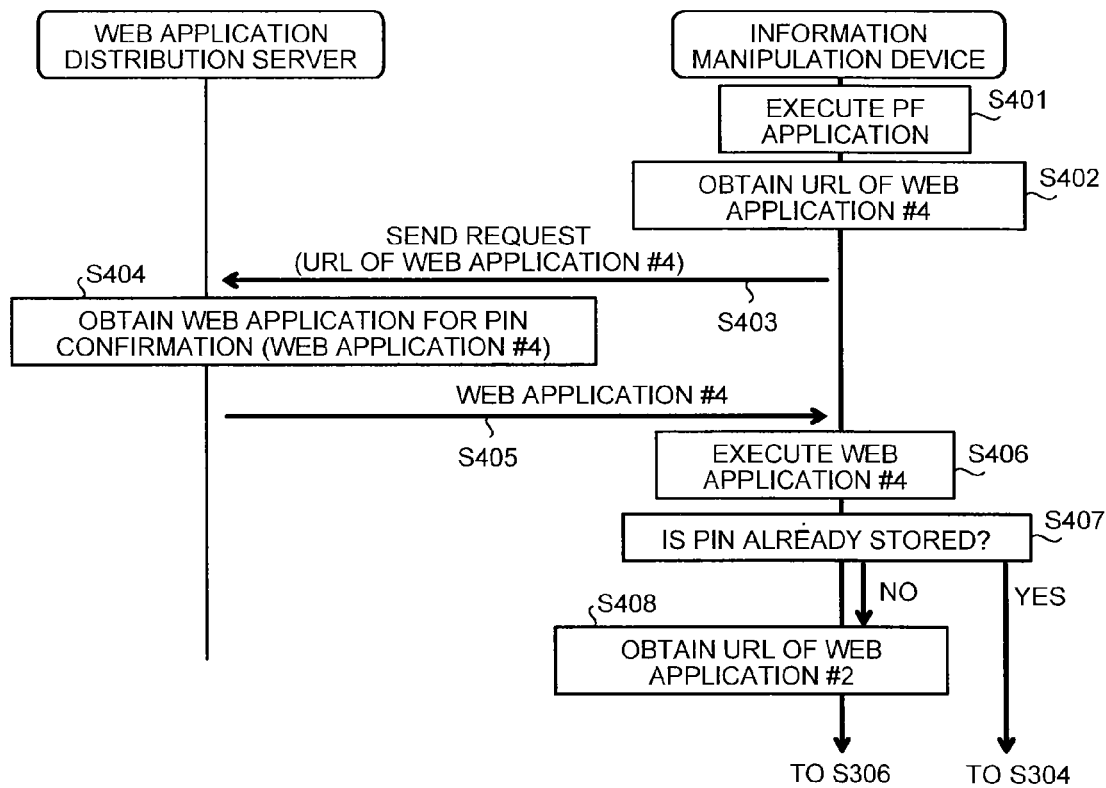
FIG. 12B is a sequence diagram illustrating another example of a sequence of operations during the information output device operation phase (first level) according to the first embodiment.

FIG. 12B is a sequence diagram illustrating a sequence of operations performed by the information manipulation device 1 and the Web application distribution server 4 during the information output device operation phase in the case when the PF application does not include local Web applications. Firstly, the operations are started when a PF application is selected and executed (Step S401). Once the PF application performs an initialization operation using the PF application initialization command 81, it executes the Web-application-executing-unit calling command 84. Then, the Web-application-executing-unit calling command 84 attempts to execute the Web application (the Web application #4), which is specified by the Web application URL 83, using the WEB application executing unit 22a (Step S402). In this case, the URL of the Web application #4 indicates a Web server. Thus, the Web application obtaining unit 27 of the information manipulation device 1 requests the Web application distribution server 4 via a network to obtain the Web application #4 based on the URL information (Step S403).

More particularly, the Web application obtaining unit 27 of the information manipulation device 1 sends a Web application (Web application #4) acquisition request to the Web application distribution server 4 using the HTTP processing unit 11 and using the HTTP protocol (or the HTTPS protocol). This request can be issued using the normal HTTP GET request. In response, the Web application distribution server 4 returns the Web application #4 (Step S404 and Step S405). Then, the information manipulation device 1 executes the Web application #4 using the WEB application executing unit 22a (Step S406). The subsequent operations are performed by the WEB application executing unit 22a. Although the locations of the Web application #1 and the Web application #4 are different, the processing details can be the same. That is, it is verified whether or not the PIN is stored in the PIN storing unit 23 of the information manipulation device 1 (Step S407). If it is determined that the PIN is not stored in the PIN storing unit (No at Step S407), then the URL of the Web application #2 written in the local Web application #4 is referred to and the Web application indicated by that URL (i.e., the Web application #2) is obtained from the Web server and executed (Step S408). On the other hand, if it is determined that the PIN is stored (Yes at Step S407), then the system control proceeds to Step S304.

In this way, if Web applications are not included in a PF application, it becomes possible to reduce the overall file size of the PF application. Not only that, since the Web application #4 is edited in the Web application distribution server 4; it becomes possible, even after the installation of the PF application, to change the behavior of the Web application (the Web application #4) that is executed after the execution of the PF application. In the case of downloading a Web application and including it in the PF application, it is necessary that the Web application developer finishes the implementation of the Web application no later than the information manipulation device setup phase. On the other hand, in the case when the Web application is not included but only the URL of the Web application is included in the PF application, then the processing details of the Web application or the screen design need not be complete until the Web application is downloaded during the information output device operation phase (first level). Moreover, the timing of executing the information output device operation phase (first level) is different for each user. Hence, the contents, such as character logos and announcements, to be displayed in the Web application #4 in a particular period of time can be set differently than the contents to be displayed in the Web application #4 in another period of time. Furthermore, there is also an advantage that the contents to be displayed in the Web application #4 can be changed for each user.

Figure 15A:
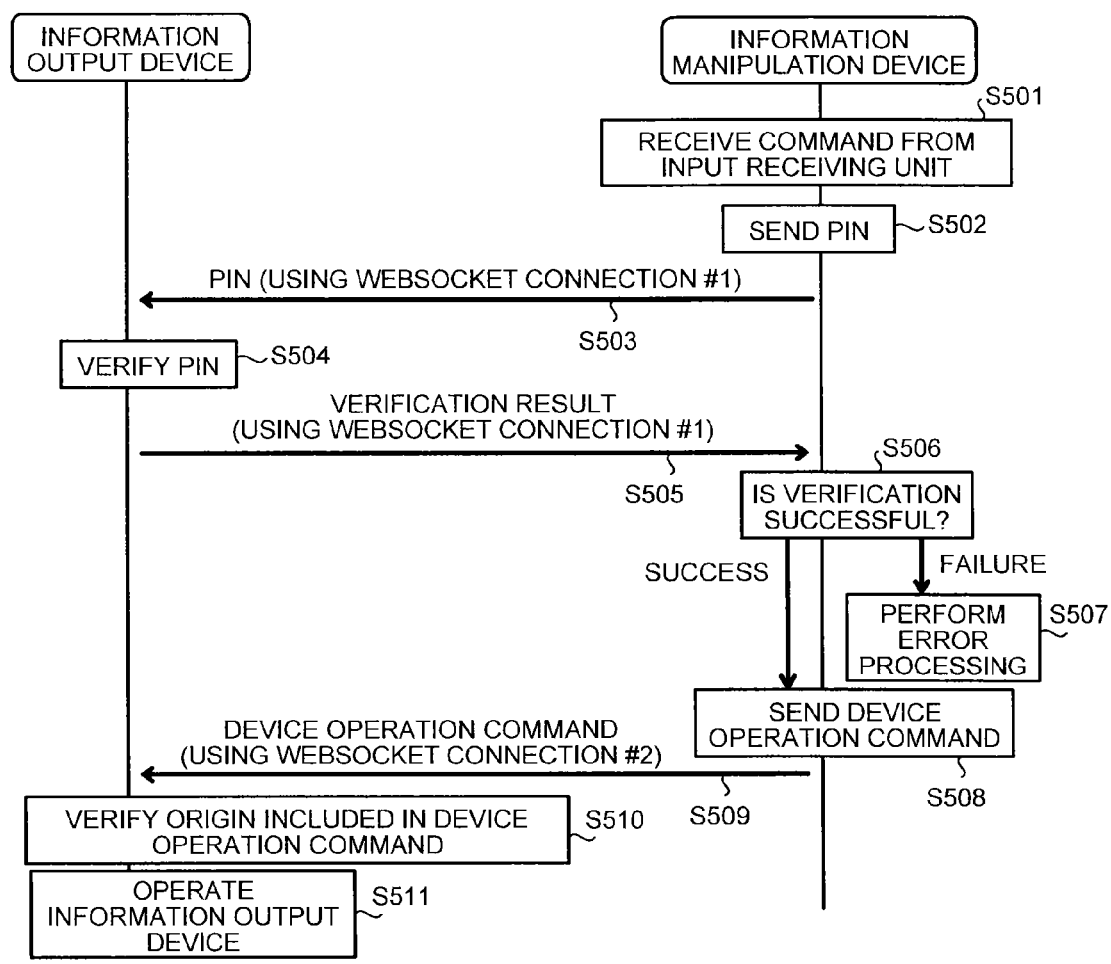
FIG. 15A is a sequence diagram illustrating a sequence of operations during the information output device operation phase (second level) according to the first embodiment.

Given below is the explanation regarding the information output device operation phase (second level). FIG. 15A is a sequence diagram illustrating a sequence of operations performed by the information manipulation device 1 and the information output device 2 during the information output device operation phase (second level). The operations illustrated in FIG. 15A are a sequel of the operations illustrated in FIG. 12. The information manipulation device 1 obtains the Web application #3 and executes it using the WEB application executing unit 22a. The Web application #3 generates a screen for the purpose of operating the information output device 2, and displays the screen on the screen output unit 17.

Figure 16:
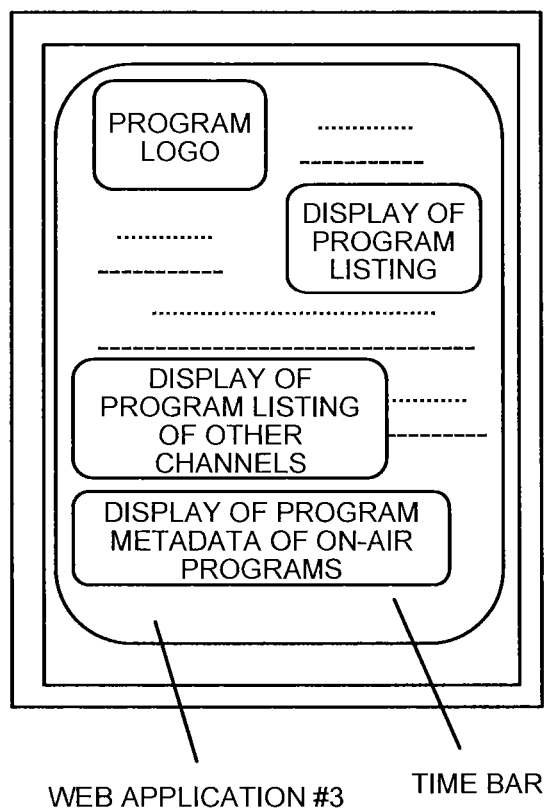
FIG. 16 is a diagram illustrating a display example of a remote controller screen according to the first embodiment.

FIG. 16 is a diagram illustrating a display example of a remote controller screen that is generated by the Web application #3 and that is output to the screen output unit 17 of the information manipulation device 1. The user of the information manipulation device 1 uses a mouse or a touch-pad to operate buttons or a scrollbar of the input receiving unit 15 and operates the information output device 2. Meanwhile, herein, a device operation command is assumed to be a command issued for the purpose of obtaining the data included in the broadcasting waves from the information output device 2 and manipulating the data. As described above, through the broadcasting waves, not only the program contents such as pictures/audio data are delivered but various other data produced by the broadcasting station (hereinafter, referred to as "program related information") are delivered. That data contains program related data such as the information regarding the performers and the shooting locations related to the programs; information about which performer appears at what time; information related to the articles such as wristwatches, clothes, and cosmetic products used by the performers during the programs; program listing that indicates the program information in future; logo data of the broadcasting station; logo data of the broadcast programs; program listing of many channels that are broadcast by the same broadcasting station; and program information of the on-air programs of other channels that are broadcast by the same broadcasting station. If it becomes possible to transmit such program related information from the information output device 2 to the information manipulation device 1 and if the information can be referred to by the information manipulation device 1, then the user is able to watch the program contents in the information output device 2 and at the same time view the program related information associated to those program contents in the information manipulation device 1 at hand. Moreover, the user is able to operate the information manipulation device 1 so as to display the program related information of interest. Thus, it becomes possible to enhance the user-friendliness.

However, since such program related information is generated by a broadcasting station, it is desirable that unauthorized copying and alternation of the program related information is prevented in an identical manner to the program contents. Thus, a case is considered in which, based on a request issued by a Web application running in the information manipulation device 1, the program related information is sent from the information output device 2 to the information manipulation device 1 and is handled by a Web application running in the information manipulation device 1. In case that Web application is not an authorized Web application, then there is a risk that the program related information is copied and used in a manner counter to the intentions of the broadcasting station. Not only that, in case the Web application is not an authorized Web application, there is a risk that the program related information obtained from the information output device 2 is altered thereby causing confusion for the viewers. For example, there is a risk that the information on program listing is rewritten in such a way that the information of the program scheduled to be broadcast is not displayed. Moreover, there are times when the information output device 2 stores therein the following information: the information such as the post office name that enables identification of the location of the information output device 2; the program viewing history; and the result of program questionnaires answered by the users. Such information sometimes falls under the category of private information. Hence, in case a Web application is not an authorized Web application, there is a risk that the private information gets leaked.

Regarding a Web application being executed by the WEB application executing unit 22 of the information output device 2, whether or not the Web application functions as per the intention of the broadcasting station is able to be determined in the information output device 2 by confirming the URL and the domain name used in obtaining that Web application. However, a Web application running in the information manipulation device 1 cannot be directly confirmed from the information output device 2. Hence, the information output device 2 has no means of knowing whether or not a Web application running in the information manipulation device 1 is an authorized Web application. In that regard, prior to executing a device operation command sent from the information manipulation device 1, that is, prior to sending the program related information; the information output device 2 determines whether or not a Web application running in the information manipulation device 1 is an authorized Web application by implementing the method given below. Only when the Web application is determined to be an authorized Web application, the information output device 2 provides a means of executing the command operation command. With that, it becomes possible to resolve the security issue.

Assume that the user of the information manipulation device 1 presses a display button, which is used in displaying the program related information of the program (the broadcast program contents) that is being currently displayed in the information output device 2. At that time, the Web application of the information manipulation device 1 sends, as a device operation command, a command instructing the information output device 2 to send the program related information of the program (the broadcast program contents), which is being currently displayed in the information output device 2, to the information manipulation device 1.

The Web application #3 receives the abovementioned command from the input receiving unit 15 and attempts to obtain the PIN stored in the PIN storing unit 23. At the time when a Web application stores a PIN in the PIN storing unit 23, a range of Web applications that is allowed to be used the PIN is specified by the PIN storing unit 23. When a PIN acquisition request for obtaining the PIN stored in the PIN storing unit 23 is received from a Web application, it is verified whether or not that Web application falls in the range of Web applications. Only when the Web application falls in the range of Web applications, the use of the PIN is allowed and the PIN is sent to the Web application #3. As the range of Web applications that are allowed to be used the PIN; the range of URLs of the Web applications is used. Thus, at the time when the Web application #2 stores the PIN in the PIN storing unit 23, it specifies the range of URL domains. Herein, assume that the Web application #2 specifies the domain of the URL of itself. When the Web application #3 requests the PIN storing unit 23 about using the PIN, the PIN storing unit 23 verifies whether or not the Web application #3 falls in the range of domains specified by the Web application #2. In this particular case, since the Web application #2 and the Web application #3 are identical, the Web application #3 is allowed to obtain the PIN.

In this way, when a Web application requests the PIN storing unit 23 about using the PIN; the PIN storing unit 23 verifies whether or not the domain of the Web application distribution server 4, which distributed that Web application, falls in the range specified by the Web application #2. If a Web application, which is sent by a Web server having a different domain name than the domain name of the Web application distribution server 4, issues a request for using the PIN; the domain name specified by the Web application #2 differs from the domain name of that Web application. For that reason, the PIN storing unit 23 does not send the PIN to the Web application sent by that different Web server. As a result, the use of the PIN is able to be restricted to the Web application that stored the PIN, or it is able to be ensured that only the Web applications distributed from a particular Web server (the Web application distribution server 4), which is specified by the Web application that stored the PIN, are allowed to use the PIN. Hence, an unauthorized Web application is able to be prevented from obtaining the PIN.

Subsequently, the Web application #3 sends the PIN to the information output device 2 using the WebSocket protocol via the WebSocket client processing unit 18*a* of the PF application executing unit 22*b*. Upon receiving the PIN from the information manipulation device 1, the information output device 2 verifies using the PIN verifying unit 44 whether the received PIN value and the PIN value stored in the PIN managing unit are identical, and notifies the device operation command processing unit 34 about the verification result. Then, the information output device 2 returns the verification result to the information manipulation device 1. In case the verification is not successful, the information output device 2 does not execute the device operation commands received thereafter. In that case, the information output device 2 may disconnect the WebSocket connection using the WebSocket client processing unit 18.

After sending the PIN, the information manipulation device 1 sends device operation commands using a WebSocket connection. As illustrated in FIG. 3, the information manipulation device 1 sends the PIN using the WebSocket client processing unit 18a, and sends the device operation commands using the WebSocket client processing unit 18. That is, different WebSocket connections are used to send the PIN and the device operation commands. At that time, a domain assigning unit 70 of the WebSocket client processing unit 18 of the information manipulation device 1 assigns, to the WebSocket header, the domain name (the origin information) of the Web application being executed by the WEB application executing unit 22a. Herein, the domain name of a Web application points to the domain name of the Web application distribution server 4 that distributed the Web application. As far as the method of sending a PIN using WebSocket is concerned, it is possible to implement, for example, JSON (which is a registered trademark and which stands for JavaScript Object Notation).

Once the information output device 2 receives a device operation command, the application origin verifying unit 43 verifies whether the domain name (the origin information) of the Web application specified in the WebSocket header of the device operation command matches with the domain name of the Web application being executed by the WEB application executing unit 22 (of the information output device 2), and notifies the device operation command processing unit 34 about the verification result. Herein, the domain name of the Web application being executed by the WEB application executing unit 22 of the information output device 2 points to the domain name of the Web server that distributed the Web application being executed by the WEB application executing unit 22. The application origin verifying unit 43 obtains from the Web application executing unit 22 the origin information (the domain name) of the Web application being executed, and verifies whether that domain name matches with the domain name (the origin information) of the Web application specified in the WebSocket header of the device operation command. In case the domain name matching is not successful, the information output device 2 does not execute the device operation command. In that case, the information output device 2 may disconnect the WebSocket connection.

The device operation command processing unit 34 determines, using a command determining unit 50, whether or not the verification performed by the PIN verifying unit 44 and the application origin verifying unit 43 is successful. Only when the verification is successful, the device operation command processing unit 34 receives the device operation command sent from the information manipulation device 1 using the WebSocket and performs operations according to that device manipulation command. For example, if the device operation command indicates an acquisition request for obtaining the program related information of the program (program contents) being currently displayed on the information output device 2, the device operation command processing unit 34 obtains the program related information from the tuner unit 32 and sends it using a WebSocket connection.

Meanwhile, the domain assigning unit 70 of the WebSocket client processing unit 18a of the PF application executing unit 22b of the information manipulation device 1 can also assign the domain name (the origin information) of the Web application, which is being executed by the WEB application executing unit 22, to the WebSocket header.

Moreover, in addition to the PIN verification, the information output device 2 can also verify whether the domain name (the origin information) of the Web application that is included in the header of the WebSocket connection, which is used for sending and receiving the PIN by the application origin verifying unit 43, matches with the domain name of the Web application being executed by the WEB application executing unit 22 of the information output device 2; and notify the device operation command processing unit 34 about the verification result. In that case, the command determining unit 50 of the device operation command processing unit 34 can verify whether the domain name included in the header of the WebSocket connection used for sending and receiving the PIN as well as the domain name included in the header of the WebSocket connection used for sending and receiving the device operation commands matches with the domain name of the Web application being executed by the WEB application executing unit 22. Alternatively, the command determining unit 50 can perform matching verification for only the domain name included in the header of the WebSocket connection used for sending and receiving the PIN, and can skip the matching verification for the domain name included in the header of the WebSocket connection used for sending and receiving the device operation commands.

In FIG. 3A is illustrated a configuration in which the PIN is sent to the information output device 2 using the WebSocket client processing unit 18a of the PF application executing unit 22b and in which the Web application executed by the WEB application executing unit 22a sends a device operation command using the WebSocket client processing unit 18. That is, the WebSocket connection for sending the PIN is different than the WebSocket connection for sending a device operation command. In contrast, in the configuration illustrated in FIG. 3B, the PIN as well as a device operation command are sent using the WebSocket client processing unit 18. Moreover, in the configuration illustrated in FIG. 3C, the PIN as well as a device operation command are sent using the WebSocket client processing unit 18a. Thus, in the configuration illustrated in FIG. 3B or FIG. 3C, the PIN as well as a device operation command are sent using the same WebSocket connection. Since each WebSocket connection has a WebSocket header appended thereto; in the configuration illustrated in FIG. 3B or FIG. 3C, the WebSocket header is sent only once unless the WebSocket connection is disconnected.

Figure 15B:
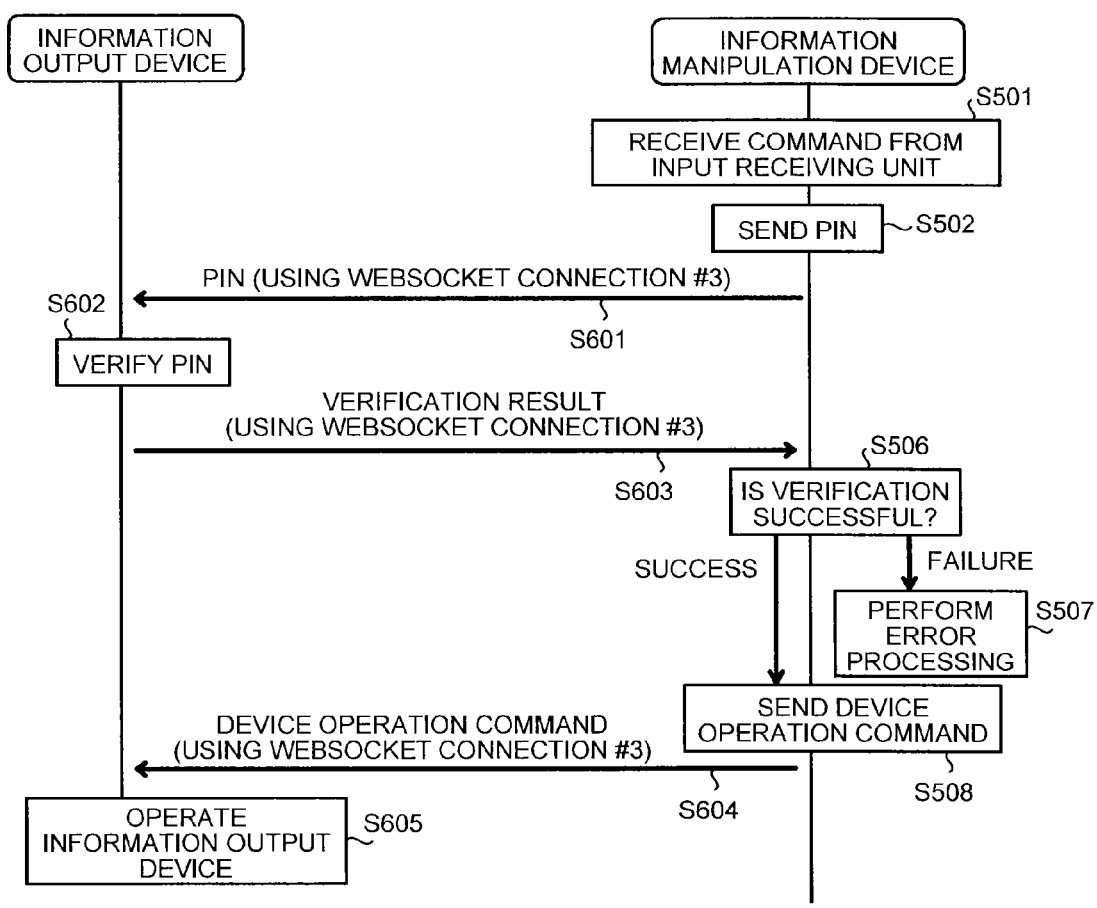
FIG. 15B is a sequence diagram illustrating another example of a sequence of operations during the information output device operation phase (second level) according to the first embodiment.

FIG. 15B is a sequence diagram illustrating a sequence of operations performed by the information manipulation device 1 and the information output device 2 in the configuration illustrated in FIG. 3B or FIG. 3C. A Web application sends the PIN using the WebSocket client processing unit 18 (Step S601). At that time, the domain assigning unit 70 of the WebSocket client processing unit 18 assigns, to the WebSocket header, the domain name (the origin information) of the Web application being executed by the WEB application executing unit 22a. Then, in the information output device 2, the application origin verifying unit 43 verifies whether the domain name (the origin information) of the Web application specified in the WebSocket header of the device operation command matches with the domain name of the Web application being executed by the WEB application executing unit 22 (of the information output device 2) (Step S602), and notifies the device operation command processing unit 34 about the verification result (Step S603). In case the verification is not successful (No at Step S506), the information output device 2 does not execute the device operation command. In that case, the information output device 2 may disconnect the WebSocket connection using the WebSocket client processing unit 18. On the other hand, if the verification is successful (Yes at Step S506), then the device operation command processing unit 34 sends a device operation command using the WebSocket client processing unit 18 (Step S604) so that the operations of the information output device 2 are performed (Step S605).

Figure 17:
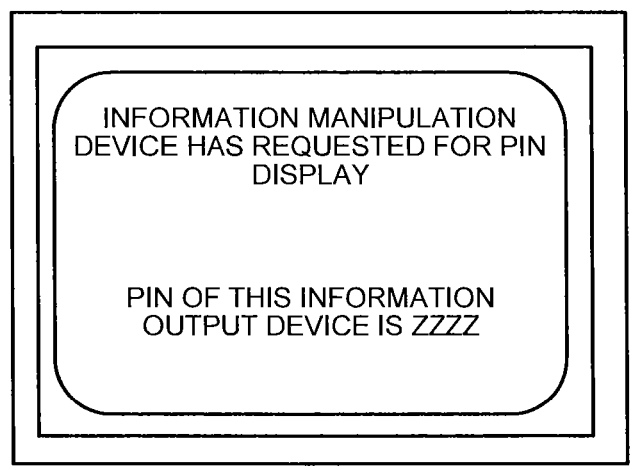
FIG. 17 is a diagram illustrating a display example of a screen in which a PIN is displayed according to the first embodiment.

Meanwhile, the PIN value that is input by the user in the information manipulation device 1 needs to be same as the PIN value stored in the PIN storing unit 23 of the information output device 2. By taking into account a situation in which the user forgets the PIN of the information output device 2, the information output device 2 can be given an instruction so that the PIN is displayed on the screen output unit of the information output device 2 from the information manipulation device 1. FIG. 17 is a diagram illustrating a display example of a screen in which the PIN is displayed in the information output device 2. In this example, the screen of the PIN is displayed over the entire screen output unit of the information output device 2. However, when the broadcasting contents received by the tuner unit 32 are displayed on the screen output unit of the information output device 2, the screen of the PIN can be output in an overlaying manner on the broadcasting contents.

Figure 18:
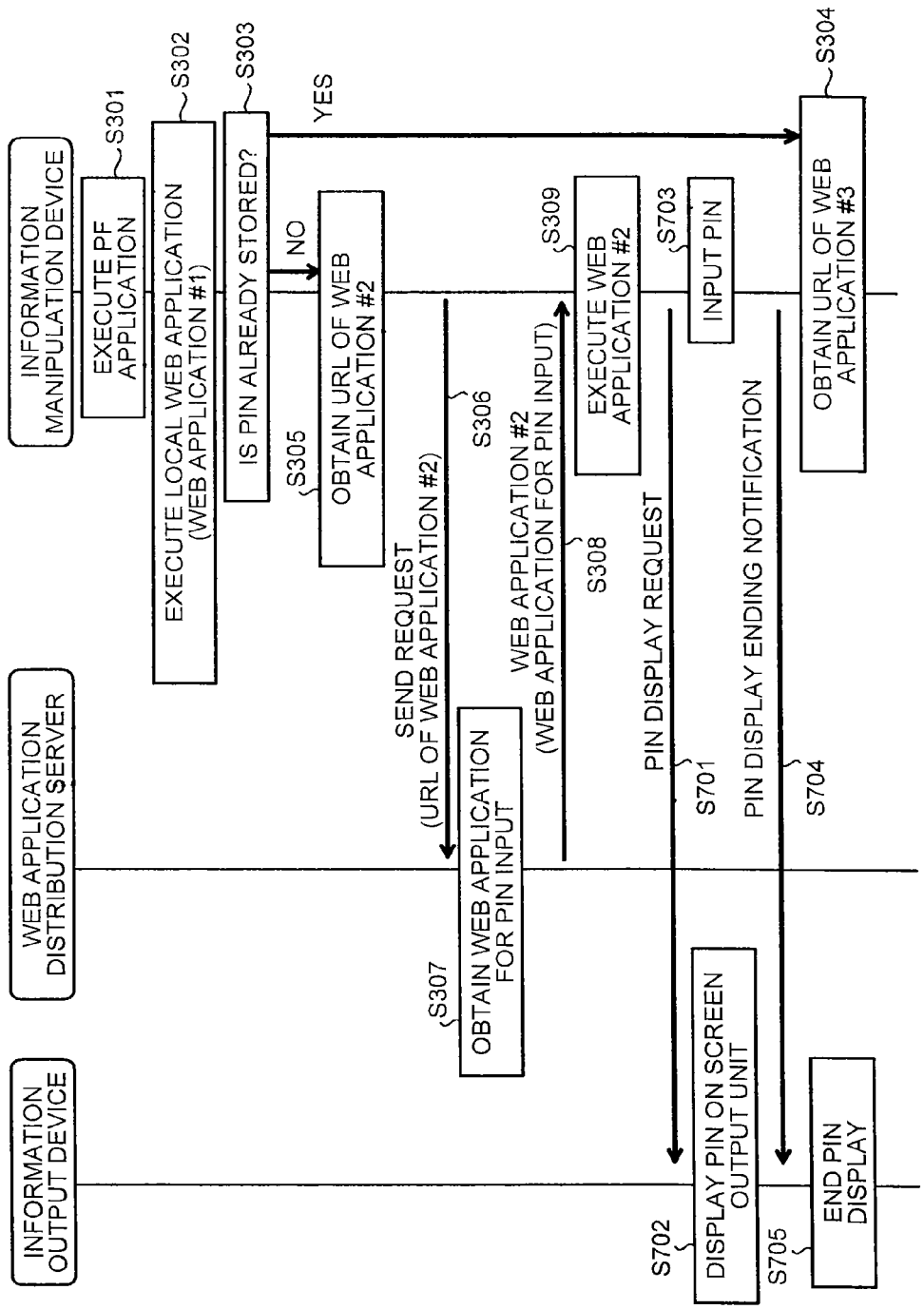
FIG. 18 is a sequence diagram illustrating a sequence of operations during the information output device operation phase (first level) according to a modification example of the first embodiment.

FIG. 18 is a sequence diagram illustrating a sequence of operations performed by the information manipulation device 1 and the Web application distribution server 4 during the information output device operation phase (first level). Herein, starting from the operation in which the Web application #2 is executed up to the operation in which a message prompting the input of the PIN is displayed on the screen of the screen output unit 17 of the information manipulation device 1 (i.e., from Step S301 to Step S309), the sequence is same as the sequence illustrated in FIG. 12. With reference to FIG. 18, along with displaying the message, which prompts the input of the PIN, on the screen of the screen output unit 17 of the information manipulation device 1 (Step S702), the Web application #2 sends a PIN display request to the device operation command sending unit 19 (Step S701). The device operation command sending unit 19 sends the PIN display request to the information output device 2 using the WebSocket client processing unit 18 and using a WebSocket connection. When the user finishes inputting the PIN from the input receiving unit 15 while looking at the displayed PIN value (Step S703), the device operation command sending unit 19 performs a PIN display ending notification (Step S704) so that the PIN display is ended (Step S705).

Figure 19:
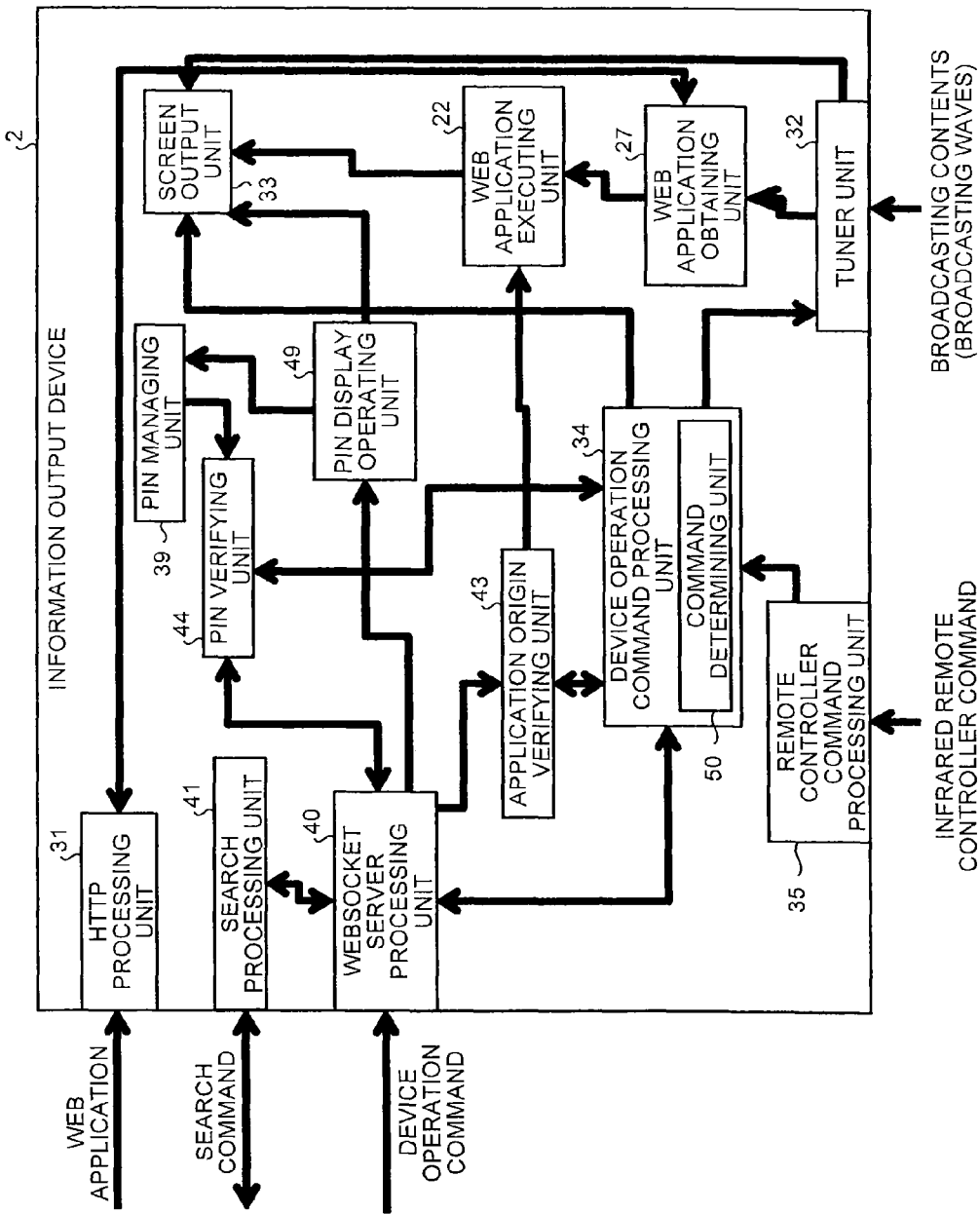
FIG. 19 is a block diagram illustrating an internal configuration of the information output device according to a modification example of the first embodiment.

FIG. 19 is a block diagram illustrating an internal configuration of the information output device 2 according to the abovementioned modification example of the first embodiment. As compared to the configuration illustrated in FIG. 4, the configuration illustrated in FIG. 19 differs in the way that a PIN display operating unit 49 is included. The PIN display operating unit 49 obtains the PIN display command that was received from the information manipulation device 1, obtains the PIN from the PIN managing unit 39, and outputs that PIN on the screen output unit 33 of the information output device 2. At that time, prior to performing the screen output, verification of the header information can be performed by the application origin verifying unit 43.

As a result, the user of the information manipulation device 1 need not remember the PIN value that is stored by the PIN managing unit 39 of the information output device 2; and can input the PIN from the input receiving unit 15 of the information manipulation device 1 while looking at the PIN displayed on the screen output unit 33 of the information output device 2. That enables achieving enhancement in the user-friendliness.

Then, the information manipulation device 1 establishes a WebSocket connection with the information output device 2 using the WebSocket client processing unit 18, and notifies the information output device 2 about the end of PIN display using the WebSocket connection. Upon receiving that notification, the information output device 2 ends the PIN display on the screen output unit 33.

In the explanation given above, the information manipulation device 1 makes use of the WebSocket protocol for the purpose of sending the PIN or a device operation command to the information output device 2. Alternatively, it is also possible to use the HTTP protocol or the HTTPS protocol.

Figure 20:
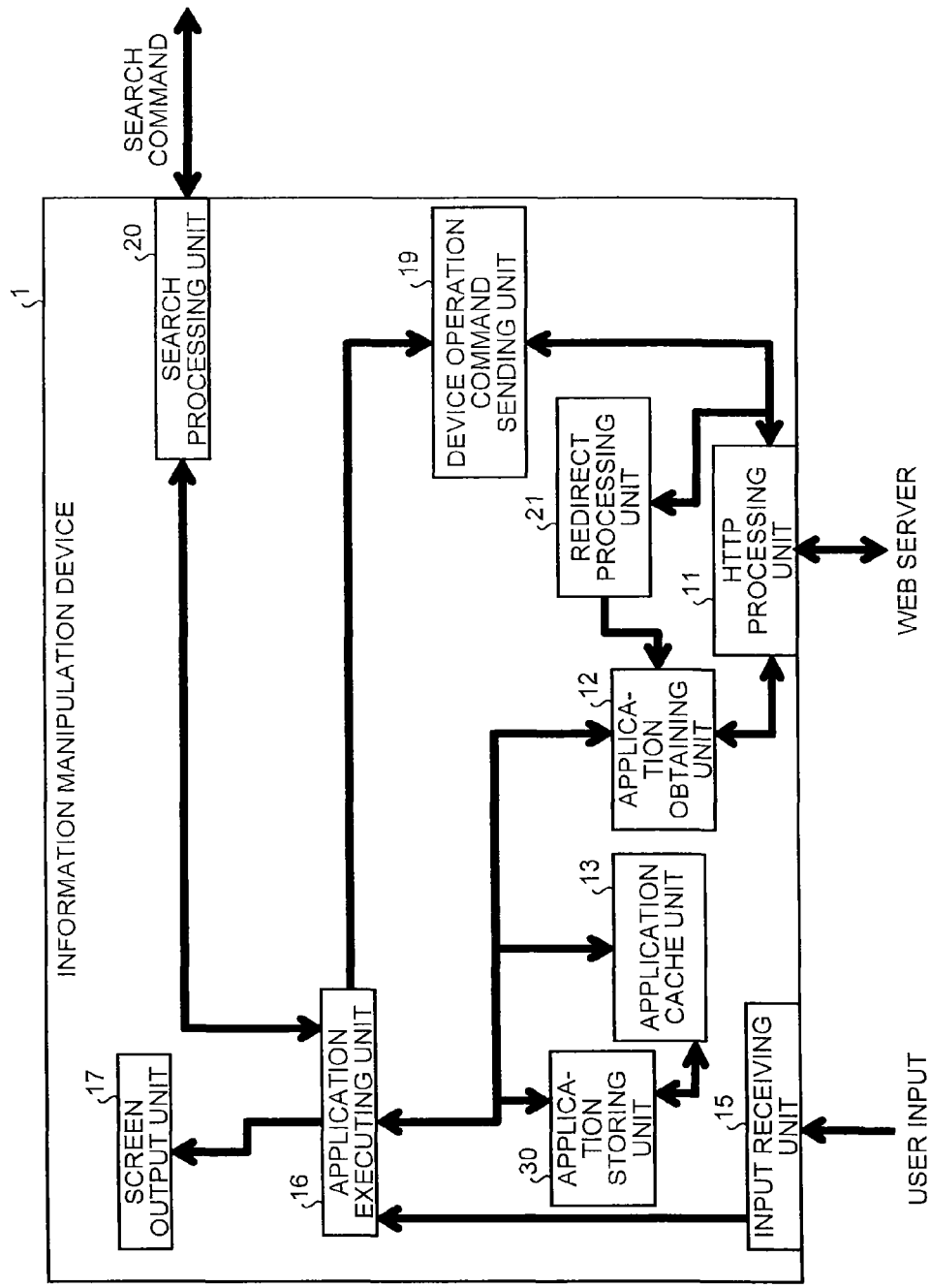
FIG. 20 is a block diagram illustrating an internal configuration of the information manipulation device according to a modification example of the first embodiment.

FIG. 20 is a block diagram illustrating an internal configuration of the information manipulation device 1 in which the HTTP protocol or the HTTPS protocol is used for the purpose of sending the PIN or a device operation command. As compared to the configuration illustrated in FIG. 2, the configuration illustrated in FIG. 20 differs in the way that the WebSocket client processing unit 18 is not disposed and the device operation command sending unit 19 is connected to the HTTP processing unit 11. Moreover, it is assumed that the configuration illustrated in FIG. 3B is used as the internal configuration of the application executing unit 16, the application obtaining unit 12, and the application cache unit 13. With reference to FIG. 2, the device operation command sending unit 19, which sends a device operation command based on a command from the application executing unit 16, uses the WebSocket protocol. In contrast, with reference to FIG. 20, the device operation command sending unit 19 sends a device operation command using the HTTP processing unit 11. Moreover, with reference to FIG. 2, the domain assigning unit 70 of the WebSocket client processing unit 18 assigns, to the WebSocket header, the domain name (the origin information) of the Web application being executed by the WEB application executing unit 22a. In contrast, with reference to FIG. 20, the HTTP processing unit 11 assigns, to the HTTP header, the domain name of the Web application being executed by the WEB application executing unit 22a. Herein, it is assumed that a PIN and a device operation command are transmitted using the same HTTP connection.

Figure 21:
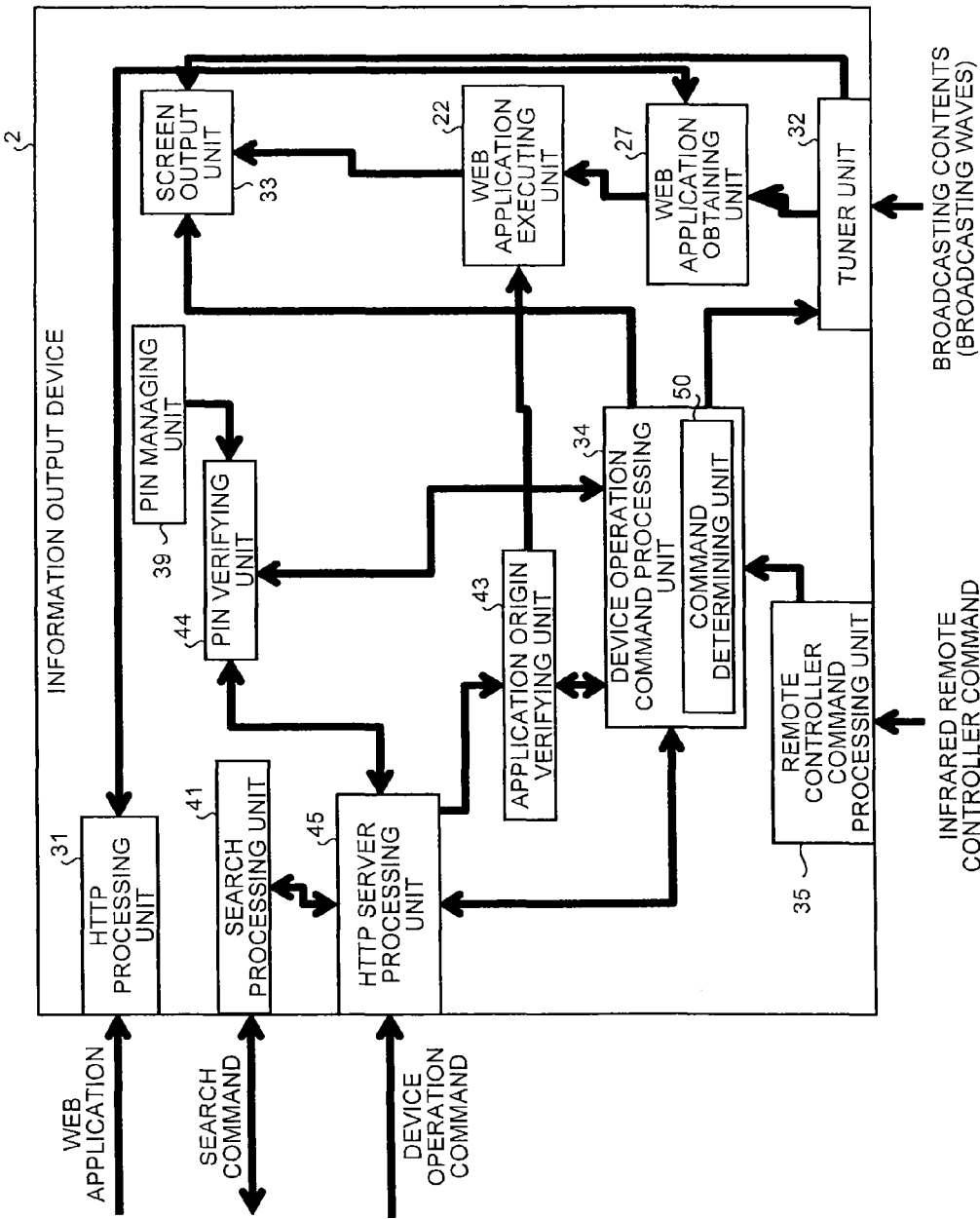
FIG. 21 is a block diagram illustrating an internal configuration of the information output device according to a modification example of the first embodiment.

FIG. 21 is a block diagram illustrating an internal configuration of the information output device 2 in which the PIN and a device operation command are received using the HTTP protocol or the HTTPS protocol. As compared to the configuration illustrated in FIG. 4, the configuration illustrated in FIG. 21 differs in the way that an HTTP server processing unit 45 is disposed in place of the WebSocket server processing unit 40. Moreover, with reference to FIG. 4, the application origin verifying unit 43 verifies whether or not the information of the WebSocket header, which is included in the device operation command received by the WebSocket server processing unit 40, is correct. In contrast, with reference to FIG. 21, since the domain name of the Web application being executed by the WEB application executing unit 22a of the information manipulation device 1 is included in the HTTP header, the application origin verifying unit 43 alternatively verifies whether or not the header information included in the HTTP connection, in which is included the device operation command received by the HTTP server processing unit 45, is correct. More particularly, the application origin verifying unit 43 verifies whether the header information included in the HTTP connection used for communicating the device operation command matches with the domain name of the Web application being executed by the WEB application executing unit 22 of the information output device 2. When the two sets of information match, it is determined that the verification is successful.

Figure 22:
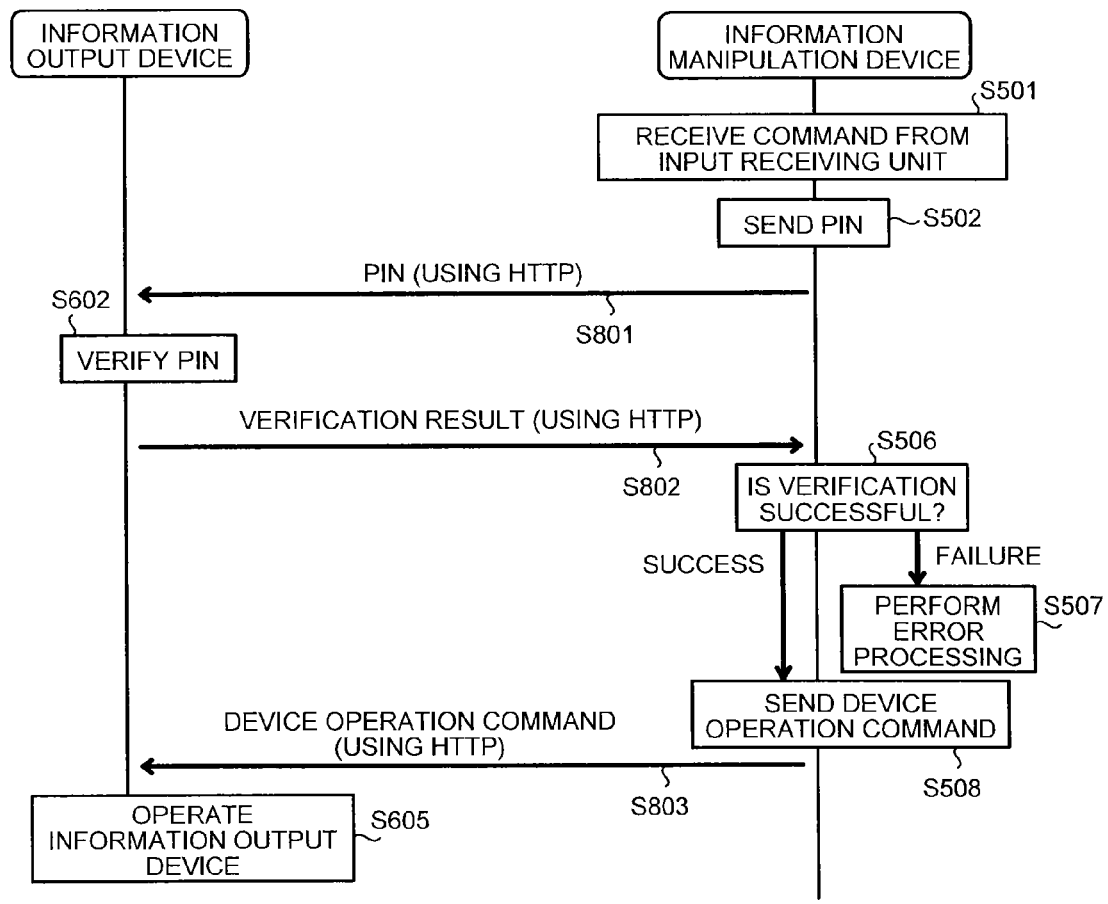
FIG. 22 is a sequence diagram illustrating another example of a sequence of operations during the information output device operation phase (second level) according to the first embodiment.

Given below is the explanation regarding the information output device operation phase (second level) in the case when the HTTP protocol or the HTTPS protocol is used for sending the PIN and a device operation command. FIG. 22 is a sequence diagram illustrating a sequence of operations performed by the information manipulation device 1 and the information output device 2.

As compared to the sequence diagram illustrated in FIG. 15B, the sequence diagram illustrated in FIG. 22 differs in the way that a PIN and a device operation command is sent using the HTTP protocol or the HTTPS protocol (Steps S801, S802, and S803). Other than that, the operations are performed in an identical manner to the sequence diagram illustrated in FIG. 15B. The following is an example of the format of the message in which the information manipulation device 1 sends the PIN to the information output device 2: http://homeTV/PIN.php?appID=X&PIN=xxxx. In this example, the information output device 2 sends, to "homeTV", the PIN value as a parameter "PIN".

In the explanation given till now, the sequence of operations is explained for the case in which the Web application #1, the Web application #2, and the Web application #3 are obtained for the first time from the Web application distribution server 4. Once those Web applications are obtained by the information manipulation device 1; the Web application cache unit 13 stores the Web applications in the Web application storing unit 52. Then, while obtaining those Web applications for the next time onward, the contents stored in the Web application storing unit 52 can be used instead of obtaining the Web applications from the Web server. With that, it becomes possible to read the Web applications at a higher speed and to enhance the reaction rate of the information manipulation device 1. Moreover, assume that the Web applications are stored in the Web application storing unit 52, and the information manipulation device 1 and the information output device 2 are connectible to each other. In that case, even if the information manipulation device 1 is not connected to the Internet, it becomes possible to send a device operation command to the information output device 2.

Till now, the explanation is given about a case in which the Web application #1, which confirms the existence of the PIN, and the Web application #3, which is a Web application for device operations, are different Web applications. However, alternatively, the Web application #1 and the Web application #3 can be the same Web application. In that case, the URL of the Web application #1 is identical to the URL of the Web application #3. Thus, the operation of obtaining the Web application #3 is skipped, and only the Web application #1 performs the operations starting from storing the PIN up to sending a device operation command.

Till now, the explanation is given about an example in which a Web application running in the information manipulation device 1 sends a device operation command to the information output device 2. Other than that, a Web application running in the information output device 2 can also send a command to the information manipulation device 1.

Figure 23:
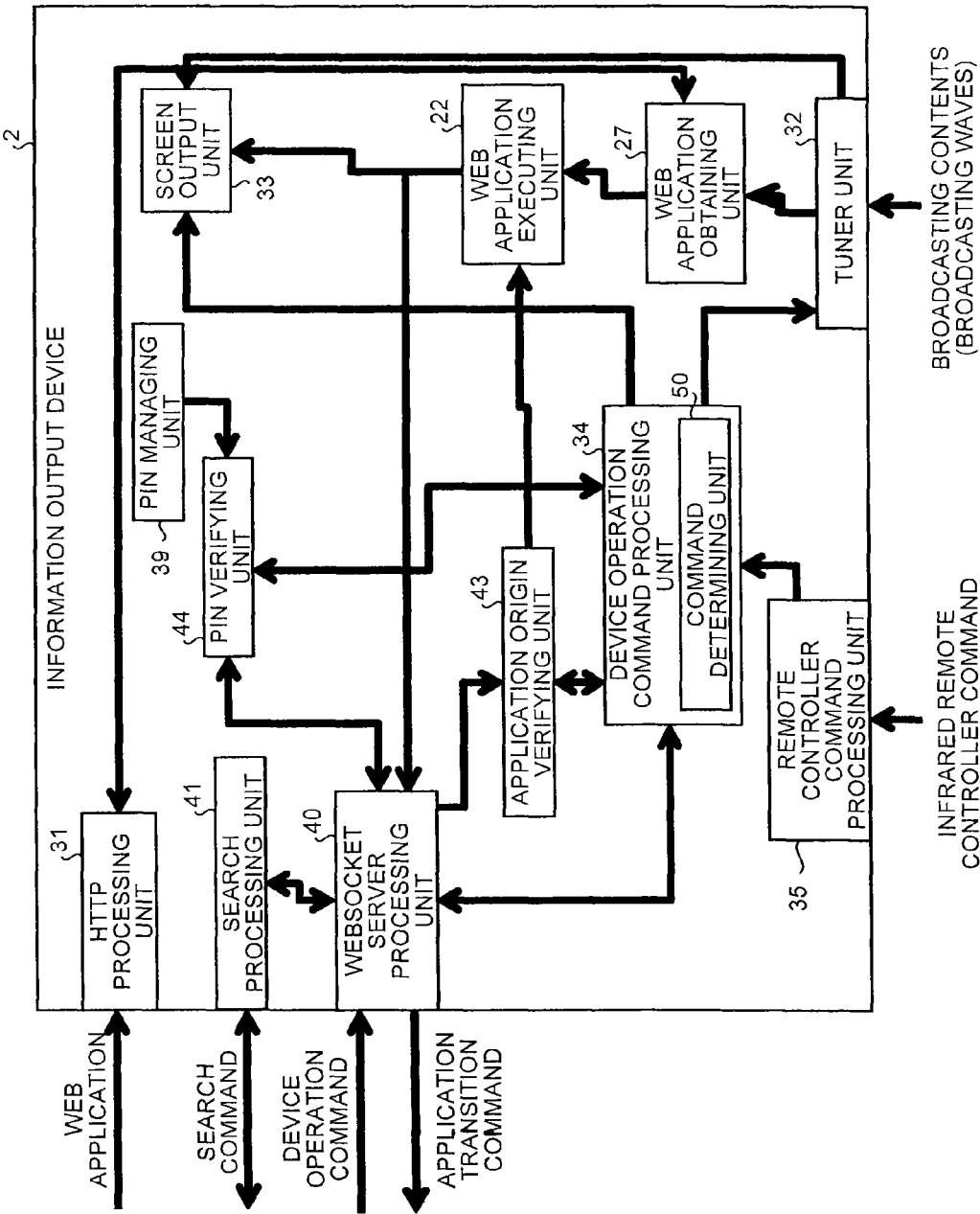
FIG. 23 is a block diagram illustrating an internal configuration of the information output device according to a modification example of the first embodiment.

A configuration of the information output device 2 in this case is illustrated in FIG. 23. As compared to the configuration illustrated in FIG. 4, the configuration illustrated in FIG. 23 differs in the way that the data is transmitted from the WEB application executing unit 22 to the WebSocket server processing unit 40. A Web application running in the WEB application executing unit 22 makes use of the WebSocket server processing unit 40 and sends an instruction to the information manipulation device 1 to do Web application transition. At that time, the URL of the transition destination can be included in a Web application transition command. In the case when a Web application is configured with a plurality of frames, an instruction can be given not to do Web application transition in entirety but to update only some portion of the Web application.

Figure 24:
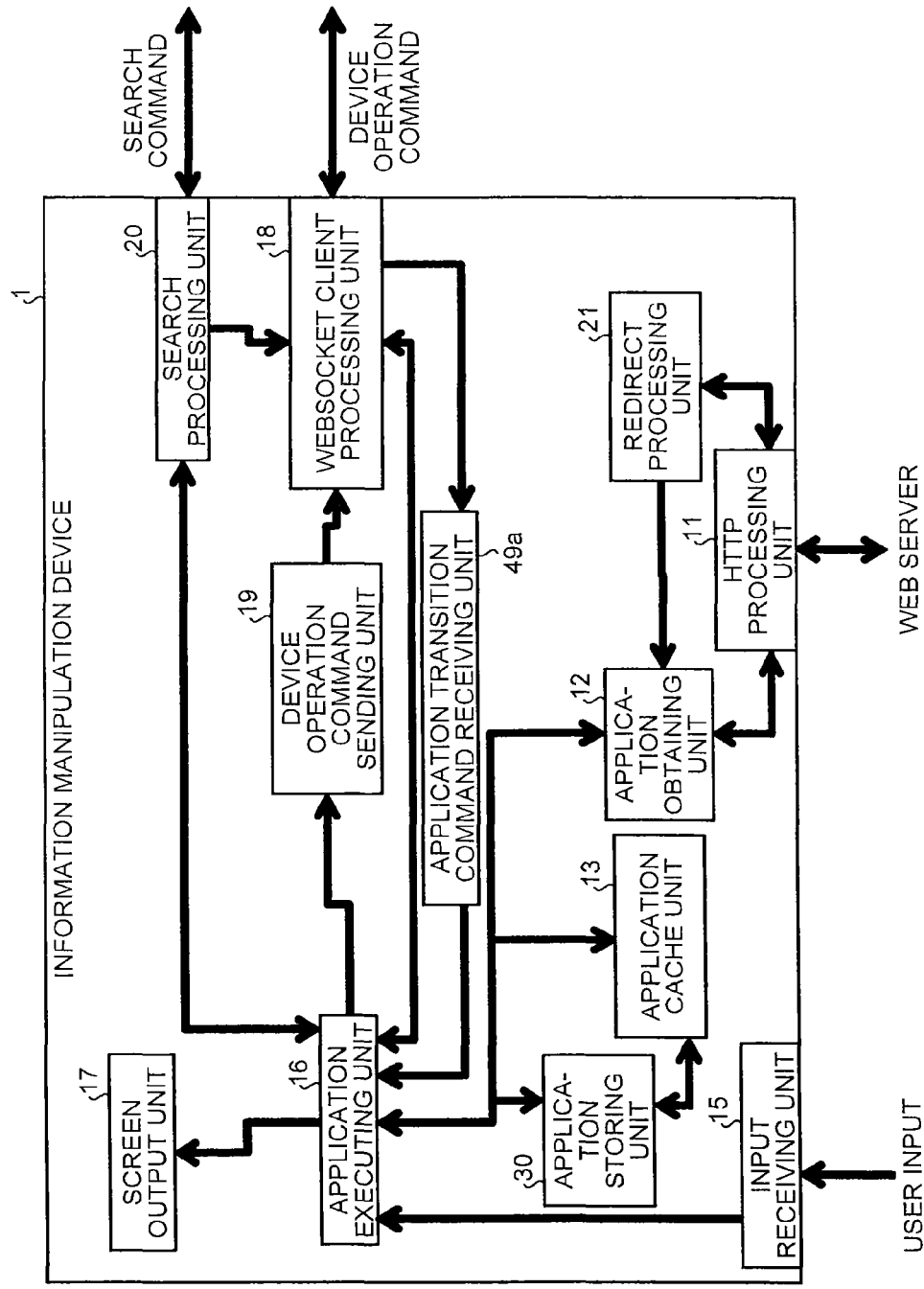
FIG. 24 is a diagram illustrating a configuration of the information manipulation device according to a modification example of the first embodiment.
Figure 25:
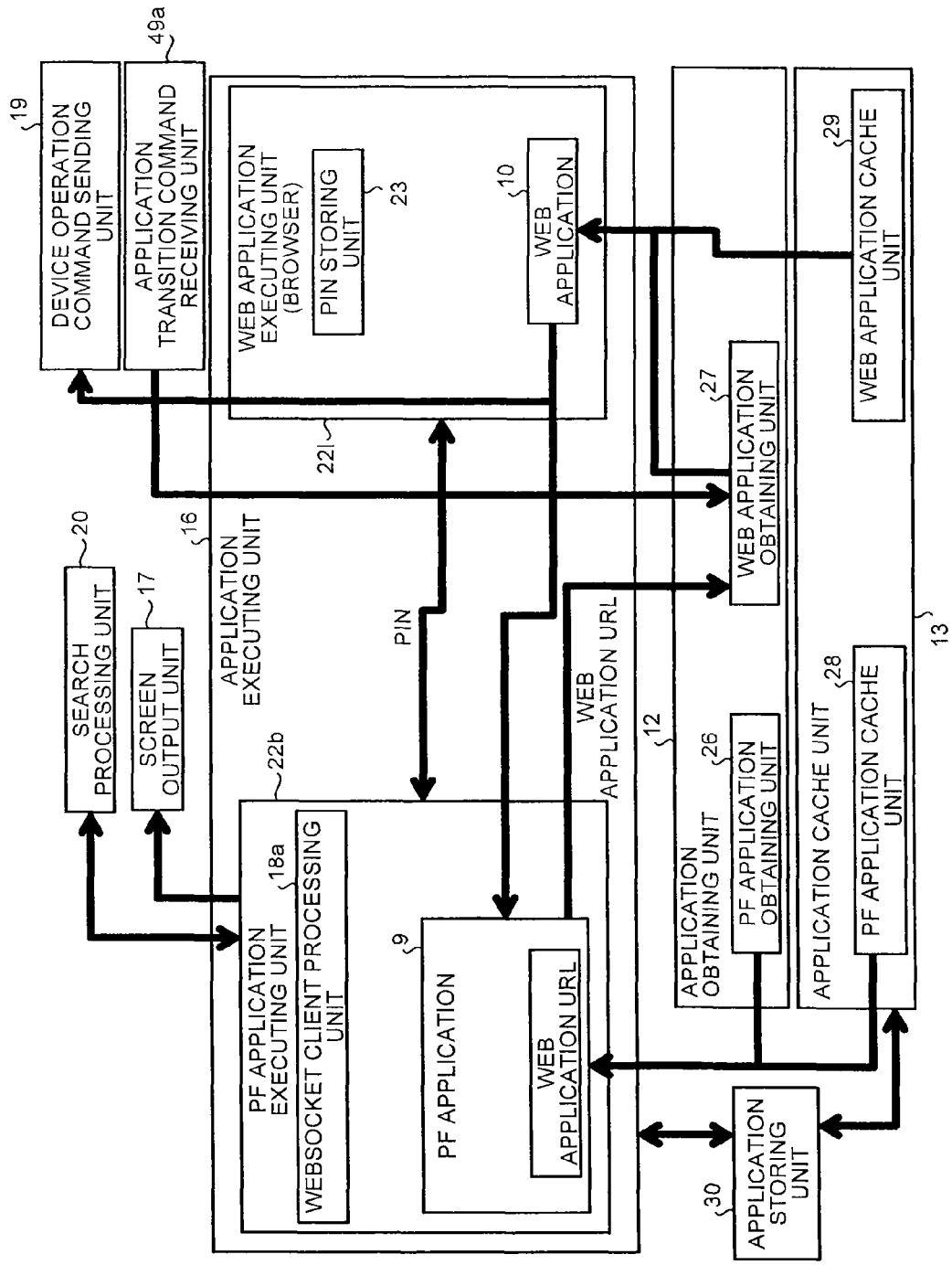
FIG. 25 is a block diagram of the application executing unit, the application obtaining unit, and the application cache unit according to a modification example of the first embodiment.

FIG. 24 is a diagram illustrating a configuration of the information manipulation device 1 corresponding to the abovementioned information output device 2. As compared to the configuration illustrated in FIG. 2, the configuration illustrated in FIG. 24 differs in the way that an application transition command receiving unit 49 is newly disposed. The application transition command receiving unit 49a receives a Web application transition command from the WebSocket client processing unit 18 and notifies the application executing unit 16 about the Web application transition command. Then, as illustrated in FIG. 25, the application transition command receiving unit 49a instructs the Web application obtaining unit 27 to obtain the Web application at the transition destination, and executes the newly-obtained Web application using a WEB application executing unit 22l. With reference to FIGS. 24 and 25, the explanation is given about a configuration in which the WebSocket connection that is same as the WebSocket connection used for sending a device operation command is used by the WebSocket client processing unit 18 to receive the application transition commands. Alternatively, the application transition commands can be received by the WebSocket client processing unit 18a. In that case, an internal configuration of the application executing unit 16, the application obtaining unit 12, and the application cache unit 13 of the information manipulation device 1 is illustrated in FIG. 26.

Figure 26:
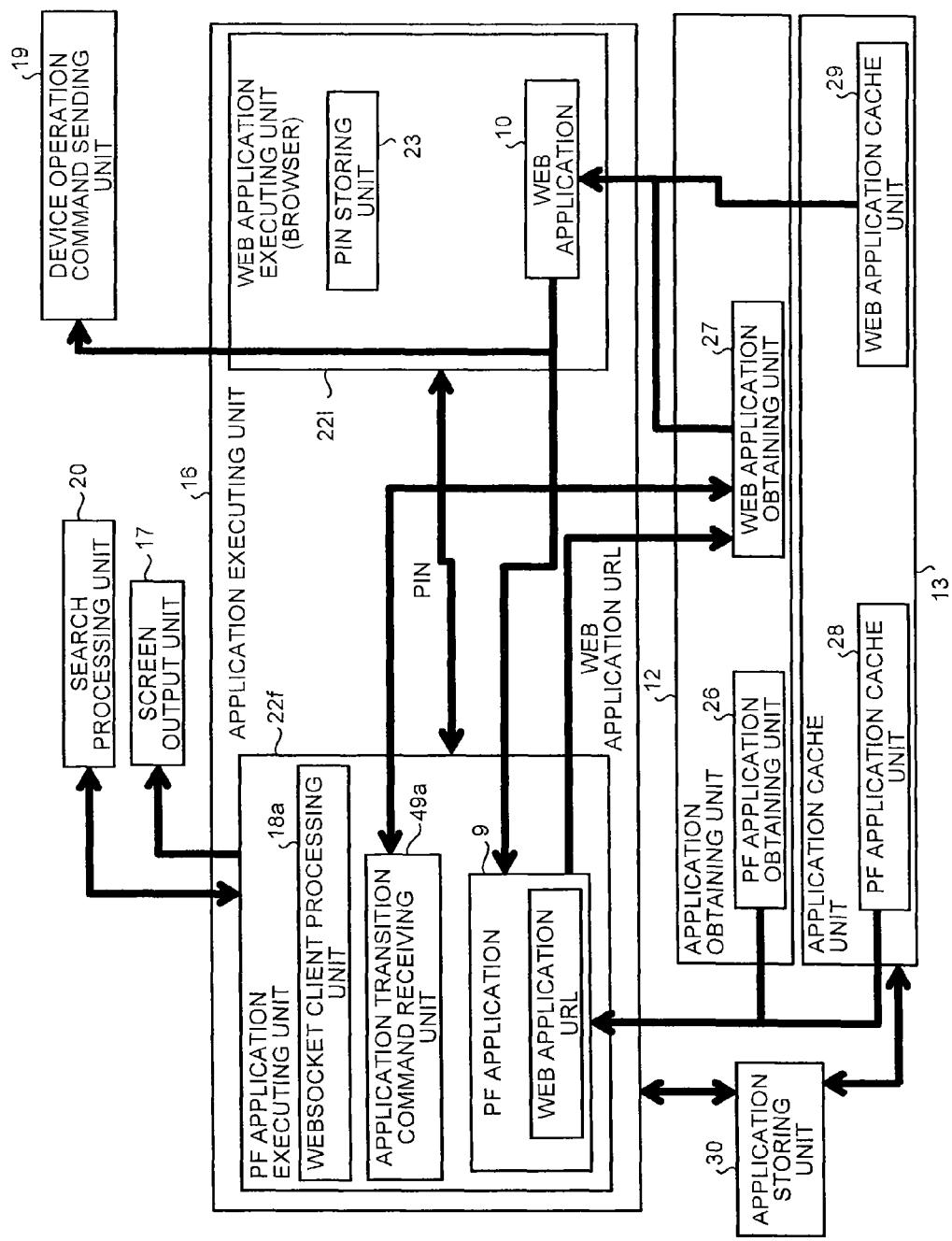
FIG. 26 is a block diagram of the application executing unit, the application obtaining unit, and the application cache unit according to a modification example of the first embodiment.

As illustrated in FIG. 26, a PF application executing unit 22f of the information manipulation device 1 includes the application transition command receiving unit 49a. The WebSocket client processing unit 18a receives an application transition command from the information output device 2, and sends it to the application transition command receiving unit 49a. In turn, the application transition command receiving unit 49a notifies the application executing unit 16 about the Web application transition command received from the WebSocket client processing unit 18. Subsequently, the application transition command receiving unit 49a of the application executing unit 16 notifies the Web application obtaining unit 27 about the URL for obtaining the Web application at the transition destination, and executes the newly-obtained Web application using the WEB application executing unit 22l.

In the example illustrated in FIGS. 23 to 26, the explanation is given about a configuration in which an application transition command is sent from the information output device 2 to the information manipulation device 1 using the same WebSocket connection that is used for sending a device operation command and the PIN. Alternatively, an application transition command can be sent using a different WebSocket connection than the WebSocket connection used for sending a device operation command and the PIN.

Figure 27:
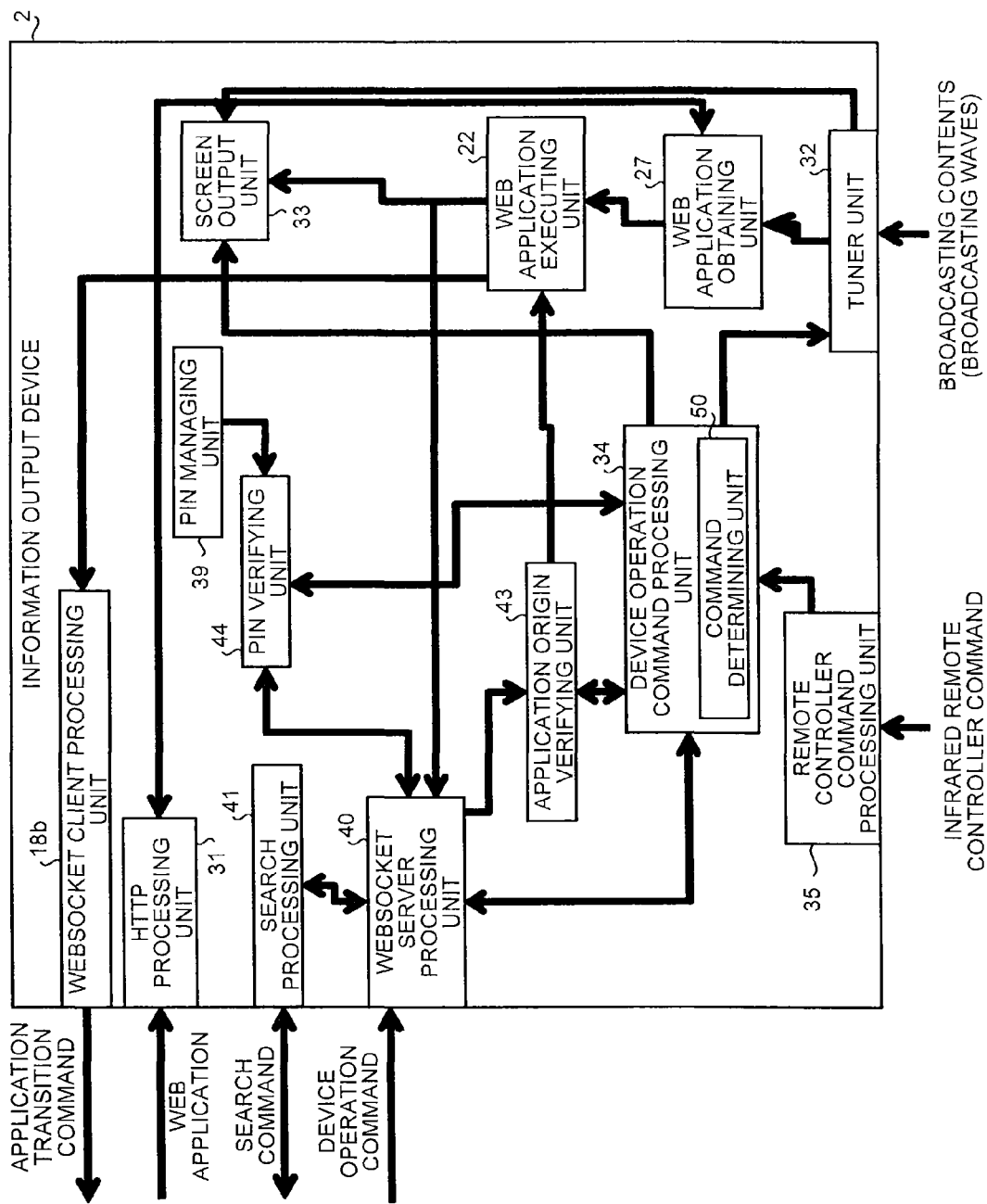
FIG. 27 is a block diagram illustrating an internal configuration of the information output device according to a modification example of the first embodiment.
Figure 28:
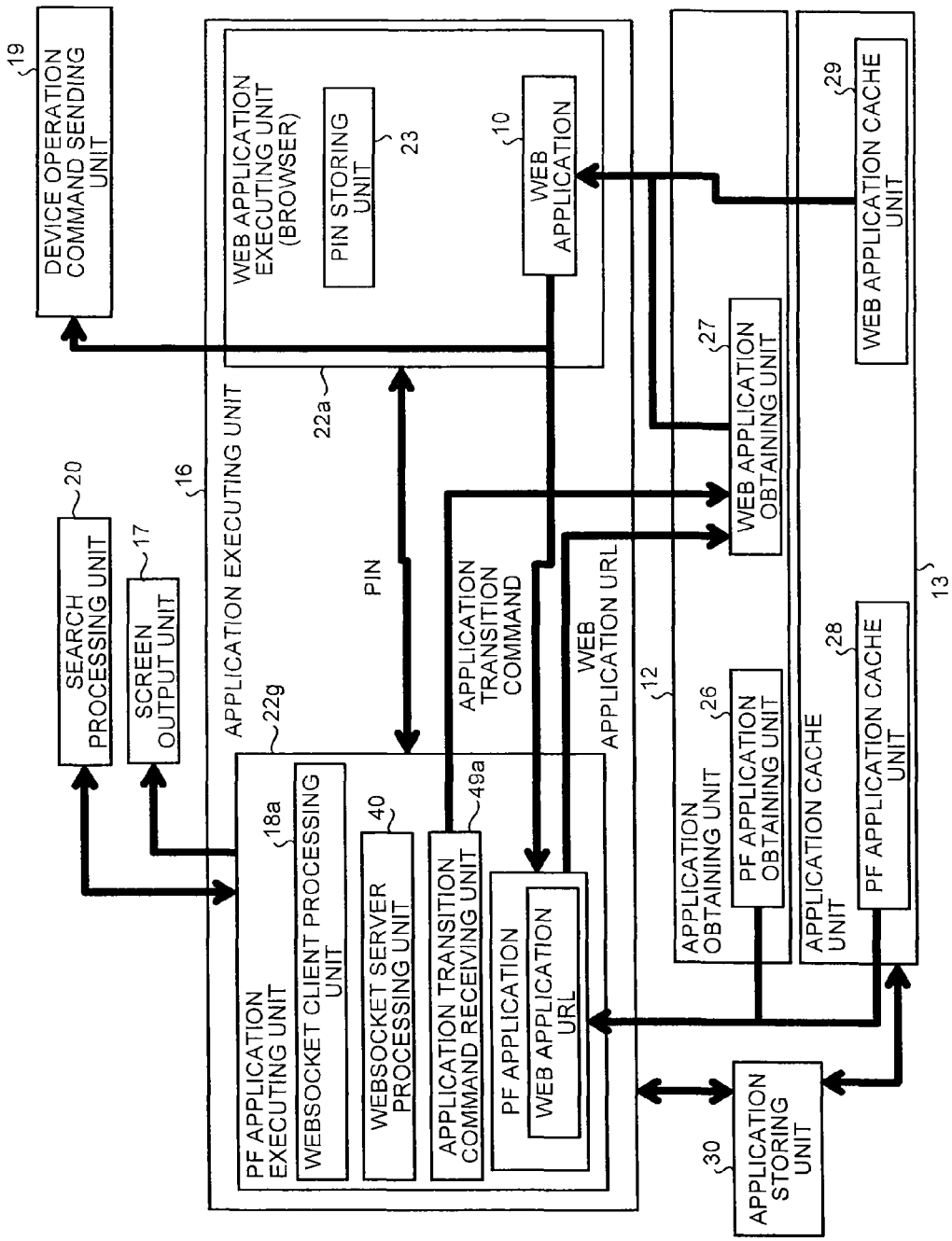
FIG. 28 is a block diagram of the application executing unit, the application obtaining unit, and the application cache unit according to a modification example of the first embodiment.

In that case, a configuration of the information output device 2 is illustrated in FIG. 27. As compared to the configuration illustrated in FIG. 23, the configuration illustrated in FIG. 27 differs in the way that, while sending an application transition command, the WEB application executing unit 22 makes use of a WebSocket client processing unit 18b instead of the WebSocket server processing unit 40. With such a configuration, the WEB application executing unit 22 and the WebSocket client processing unit 18b can be configured to be general-purpose browsers. FIG. 28 is a diagram illustrating a configuration of the information manipulation device 1 corresponding to the information output device 2 illustrated in FIG. 27.

Figure 29:
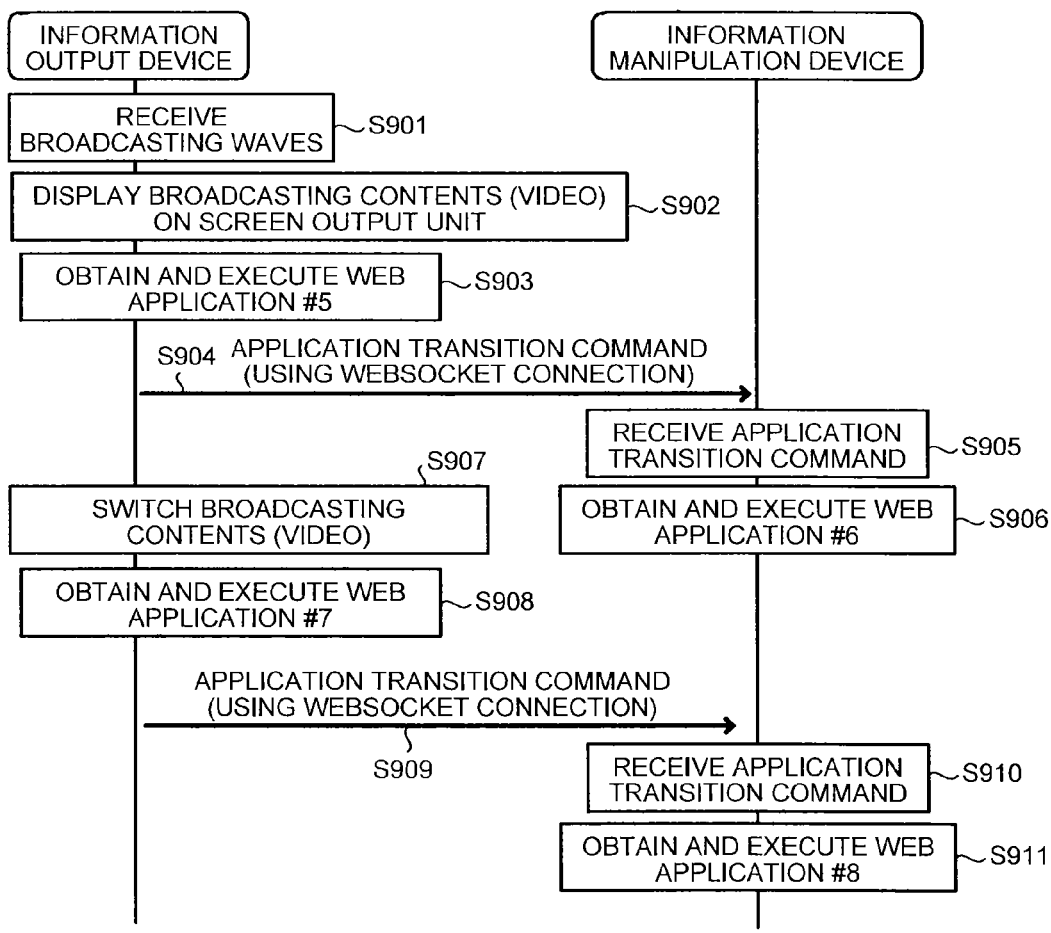
FIG. 29 is a sequence diagram illustrating a sequence of operations performed for displaying a Web application in conjunction with the broadcasting contents according to the first embodiment.

As compared to the configuration illustrated in FIG. 25, the configuration illustrated in FIG. 28 differs in the way that the WebSocket server processing unit 40 and the application transition command receiving unit 49a are included in a PF application executing unit 22g. Herein, in an identical manner to the WebSocket server processing unit 40 of the information output device 2, the WebSocket server processing unit 40 performs server processing with the aim of performing communication with the information manipulation device 1 according to the WebSocket protocol defined in the RFC6455 specification. More particularly, the WebSocket server processing unit 40 receives an application transition command sent by the WebSocket client processing unit of the information output device 2, and sends that application transition command to the application transition command receiving unit 49a. As a result, the Web application can be displayed in the information manipulation device 1 in conjunction with the broadcasting contents displayed in the screen output unit of the information output device 2. In FIG. 29 is illustrated a sequence diagram of the operations performed in that case.

For example, assume that the contents of a drama are being distributed over the broadcasting waves at a certain time of a day, and the video contents (the broadcasting contents) of that drama are being displayed on the screen output unit 33 of the information output device 2 (Step S901 and Step S902). In a simultaneous manner to the displaying of the video contents, the WEB application executing unit 22 of the information output device 2 executes a Web application for dramas (a Web application #5) that is obtained by the Web application obtaining unit 27 (Step S903). The Web application #5 can be included in the broadcasting waves in a multiplexed manner; or only the URL indicating the location of the Web application #5 can be included in the broadcasting waves so that the Web application obtaining unit 27 obtains the Web application #5 from the Web application distribution server according to the URL. Then, the WEB application executing unit 22 executes the Web application #5. Subsequently, the Web application #5 sends an application transition command to the information manipulation device 1 using the WebSocket client processing unit 18 and using a WebSocket connection (Step S904); and instructs the information manipulation device 1 to execute a Web application related to dramas (a Web application #6). The Web application #5 can be output on the screen illustrated in FIG. 5; or the broadcast program can be displayed over the entire screen without displaying any portion of the Web application.

With reference to FIG. 29, it is either assumed that a WebSocket connection is already established between the information manipulation device 1 and the information output device 2 as a result of the operations illustrated in FIG. 15, or assumed that the WebSocket client processing unit 18b of the information output device 2 establishes a connection with the WebSocket server processing unit 40 of the information output device 2 according to the configuration illustrated in FIG. 27 or FIG. 28.

The information manipulation device 1 receives the application transition command (Step S905); obtains the Web application (the Web application #6) based on the URL included in the application transition command and using the Web application obtaining unit 27; and executes the Web application #6 using the WEB application executing unit 22a (Step S906). The Web application #6 is specified by the Web application #5. Moreover, the Web application #5 is associated to the broadcasting contents. As a result, the Web application #6 is able to also be executed as a Web application associated with the broadcasting contents.

Then, assume that a certain period of time elapses and the broadcast program changes to a different program (for example, the drama changes to a news program) (Step S907). Then, the tuner unit 32 switches the broadcast program and instructs the Web application obtaining unit 27 to switch from the Web application associated to the drama (the Web application #5) to a Web application associated to the news programs (a Web application #7). In response, the Web application obtaining unit 27 obtains the new Web application (the Web application #7) based on the URL included in the broadcast program of the news; and the WEB application executing unit 22 executes the Web application for news programs (the Web application #7) (Step S908). Then, the Web application #7 sends an application transition command to the information manipulation device 1 using the WebSocket client processing unit 18b and using a WebSocket connection (Step S909); and instructs the information manipulation device 1 to execute a Web application related to news programs (a Web application #8).

The information manipulation device 1 receives the application transition command (Step S910); obtains the Web application (the Web application #8) based on the URL included in the application transition command and using the Web application obtaining unit 27; and executes the Web application #8 using the WEB application executing unit 22a (Step S911).

In this way, in conjunction with the broadcasting contents, the Web application corresponding to the broadcasting contents sends an application transition command to the information manipulation device 1. With that, the related Web application can be displayed not only in the information output device 2 but also in the information manipulation device 1.

Moreover, only when the WebSocket connection between the information output device 2 and the information manipulation device 1 is authenticated to be an authorized Web application by the application origin verifying unit 43 and the PIN verifying unit 44, the WebSocket connection is established. As a result, from the perspective of the information manipulation device 1, it can be ensured that an application transition command is received only from the information output device 2 that is reliable. Meanwhile, the abovementioned explanation is given for an example in which the program is switched to a different program after the elapse of time. The same operations can be performed also in the case when the remote controller command processing unit 35 uses an infrared remote controller command to send a program switch command to the tuner.

Second Embodiment

In the first embodiment, when a command (a device operation command) is sent from the information manipulation device 1 to the information output device 2 with the aim of obtaining the data included in the broadcasting waves from the information output device 2 and manipulating the data, the information output device 2 determines whether or not to allow execution of the device operation command based on the PIN and the origin information of the Web application running in the information manipulation device 1. In a second embodiment, consideration is given also to a case in which a command (an independent operation command) that is issued with the aim of operating the information output device 2 from the information manipulation device 1 is sent independent of the data included in the broadcasting waves.

Figure 1B:
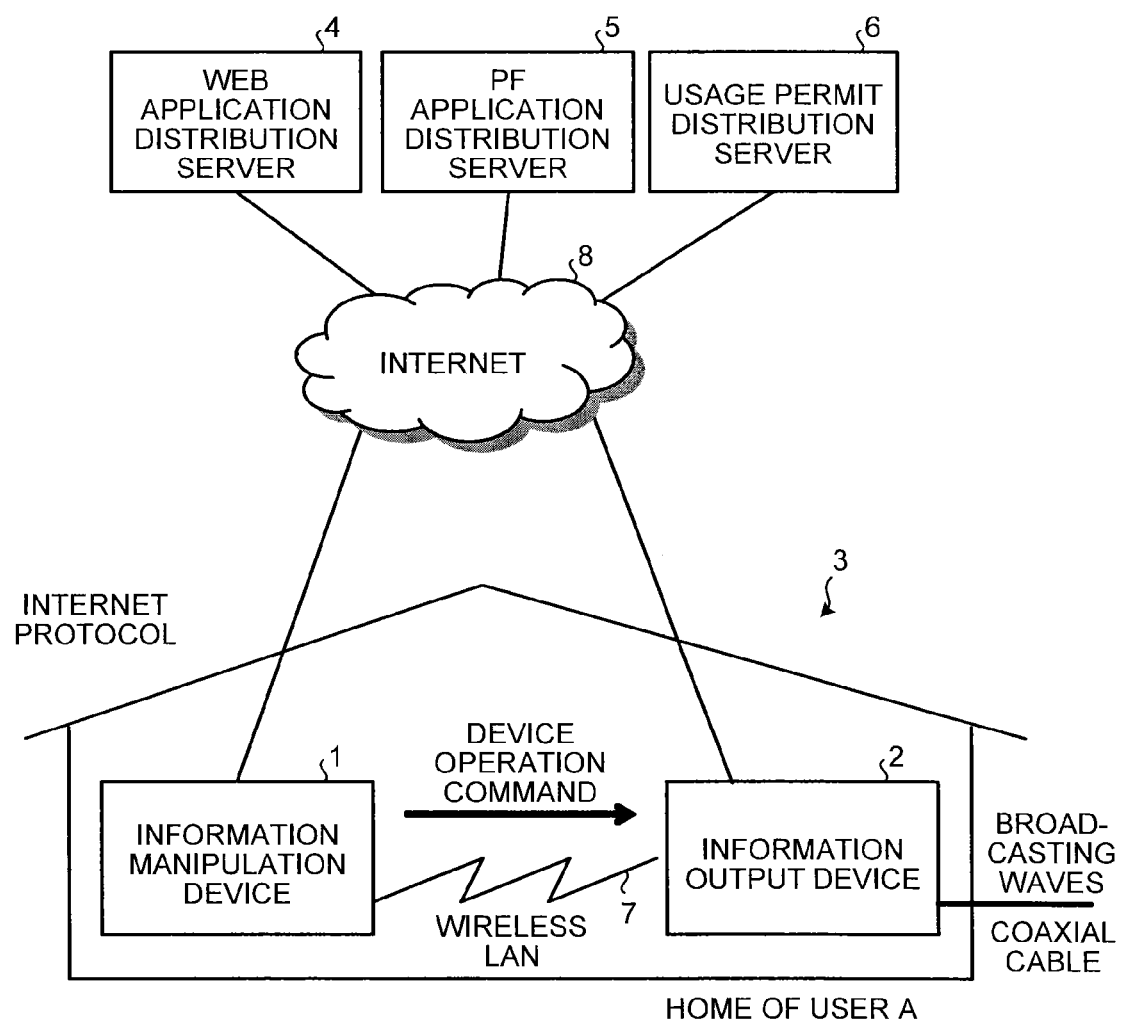
FIG. 1B is a diagram illustrating an overall configuration of an information processing system according to a second embodiment.

FIG. 1B is a diagram illustrating an overall configuration of the information processing system 3 that includes the information manipulation device 1 and the information output device 2. As compared to the information processing system 3 illustrated in FIG. 1A, the information processing system 3 illustrated in FIG. 1B differs in the way that a usage permit distribution server 6 is disposed. The usage permit distribution server 6 distributes a usage permit that is required at the time of operating the information output device 2 using an independent operation command. The usage permit distribution server 6 is connected to the information manipulation device 1 via, for example, the Internet 8 using the Internet protocol (IP). Meanwhile, in FIG. 1B, although the Web application distribution server 4, the PF application distribution server 5, and the usage permit distribution server 6 are illustrated to be separate devices; it is also possible to integrate those servers into a single device. That is, two or more of the three servers can be integrated into a single device.

Figure 30:
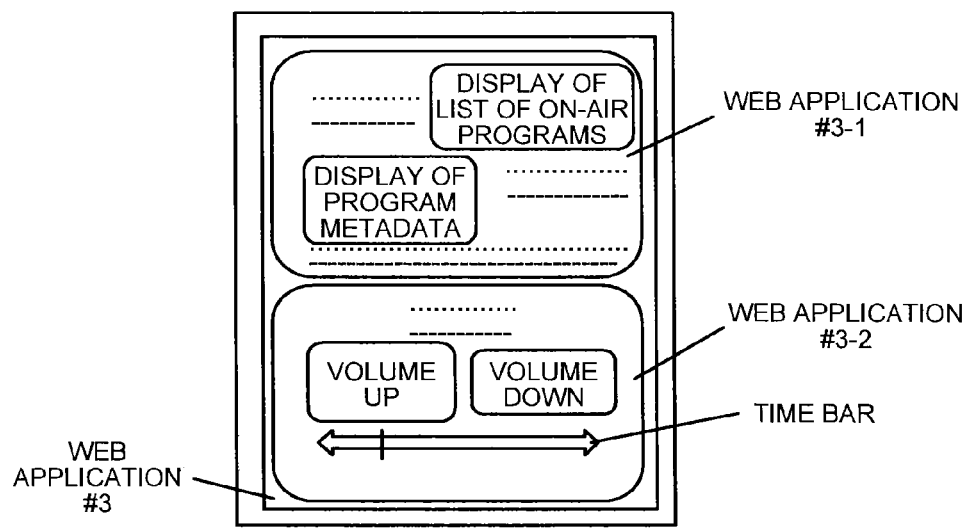
FIG. 30 is a diagram illustrating a display example of a remote controller screen according to the second embodiment.

FIG. 30 is a diagram illustrating a display example of a remote controller screen that is generated by the Web application #3 and that is output to the screen output unit 17 of the information manipulation device 1. In the first embodiment, a device operation command sent from the information manipulation device 1 to the information output device 2 is assumed to be a command (a broadcast related command) for the purpose of obtaining the data included in the broadcasting waves from the information output device 2 and manipulating the data. In the second embodiment, in addition to broadcast related commands; independent operation commands that are device operation commands unrelated to the broadcasting contents are also taken into account. Examples of an independent operation command include a command issued for the purpose of controlling the tuner unit 32 of the information output device 2 (a channel selection command with respect to the tuner unit 32) or a volume adjustment command; and an input switching command (issued for the purpose of switching from the broadcasting tuner input to an external input). Moreover, when the information output device 2 is equipped with the function of recording/storing the broadcasting contents, examples of a device operation command include a list display command issued for the purpose of displaying a list of recorded contents; a playback command issued for the purpose of playback specified recorded contents; a playback command issued for the purpose of instructing playback of specified recorded contents starting from a particular position; or a deletion command issued for the purpose of deleting specified recorded contents.

As illustrated in FIG. 30, it is assumed that the Web application running in the information manipulation device 1 operates the information output device 2 by sending a broadcast related command (for displaying the program related information and displaying a list of on-air programs) as well as a broadcast independent command (for displaying a list of contents, performing volume adjustment, and displaying a time bar) to the information output device 2. In the example illustrated in FIG. 30, it is assumed that the Web application #3 is configured with two Web applications, namely, a Web application #3-1 that handles broadcast related commands and a Web application #3-2 that handles broadcast independent commands; and it is assumed that the Web applications #3-1 and #3-2 are delivered from different Web application distribution servers 4 having different domain names. Thus, when the Web application #3-1 sends a device operation command using WebSocket, the domain name (the origin) of the Web server from which the Web application #3-1 was downloaded is appended to the WebSocket header. Similarly, when the Web application #3-2 sends a device operation command using WebSocket, the domain name (the origin) of the Web server from which the Web application #3-2 was downloaded is appended to the WebSocket header.

Figure 31:
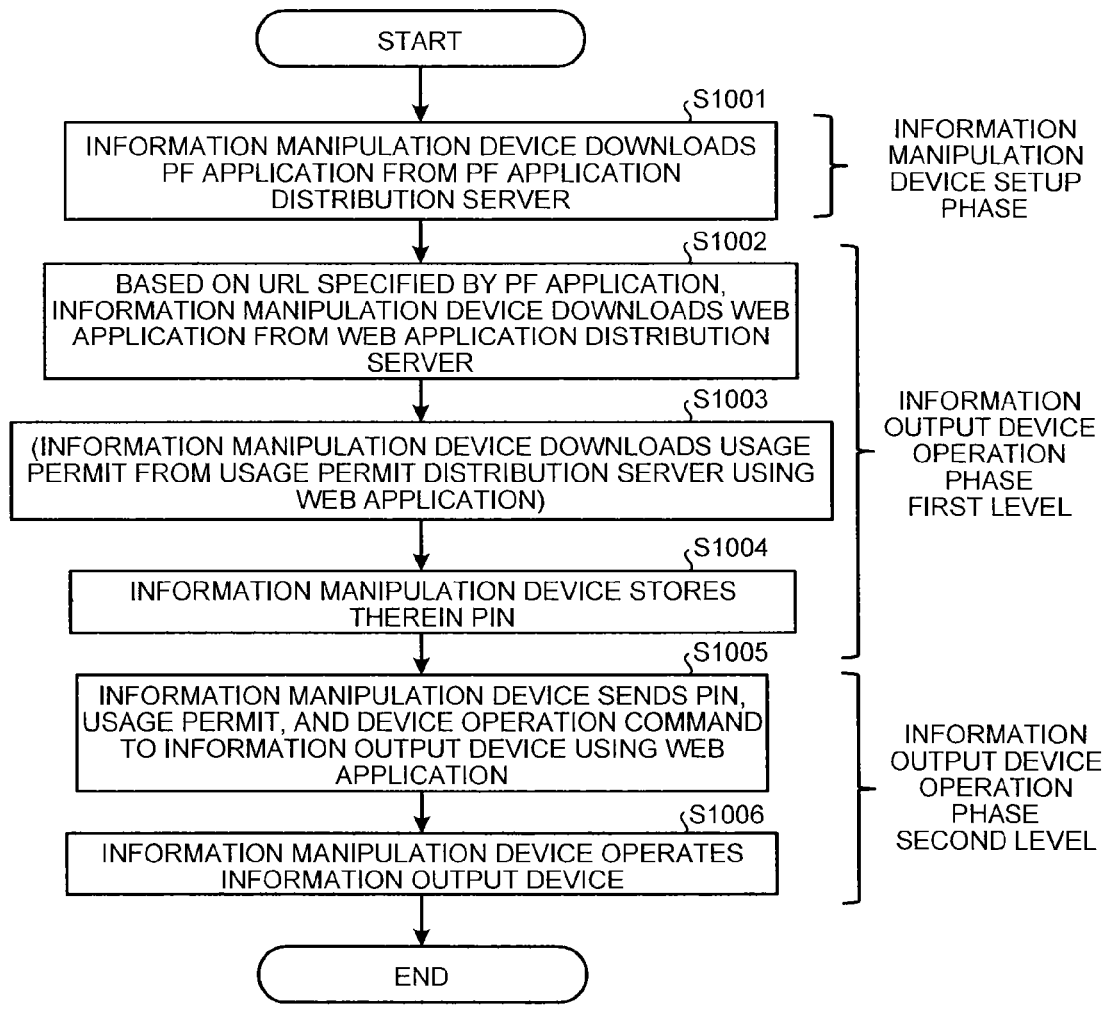
FIG. 31 is a flowchart for explaining a sequence of operations performed by the information manipulation device, the information output device, the PF application distribution server, the Web application distribution server, and a usage permit distribution server according to the second embodiment.

FIG. 31 is a flowchart for explaining a sequence of operations performed by the information manipulation device 1, the information output device 2, the PF application distribution server 5, the Web application distribution server 4, and the usage permit distribution server 6. As illustrated in FIG. 31, the sequence of operations is broadly divided into two phases, namely, the information manipulation device setup phase and the information output device operation phase. During the information manipulation device setup phase, the information manipulation device 1 communicates with the PF application distribution server 5; downloads a PF application from the PF application distribution server 5; and installs therein that PF application (Step S1001).

The information output device operation phase is divided into two levels, namely, a first level and a second level. In the first level, the information manipulation device 1 communicates with the Web application distribution server 4 and downloads a Web application from the Web application distribution server 4 (Step S1002); downloads a usage permit from the usage permit distribution server 6 (Step S1003); and stores therein the PIN that is input from the input receiving unit 15. Meanwhile, the operation of downloading and executing the Web application performed by the information manipulation device 1 is triggered by the PF application installed during the information manipulation device setup phase.

In the second level, the information manipulation device 1 communicates with the information output device 2 and sends a device operation command for the purpose of controlling the information output device 2 (Step S1005 and Step S1006).

Figure 32:
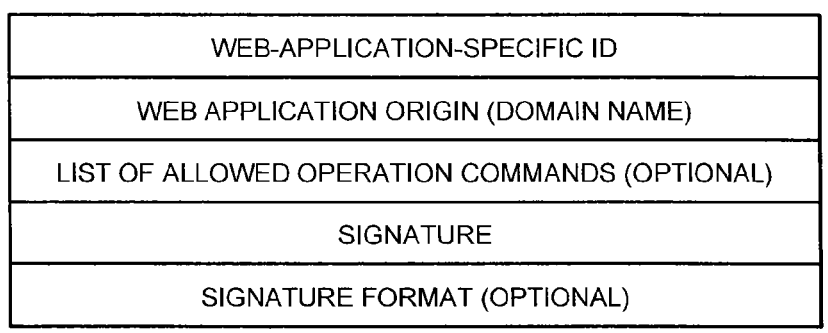
FIG. 32 is a diagram illustrating an exemplary format of a usage permit according to the second embodiment.

FIG. 32 is a diagram illustrating an exemplary format of the usage permit. Herein, the usage permit is downloaded from the usage permit distribution server 6 in the information manipulation device 1. At the time of sending a device operation command to the information output device 2, the information manipulation device 1 also sends the usage permit to the information output device 2. A usage permit includes a Web-application-specific ID 91, a Web application origin (domain name) 92, a list 95 of allowed operation commands, a signature 93, and a signature format 94 as mandatory fields. The Web-application-specific ID 91 represents an ID that is unique to the Web application. The Web application origin 92 represents the domain name of the source Web server of the Web application that sends a device operation command to the information output device 2 (i.e., the source Web server of the Web application #3). The list 95 of allowed operation commands represents a list of operation commands that are allowed to be used by a Web application which attempts to operate the information output device 2 according to an operation command using the usage permit. In the list 95 of allowed operation commands, it is possible either to list the operation commands individually or to divide a plurality of operation commands into categories. In the latter case, for example, a channel changing command and a contents list display command are put into a first category, while a contents deletion command is put into a second category. Moreover, the list 95 of allowed operation commands can include a category number of the category to be allowed to be used by the Web application. Then, the command determining unit 50 verifies whether or not the category, to which belongs the device operation command sent from the information manipulation device 1, is included in the list 95 of allowed operation commands. Only when the category is included in the list 95 of allowed operation commands, the device operation command can be allowed to be executed.

Furthermore, the categories can be treated as levels having priority, and the list 95 of allowed operation commands can be set to include the highest priority number to be allowed to be used by the Web application. If the second category is specified in the list 95 of allowed operation commands, then it can be defined that the device operation commands included in the first category and the second category are allowed to be used. The command determining unit 50 compares the category, to which belongs the device operation command sent from the information manipulation device 1, with the category number specified in the list 95 of allowed operation commands. If the category to which belongs the device operation command is smaller than the category number specified in the list 95 of allowed operation commands, then the device operation command is allowed to be executed. For example, if the second category is specified in the list 95 of allowed operation commands and if the device operation command sent by the information manipulation device 1 is a channel changing command; then that channel changing command is allowed to be executed because it belongs to the first category. In contrast, if the first category is specified in the list 95 of allowed operation commands and if the device operation command sent by the information manipulation device 1 is a contents deletion command; then that contents deletion command is not allowed to be executed because it belongs to the second category that is higher than the first category specified in the list 95 of allowed operation commands.

In this way, the usable device operation commands for each Web application are separated using the usage permit. For example, assume that the Web application X is allowed to execute a channel changing command and a contents list display command, while the Web application Y is allowed to execute only a channel changing command. Thus, the list of allowed operation commands specified in the usage permit for the Web application X is different than the list of allowed operation commands specified in the usage permit for the Web application Y.

The signature 93 is signature calculated in the following manner. A hash value is calculated with respect to the Web-application-specific ID, the Web application domain name, and the list 95 of allowed operation commands; and a secret key is used with respect to the hash value to calculate the signature 93 according to the public key cryptosystem. As far as the hash algorithm is concerned, it is possible to implement a well-known method such as MD5 or SHA1. Moreover, as far as the signature generation algorithm is concerned, it is possible to implement a well-known method such as RSA or elliptic curve cryptography. An exemplary method of calculating a signature is explained below.

signature=rsa(secret key, sha1(Web-application-specific ID||Web application domain name||list of allowed operation commands))

Herein, the secret key points to a key included in a usage permit generating unit 79; and a public key corresponding to the secret key is stored in advance in a public key managing unit 38 of the information output device 2. Meanwhile, as optional information, it is possible to append the signature format 94 which indicates the hash/signature algorithm used in generating the signature 93.

Figure 33:
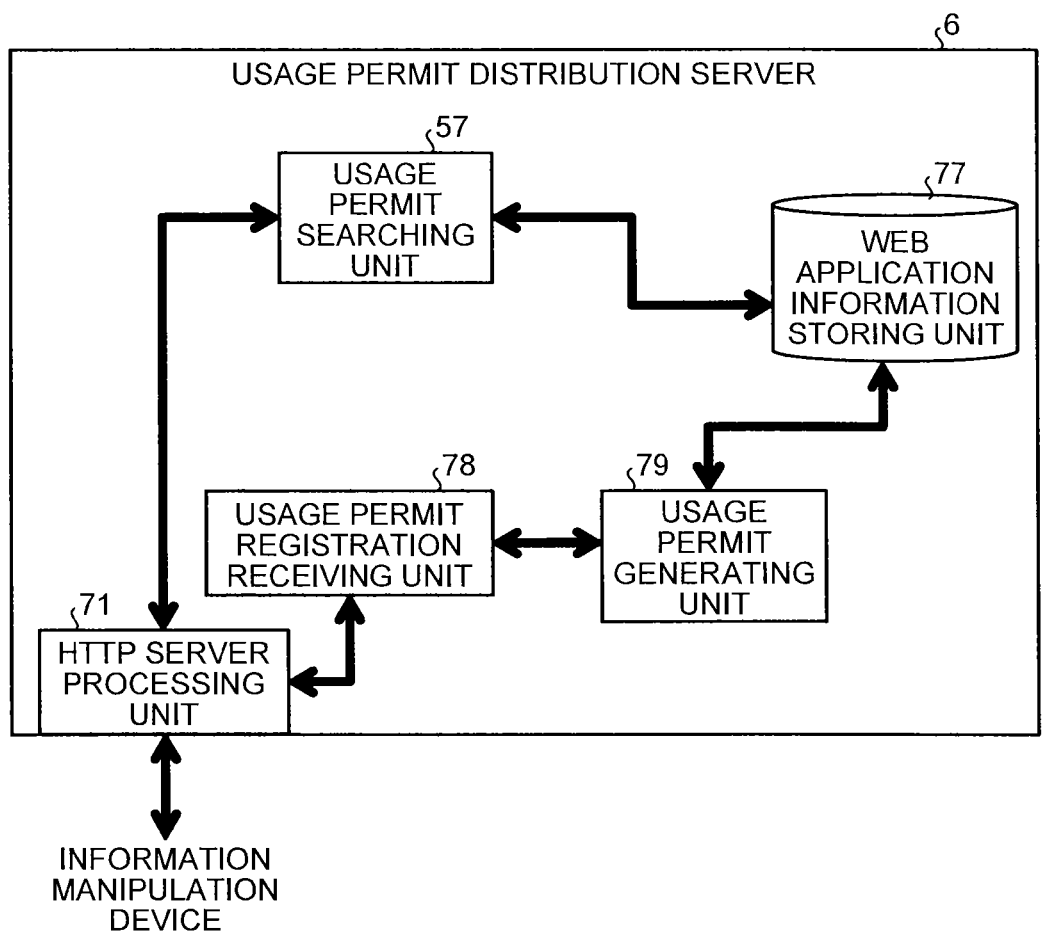
FIG. 33 is a block diagram illustrating an internal configuration of the usage permit distribution server according to the second embodiment.

FIG. 33 is a block diagram illustrating an internal configuration of the usage permit distribution server 6. Herein, the usage permit distribution server 6 communicates with the information manipulation device 1 and the information output device 2 using the HTTP protocol or the HTTPS protocol, and distributes usage permits to the information manipulation device 1. The usage permit distribution server 6 illustrated in FIG. 33 includes an HTTP server processing unit 71, a Web application information storing unit 77, a usage permit registration receiving unit 78, the usage permit generating unit 79, and a usage permit searching unit 57.

The HTTP server processing unit 71 communicates with the information manipulation device 1 using the HTTP protocol or the HTTPS protocol; and performs operations such as HTTP client processing, TCP/IP processing, link layer processing/physical layer processing that are required in issuing a usage permit acquisition request or distributing a usage permit. The Web application information storing unit 77 stores the usage permits that have been signed. The usage permit registration receiving unit 78 registers the usage permits. In FIG. 33 is illustrated a configuration in which a usage permit is registered via the HTTP server processing unit 71 and via a network. However, it is not always necessary to register the usage permits via a network. Alternatively, the Web applications can be registered via an external memory such as a USB memory. However, it is not mandatory to dispose the usage permit registration receiving unit 78.

The usage permit generating unit 79 performs a signature with respect to a Web-application-specific ID, a Web application domain name, and a list of allowed application commands using a secret key, and generates a signed usage permit. Herein, the explanation is given for a case in which a signature is performed when the usage permit distribution server generates a usage permit. However, as long as a device possesses a secret key corresponding to the public key that is common to the information output device 2, that device can generate a usage permit. For that reason, a usage permit need not always be generated in the usage permit distribution server 6. Thus, a usage permit can be generated in a device (not illustrated) that possesses a secret key corresponding to the public key that is common to the information output device 2, and the usage permit can be registered in the Web application information storing unit 77. In the case when the signature of the usage permit is not calculated in the usage permit distribution server 6, it is not mandatory to dispose the usage permit generating unit 79. In that case, the usage permit registration receiving unit 78 receives a signed usage permit and stores it without modification in the Web application information storing unit 77.

The usage permit searching unit 57 searches for the signed usage permit in the Web application information storing unit 77 in response to a request from the information manipulation device 1; and sends the signed usage permit to the information manipulation device 1 using the HTTP server processing unit 76. As a concrete example of the operations, the information manipulation device 1 specifies a Web-application-specific ID. Then, the usage permit searching unit 57 uses the Web-application-specific ID as a key to obtain the usage permit stored in the Web application information storing unit 77, and sends the usage permit to the information manipulation device 1.

Figure 34:
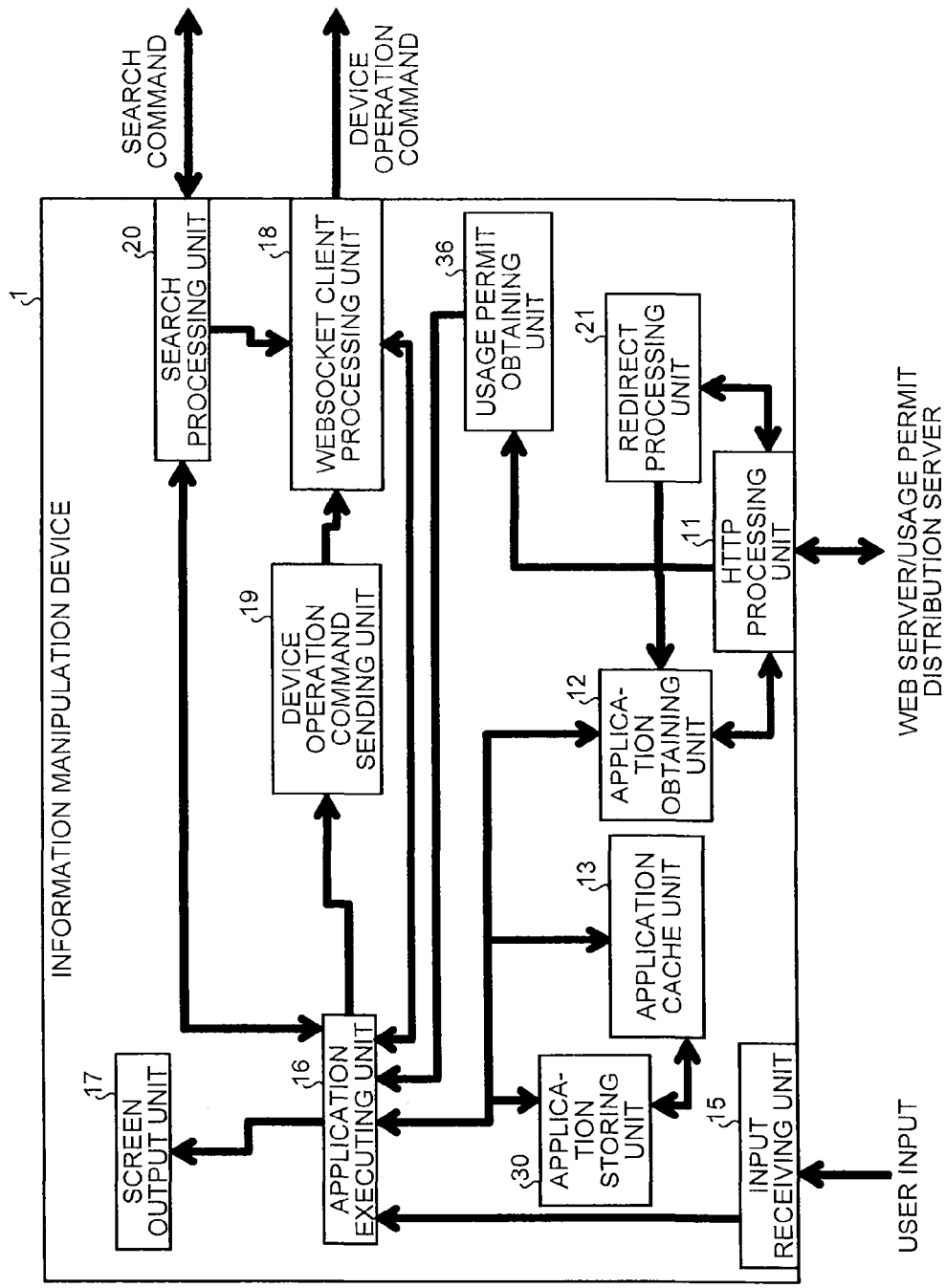
FIG. 34 is a block diagram illustrating an internal configuration of the information manipulation device according to the second embodiment.

FIG. 34 is a block diagram illustrating an internal configuration of the information manipulation device 1 according to the second embodiment. As compared to the configuration illustrated in FIG. 2, the configuration illustrated in FIG. 34 differs in the way that a usage permit obtaining unit 36 is disposed. In response to a request from the Web application running in the application executing unit 16, the usage permit obtaining unit 36 obtains a usage permit from the usage permit distribution server 6 using the HTTP processing unit 11.

Figure 35:
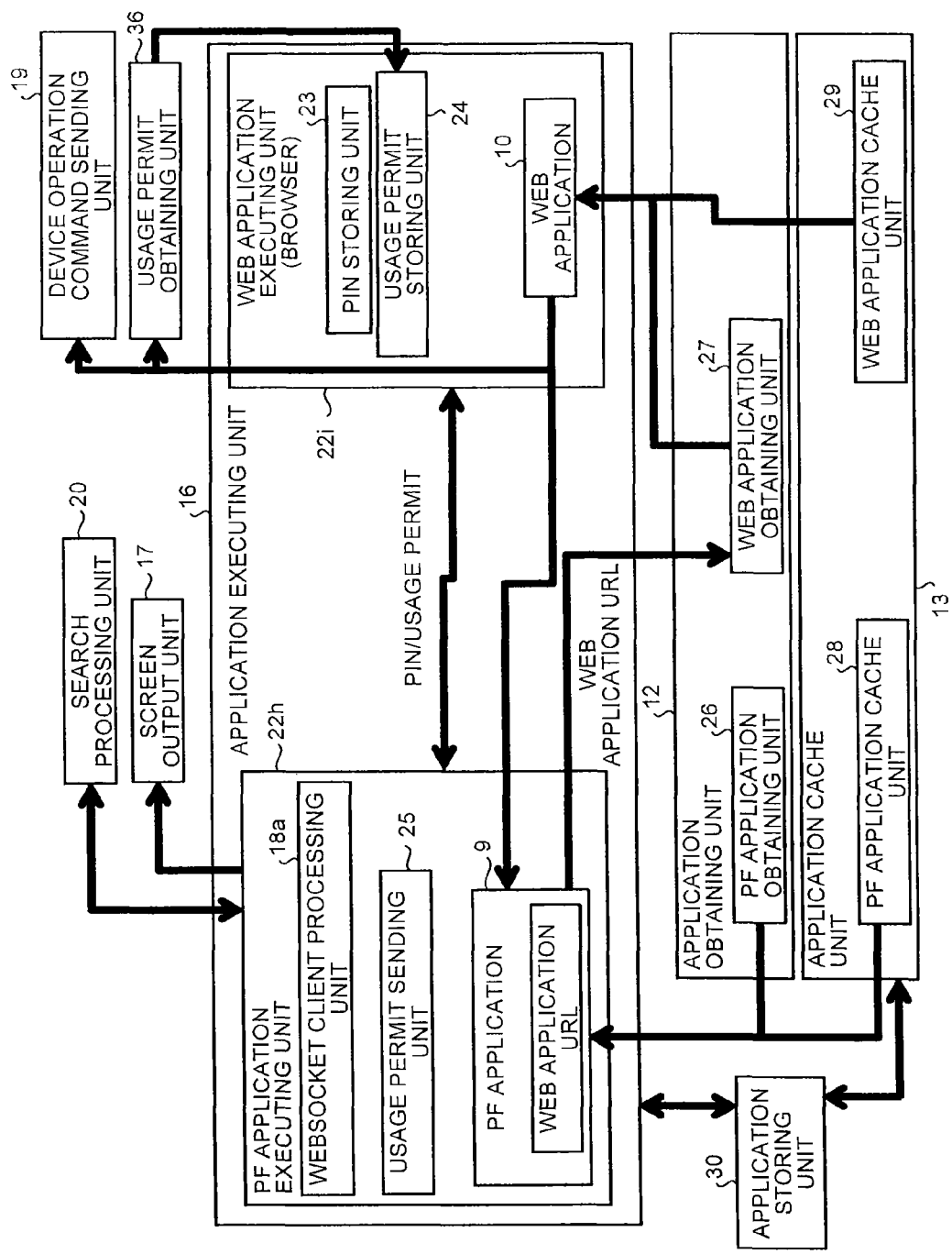
FIG. 35 is a block diagram of the application executing unit, the application obtaining unit, and the application cache unit according to the second embodiment.

FIG. 35 is a block diagram illustrating an exemplary internal configuration of the application executing unit 16, the application obtaining unit 12, and the application cache unit 13 of the information manipulation device 1 according to the second embodiment. As compared to the configuration illustrated in FIG. 3A, the configuration illustrated in FIG. 35 differs in the way that a WEB application executing unit 22*i* newly includes a usage permit storing unit 24, while a PF application executing unit 22*h* newly includes a usage permit sending unit 25. The usage permit storing unit 24 stores the usage permit, which is obtained by the usage permit obtaining unit 36 from the usage permit distribution server 6, in the application storing unit 30. The usage permit sending unit 25 sends the usage permit, which is stored in the usage permit storing unit 24, to the information output device 2 using the WebSocket client processing unit 18*a* in response to an instruction from a Web application.

Figure 36:
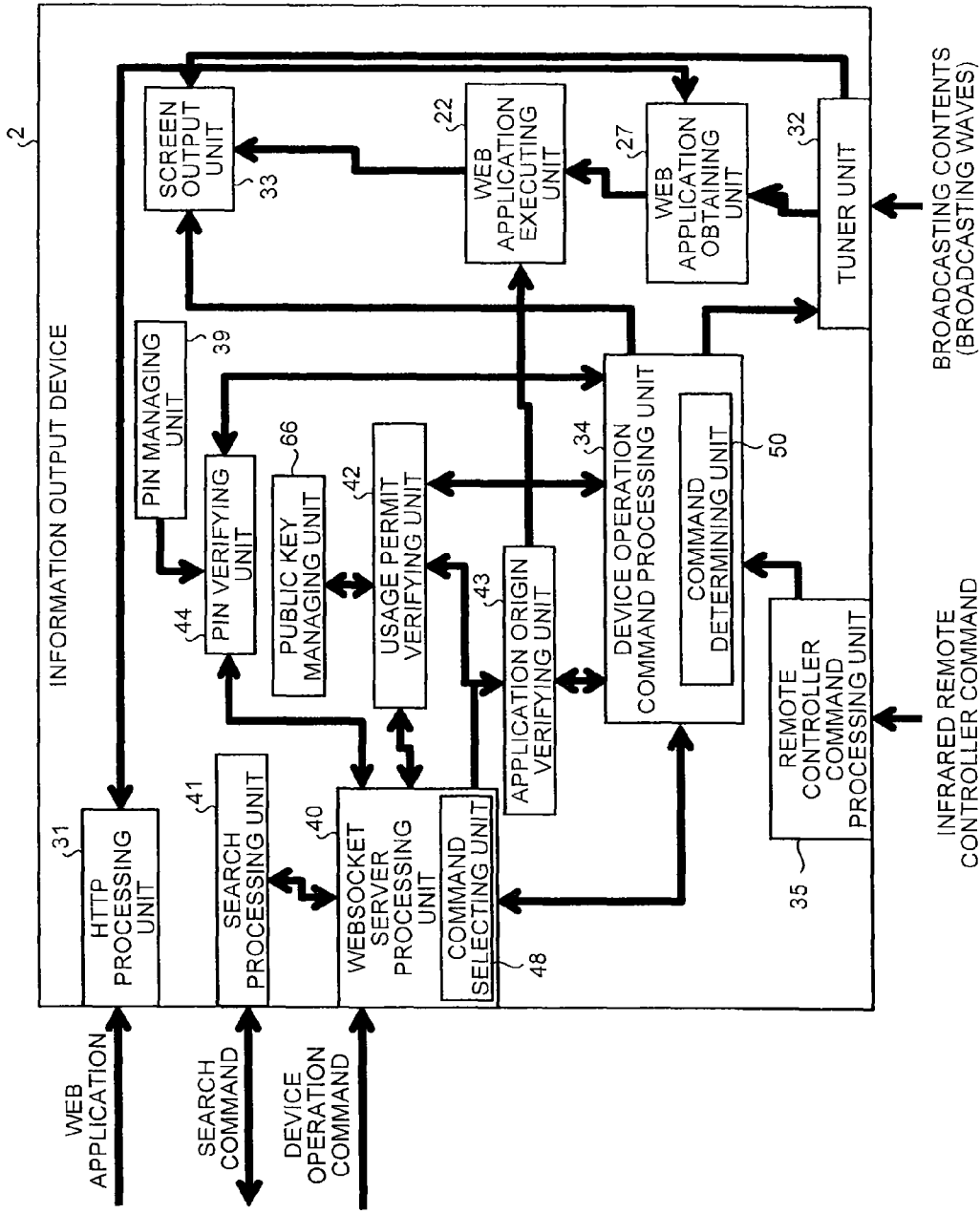
FIG. 36 is a block diagram illustrating an internal configuration of the information output device according to the second embodiment.

FIG. 36 is a block diagram illustrating in internal configuration of the information output device 2. As compared to the configuration illustrated in FIG. 4, the configuration illustrated in FIG. 36 differs in the way that the information output device 2 includes a usage permit verifying unit 42, a public key managing unit 66, and a command selecting unit 48. The usage permit verifying unit 42 verifies whether or not the usage permit sent from the information manipulation device 1 and received in the WebSocket server processing unit 40 is correct, and notifies the device operation command processing unit 34 about the verification result. The details of the verification performed by the usage permit verifying unit 42 are given later.

The public key managing unit 66 stores a public key that is used in verifying the usage permit that is sent from the information manipulation device 1. The command selecting unit 48 determines whether the device operation command sent from the information manipulation device 1 is an independent operation command or a broadcast related command, and instructs the command determining unit 50 to change the determination operation according to the type of the device operation command.

Figure 37:
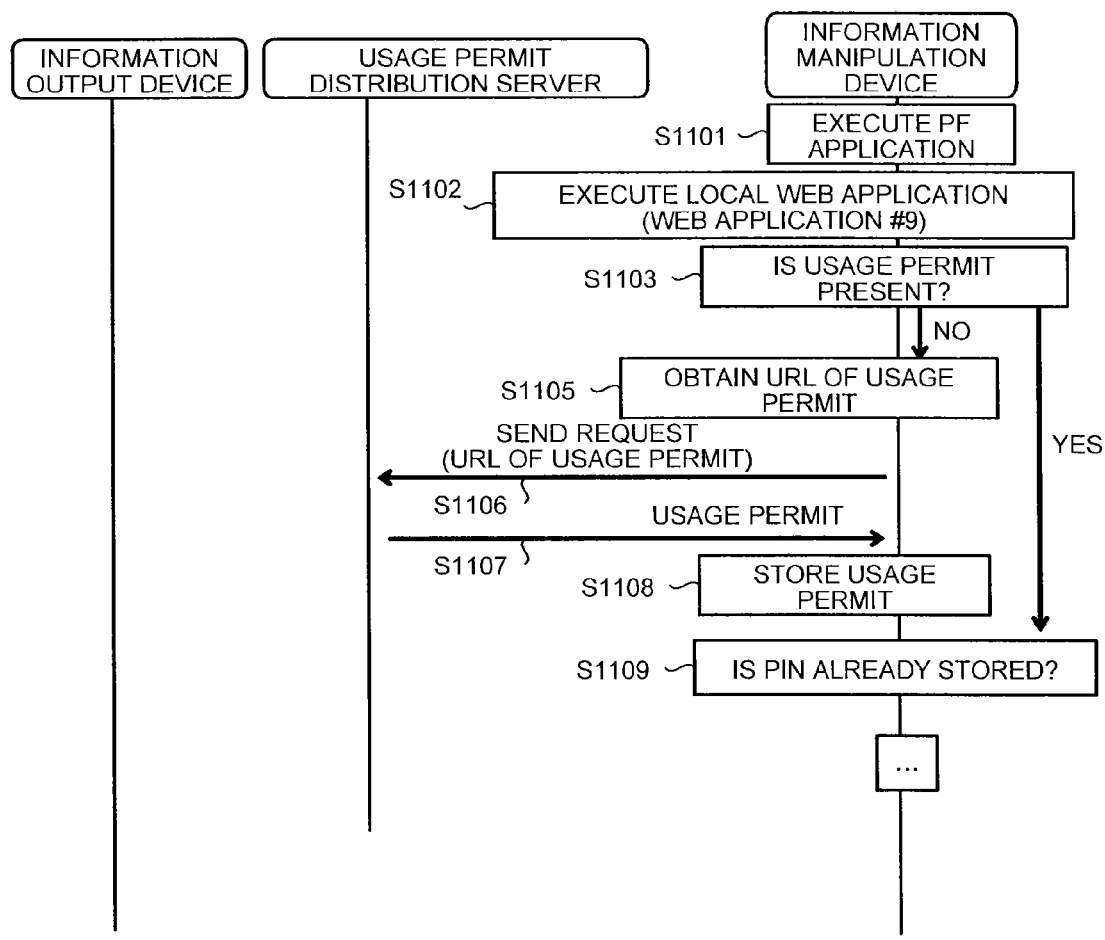
FIG. 37 is a sequence diagram illustrating a sequence of operations during the information output device operation phase (first level) according to the second embodiment.

FIG. 37 is a sequence diagram illustrating a sequence of operations performed by the information manipulation device 1 and the Web application distribution server 4 during the information output device operation phase (first level). Firstly, the information manipulation device 1 executes a PF application using the PF application executing unit 22*h* (Step S1101). Herein, the execution of a PF application is triggered when the PF application is selected using the input receiving unit 15. Once the PF application performs an initialization operation using the PF application initialization command 81, it executes the Web-application-executing-unit calling command 84. Then, the Web-application-executing-unit calling command 84 executes the local Web application (a Web application #9), which is specified by the Web application URL 83 and which is included in the PF application, using the WEB application executing unit 22*i* (Step S1102).

The local Web application (the Web application #9) checks whether or not a usage permit is present in the information manipulation device 1 (Step S1103). If a usage permit has already been obtained (Yes at Step S1103), then it is verified whether or not the PIN is stored (Step S1109). In the second embodiment, even if the information output device 2 that is to be operated is different, when the Web application are the same those Web application have the same usage permit. Hence, while distributing the PF application, it can be packaged to include the usage permit. In that case, at the time of installing the PF application, the usage permit is stored in the application storing unit 30 as part of the data of the PF application. In that case, the operation of verifying whether or not the usage permit is present can be skipped, and the Web application can obtain the usage permit from the application storing unit 30.

However, if no usage permit is present in the information manipulation device 1 (No at Step S1103), then the URL determined for each Web application and included in advance in the application package is obtained, and a usage permit acquisition request is sent to the usage permit distribution server 6 according to that URL (Step S1105 and Step S1106). This request is sent using the HTTP processing unit 11 and using the HTTP protocol (or the HTTPS protocol). An example of a usage permit request message, which is sent by the information manipulation device 1 to the usage permit distribution server 6, is given below.

https://example-CAserver.com/req_token.php?appID=X

In this example, with respect to a usage permit distribution server "example-CAserver.com"; a Web-application-specific ID is specified using a value "X" that is labeled by appID. Alternatively, the following format can also be used.

https://example-CAserver.com/appIDX/token.dat

In this case, the usage permit is nothing but just a file specified by the name "token.dat". For that reason, the usage permit distribution server 6 can have the same configuration as the configuration of the Web application distribution server 4. The usage permit distribution server 6 receives a usage permit request message; obtains the signed usage permit, which is stored in the Web application information storing unit 77, according to the Web-application-specific ID; and sends the usage permit to the information manipulation device 1 as a response to the usage permit request message (Step S1107). Then, the Web application #9 stores the received application in the usage permit storing unit 24 (Step S1108). Meanwhile, at the time of storing a PIN in the information manipulation device 1, a range of Web applications that can use the PIN is specified. Thus, when a Web application attempts to use the PIN, the PIN storing unit 23 is used to perform access control with respect to the stored PIN. However, while storing a usage permit, it is not always necessary to perform such operations. That is, there is no need to perform access restriction setting for usage permits; and a usage permit can be stored as a cookie or a normal file in the information manipulation device 1.

Subsequently, the Web application #9 verifies whether or not the PIN is stored in the information manipulation device 1 (Step S1109). The subsequent operation is identical to the operation performed at Step S304 illustrated in FIG. 12A.

Figure 38:
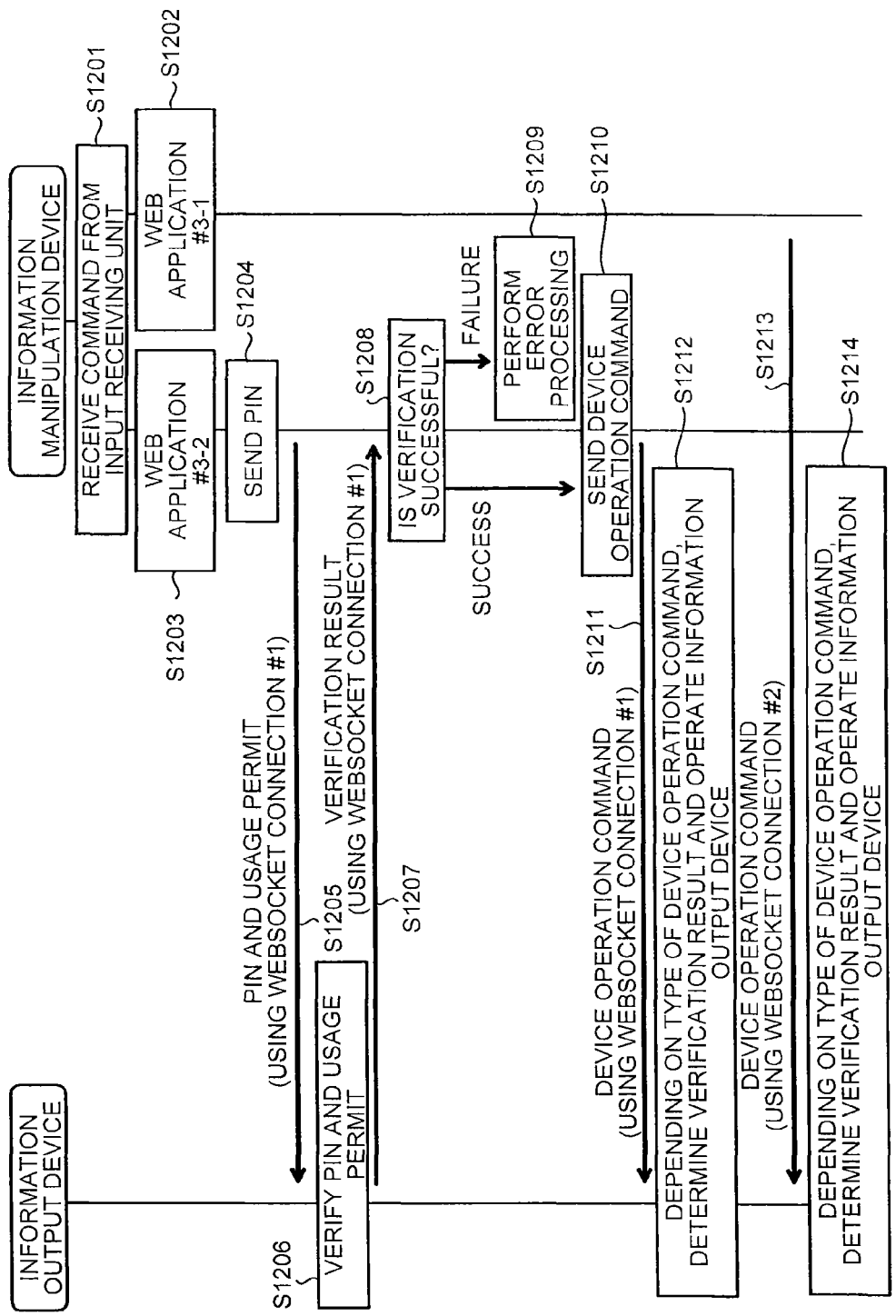
FIG. 38 is a sequence diagram illustrating a sequence of operations during the information output device operation phase (second level) according to the second embodiment.

FIG. 38 is a sequence diagram illustrating a sequence of operations performed by the information manipulation device 1 and the information output device 2 during the information output device operation phase (second level).

Herein, it is assumed that the user has performed a device operation from the screen interface illustrated in FIG. 30. Firstly, the input receiving unit 15 determines from the user input that the information output device 2 is operated by operating the lower portion in FIG. 30, that is, the portion of the Web application #3-2 (Step S1201). The Web application #3-2 sends the PIN, which is stored in the PIN storing unit 23, and the usage permit, which is stored in the usage permit storing unit, to the information output device 2 using a WebSocket connection (Steps S1203, S1204, and S1205). More particularly, based on an instruction from the Web application #3-2, the WebSocket client processing unit 18 of the information manipulation device 1 sends the PIN and the usage permit to the information output device 2 using a WebSocket connection (a WebSocket connection #1). At that time, the domain assigning unit 70 of the WebSocket client processing unit 18 of the information manipulation device 1 assigns, to the WebSocket header, the domain name of the Web application being executed by the WEB application executing unit 22$i$. Thus, while the PIN and the usage permit is sent from the information manipulation device 1 to the information output device 2, the domain name of the Web application being executed by the WEB application executing unit 22$i$ (i.e., the Web application #3-2) is included in the header of the WebSocket connection used to send the PIN and the usage permit. If the domain name of the Web application (i.e., the origin of the Web application) included in the usage permit matches with the domain name included in the header of the WebSocket connection, or if the domain name of the Web application included in the header of the WebSocket connection is included in the domain name of the Web application (i.e., the origin of the Web application) included in the usage permit; then the information output device 2 determines that the verification is successful.

Then, the information output device 2 verifies the received usage permit and the received PIN value (Step S1206). Herein, the usage permit verifying unit 42 verifies the usage permit and determines whether or not the signature included in the usage permit is correct. The PIN verifying unit 44 verifies the PIN and determines whether or not the PIN value is identical to the value managed by the PIN managing unit 39. Only if the domain verification, the usage permit verification, as well as the PIN verification is successful, then the information manipulation device 1 determines that the verification is successful. On the other hand, if any one of the verifications fails, then the information manipulation device 1 determines that the verification is not successful. Then, the information output device 2 can send the determination result to the information manipulation device 1. If the determination result indicates a failure in the verification, then the information output device 2 can disconnect the WebSocket connection (Step S1207).

Once the determination result is sent to the information manipulation device 1 from the information output device 2, the information manipulation device 1 refers to the determination result (Step S1208). If the determination result indicates a failure in the verification, then the information manipulation device 1 performs error processing (Step S1209). On the other hand, if the determination result indicates a success in the verification, then the information manipulation device 1 sends a device operation command (Step S1210).

Meanwhile, if the information output device 2 determines that the verification was not successful and disconnects the WebSocket connection, then the information manipulation device 1 understands from the disconnection of the WebSocket connection that the verification was not successful and performs error processing. In contrast, if the WebSocket connection is not disconnected, then the information manipulation device 1 can send a device operation command.

Then, according to an instruction from the Web application for device operations (the Web application #3-2), the WebSocket client processing unit 18 of the information manipulation device 1 sends a device operation command to the information output device 2 using a WebSocket connection (Step S1211). The device operation command is generated by the Web application #3-2. That is, the device operation command is an independent operation command. The command selecting unit 48 of the information output device 2 determines whether the received device operation command is a broadcast related command or an independent operation command (Step S1212). Herein, since the device operation command is an independent operation command generated by the Web application #3-2, the command determining unit 50 is instructed to confirm whether or not the verification of the usage permit as well as the verification of the PIN is successful and to receive the device operation command (the independent operation command) only if the verification is successful. If either the verification of the usage permit or the verification of the PIN is not successful, then the device operation command (the independent operation command) is rejected and error processing is performed. Thus, no subsequent device operation command (independent operation command) is received. Only when the verification of the usage permit as well as the verification of the PIN is successful, the device operation commands (the independent operation commands) included in the operation command list are interpreted and the device operation command processing unit 34 is notified about which device operation commands (independent operation commands) are allowed to be executed.

Meanwhile, assume that the information output device 2 is operated by operating the upper portion in FIG. 30, that is, the portion of the Web application #3-1 (Step S1202). At that time, according to an instruction from the Web application #3-1, the WebSocket client processing unit 18 of the information manipulation device 1 sends a device operation command to the information output device 2 using a WebSocket connection (a WebSocket connection #2) (Step S1213). Moreover, the domain assigning unit 70 of the WebSocket client processing unit 18 of the information manipulation device 1 assigns, to the header of the WebSocket connection, the domain name of the Web application being executed by the WEB application executing unit 22$i$. Thus, while the device operation command is sent from the information manipulation device 1 to the information output device 2, the domain name of the Web application being executed by the WEB application executing unit 22$i$ (i.e., the Web application #3-1) is included in the header of the WebSocket connection used to send the device operation command. Herein, the device operation command is generated in the Web application #3-1. That is, the device operation command is a broadcast related command.

The command selecting unit 48 of the information output device 2 determines whether the received device operation command is a broadcast related command or an independent operation command (Step S1214). Herein, since the device operation command is a broadcast related command generated by the Web application #3-1, the command determining unit 50 is instructed to verify using the application origin verifying unit 43 whether the domain name (the origin information) of the Web application #3-1 included in the WebSocket header of the device operation command matches with the domain name of the Web application being executed by the WEB application executing unit 22 (of the information output device 2), that is, matches with the domain name of the Web server that distributed the Web application being executed by the WEB application executing unit 22; and to receive the device operation command (the broadcast related command) only if the domain name verification is successful. If the domain name verification is not successful, then the device operation command (the broadcast related command) is rejected and error processing is performed. Thus, no subsequent device operation command (broadcast related command) is received. Only when the domain name verification is successful, the device operation commands (the broadcast related commands) included in the operation command list are interpreted and the device operation command processing unit 34 is notified about which device operation commands (broadcast related commands) are allowed to be executed.

Herein, the explanation is given for an example in which, when the device operation command is a broadcast related command, the authentication of the Web application #3-1 using the PIN is not performed. As illustrated in FIG. 15, it is possible to verify the PIN as well as the origin (i.e., verification of whether the domain name (the origin information) of the Web application #3-1 matches with the domain name of Web application being executed by the WEB application executing unit 22 (of the information output device 2)). In that case, the command selecting unit 48 instructs the command determining unit 50 to verify using the application origin verifying unit 43 whether the domain name (the origin information) of the Web application #3-1 included in the WebSocket header of the device operation command matches with the domain name of the Web application being executed by the WEB application executing unit 22 (of the information output device 2); to verify using the PIN verifying unit 44 whether the PIN value sent by the Web application #3 is identical to the value stored by the PIN managing unit; and to receive the device operation command (the broadcast related command) only if both verifications are successful. If either one of the verifications is not successful, then the device operation command (the broadcast related command) is rejected and error processing is performed. Thus, no subsequent device operation command (broadcast related command) is received. Only when both verifications are successful, the device operation commands (the broadcast related commands) included in the operation command list are interpreted and the device operation command processing unit 34 is notified about which device operation commands (broadcast related commands) are allowed to be executed.

In this way, in the second embodiment, while receiving a device operation command sent by the information manipulation device 1; the information output device 2 determines the type of the received command and, depending on the type of the received command, changes the method of confirming the validness of the Web application. If the device operation command is an independent operation command; the validness of the Web application that sent the independent operation command is determined using the PIN and the usage permit. On the other hand, if the device operation command is a broadcast related command, whether or not the Web application that sent the broadcast related command is authorized is determined by verifying whether the domain name of the WebSocket matches with the domain name of the Web application being executed by the WEB application executing unit 22 (of the information output device 2).

With that, it becomes possible to achieve the following effect. In the case when a device operation command is an independent operation command, it is assumed that the Web application that issued the independent operation command (in the example illustrated in FIG. 30, the Web application #3-2) represents the manufacturer of the information output device 2 or a partner company. Thus, the manufacturer of the information output device 2 gets to know from the Web application developer about the domain name of the Web application distribution server that places the Web application, and issues a usage permit containing the information about that domain name to the Web application developer. As a result, it becomes possible to restrict the Web applications that can operate the information output device 2.

Consider a case when the portion having the command for sending a device operation command to the information output device 2 (for example, a command included in the Web application #3-2) written therein is copied by an attacker and is uploaded as Web contents X to a Web server X that is different than the Web server for distributing legitimate Web applications. As described above, since Web applications are configured using the HTML or JavaScript (registered trademark), they are no different than the Web contents such as Web sites displayed on a Web browser of a personal computer (PC). Thus, while browsing various Web sites using the Web browser (the Web application executing unit 22*i*) in the information manipulation device 1; if the Web contents X are run, a device operation command gets sent to the information output device 2 without noticing knowledge of the user of the information manipulation device 1. As a result, when there are no restrictions; if a device operation command is issued for the purpose of deleting all broadcasting contents recorded in the information output device 2, then mere browsing of the Web contents X in the information manipulation device 1 results in the deletion of the recorded contents from the information output device 2 without noticing of the user of the information manipulation device 1. In that regard, even if an unauthorized Web application such as the Web contents X is installed in a Web server that is outside of the control of the Web application distribution server 4; since the information output device 2 checks the domain name of the Web servers that distributed the Web applications, it becomes possible to reject the device operation commands received from such unauthorized Web applications.

Moreover, the operations of the information output device 2 can be restricted only to the Web applications allowed by the user. Herein, the information output device 2 is assumed to be a digital TV; and the information output device 2 according to the second embodiment is possessed by a household or an individual. There is no problem when the information output device 2 of a user A is operated by a legitimate Web application running in the information manipulation device 1 of the user A (for example, the Web application #3-2). However, it is necessary to prevent a situation in which the information output device 2 of a user B is operated without the permission of the user B by a legitimate Web application running in the information manipulation device 1 of the user A. Every time a device operation command is sent from the information manipulation device 1; although it is possible to impose a confirmation operation using the infrared remote controller of the information output device 2 for confirming whether or not the device operation command is allowed to be executed, it is a cumbersome operation. In that regard, if a PIN is set for the information output device 2 and, prior to receiving a device operation command, if it is confirmed whether the PIN sent from the Web application matches with the PIN that has been set; it becomes possible to prevent a situation in which the information output device 2 gets operated without permission by a Web application that does not know the PIN value of the information output device 2.

Meanwhile, if a device operation command is a broadcast related command, the Web application that is allowed to execute the broadcast related command (in the example illustrated in FIG. 30, the Web application #3-1) is an application allowed by the broadcasting station. However, for the manufacturer of the information output device 2, such a fact is difficult to know in advance. Hence, a scheme can be implemented in which it is confirmed that the domain name of the Web application distribution server 4, which places the Web application for handling broadcast related commands, matches with the domain name of the Web application running in the information output device 2. With that, it becomes possible to confirm the validness of the Web application that handles the broadcast related commands.

Consider the case when the portion having the command for sending a device operation command to the information output device 2 (for example, a command included in the Web application #3-2) written therein is copied by an attacker and is uploaded as the Web contents X to the Web server X that is different than the Web server for distributing legitimate Web applications. If no mechanism of protection is put in place; then, regarding a broadcast related command, it becomes possible to, for example, obtain all program related information from the broadcasting waves without the permission of the broadcasting station. The use of such program related information may sometimes amount to the infringement of copyright. In that regard, even if unauthorized Web applications such as the Web contents X are placed in a Web server that is outside of the control of the Web application distribution server 4, the information output device 2 can check the domain name of the Web server that distributed the Web applications and can reject device operation commands (program-related-information acquisition commands) from such unauthorized Web applications.

In this way, while reliably preventing a situation in which the information output device 2 such as a TV is operated without the permission of the user, it becomes possible to operate the information output device 2 from the information manipulation device 1 such as a smartphone or a tablet. Hence, not only the information manipulation device 1 can be utilized in an effective manner but also enhancement in the user-friendliness of the information output device 2 can be achieved.

Figure 40:
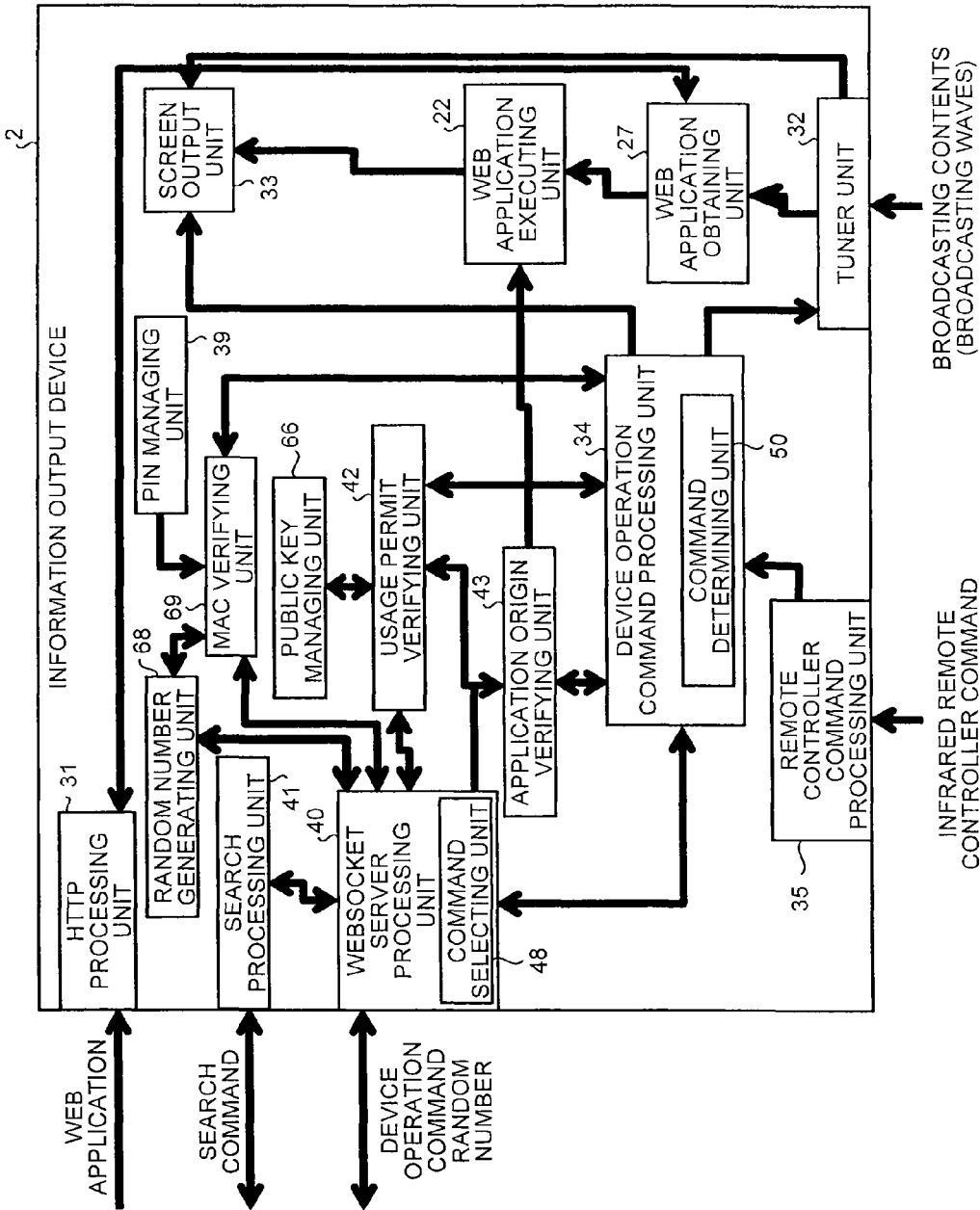
FIG. 40 is a block diagram of the information output device according to a modification example of the second embodiment.
Figure 41:
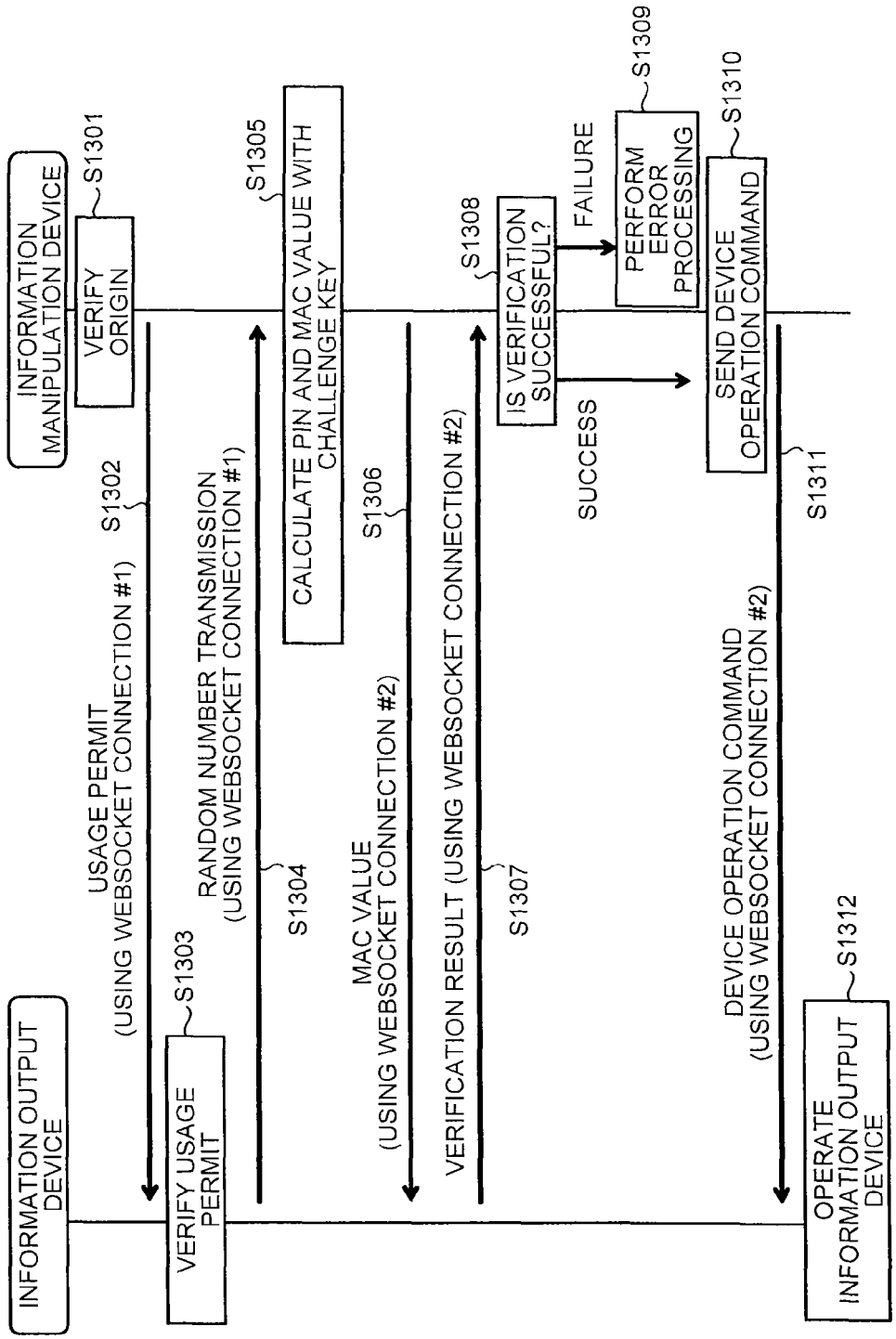
FIG. 41 is a sequence diagram for illustrating a sequence of operations in the case when a MAC value is used to send a PIN instead of sending the PIN as plaintext.

In the examples illustrated in FIGS. 35 to 38, the information manipulation device 1 sends the PIN to the information output device 2 without modifying the PIN value. However, instead of sending the PIN without modification, it is also possible to send the PIN in an encrypted form. The configuration for that case is illustrated in FIGS. 39 to 41.

Figure 39:
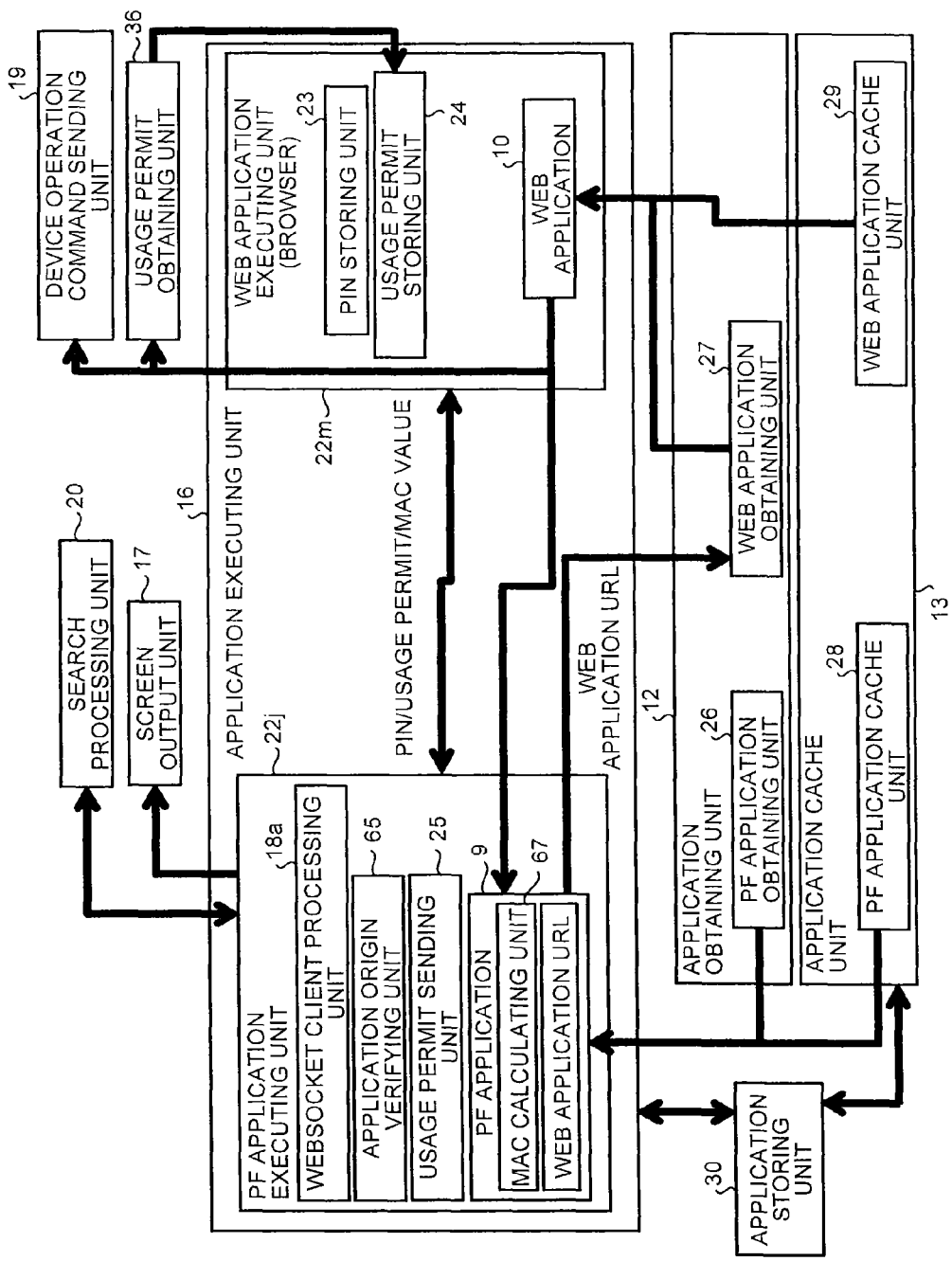
FIG. 39 is a block diagram of the application executing unit, an application obtaining unit, and the application cache unit according to a modification example of the second embodiment.

FIG. 39 is a block diagram illustrating an exemplary internal configuration of the application executing unit 16, an application obtaining unit 12, and the application cache unit 13 of the information manipulation device 1. As compared to the configuration illustrated in FIG. 35, the configuration illustrated in FIG. 39 differs in the way that a PF application executing unit 22*j* includes a MAC calculating unit 67 and an application origin verifying unit 65. The MAC calculating unit 67 internally possesses a secret key (MAC key); and calculates a message authentication code from a random number (random number), which is received by the WebSocket client processing unit 18*a* of the PF application executing unit 22*j* as a response to sending the usage permit to the information output device 2, using the calculating formula given below. Herein, as the algorithm for generating the message authentication code, it is possible to use a well-known algorithm such as HMAC-MD5 or HMAC-SHA1.

MAC value=HMAC-SHA1(MAC key, PIN∥received random number)

Herein, the PIN points to the PIN value stored in the PIN storing unit 23. The application origin verifying unit 65 verifies whether the usage permit stored in the usage permit storing unit 24 matches with the domain name of the Web application being executed by a WEB application executing unit 22*m* of the information manipulation device 1.

FIG. 40 is a block diagram illustrating an internal configuration of the information output device 2 according to this modification example of the second embodiment. As compared to the configuration illustrated in FIG. 36, the configuration illustrated in FIG. 40 differs in the way that the information output device 2 includes a MAC verifying unit 69 and a random number generating unit 68. The MAC verifying unit 69 internally possesses a secret key (MAC key). Moreover, the MAC verifying unit 69 generates a message authentication code according to the formula given below using the MAC key and the PIN value stored by the PIN managing unit 39, and verifies whether the message authentication code is identical to the MAC value (a second MAC value) sent by the information manipulation device 1. Herein, it is assumed that, unless there is any alteration in the PF application executing unit 22*j*, the MAC key possessed by the MAC verifying unit 69 is identical to the MAC key possessed by the PF application executing unit 22*j* of the information manipulation device 1.

MAC value(first MAC value)=HMAC-SHA1(MAC key, PIN∥sent random number)

The random number generating unit 68 (a random number sending unit) receives the usage permit from the information manipulation device 1; generates a random number when the verification of the usage permit is successful; and sends the random number to the information manipulation device 1. This random number is temporarily stored in the information manipulation device 1 until either a MAC value is received or the WebSocket connection is disconnected.

FIG. 41 is a sequence diagram for illustrating a sequence of operations performed by the information manipulation device 1 and the information output device 2 in the case when a MAC value is used to send the PIN instead of sending the PIN as plaintext. Up to the operation of obtaining the PIN and the usage permit stored by the Web application #3-2 and receiving a command from the input receiving unit 15, the sequence of operations is identical to the sequence illustrated in FIG. 38. Then, firstly, the application origin verifying unit 65 of the information manipulation device 1 obtains the domain name (the origin information) of the Web application that is being executed by the WEB application executing unit 22*m* and that issued a request to send the usage permit; and verifies whether that domain name matches with the domain name included in the usage permit (Step S1301). If the domain names do not match, then the subsequent operations are not performed. Meanwhile, this domain matching verification operation is optional in nature.

Then, the Web application #3-2 requests the PF application 9, which is executed by the PF application executing unit 22*j*, to send the usage permit (Step S1302). In response, the PF application 9 sends the usage permit to the information output device 2 using the WebSocket connection #1. More particularly, according to an instruction from the PF application 9, the WebSocket client processing unit 18a of the information manipulation device 1 establishes a WebSocket connection (the WebSocket connection #1) and sends the usage permit to the information output device 2. Then, the information output device 2 performs signature verification to verify whether or not the signature of the usage permit is correct (Step S1303). If signature verification is not successful, then the subsequent operations are not performs and the information output device 2 can reject the receipt of the device operation commands or can disconnect the WebSocket connect. On the other hand, if signature verification is successful, the information output device 2 generates a random number using the random number generating unit and sends the random number to the information manipulation device 1 using the WebSocket connection #1 (Step S1304).

In the information manipulation device 1, when the WebSocket client processing unit 18a receives the random number; the MAC calculating unit 67 of the PF application executing unit 22j calculates a MAC value using the received random number, using the MAC key stored therein, and using the PIN stored in the PIN storing unit 23 (Step S1305). Then, the MAC calculating unit 67 notifies the Web application #3-2 about the calculation result. The Web application #3-2 sends the MAC value to the information output device 2 via the device operation command sending unit 19 using the WebSocket connection #2 (Step S1307). More particularly, according to an instruction from the Web application #3-2, the WebSocket client processing unit 18 of the information manipulation device 1 establishes a WebSocket connection (the WebSocket connection #2) and sends the MAC value to the information output device 2.

In the information output device 2, the MAC verifying unit 69 calculates a MAC value using the MAC key stored therein, using the PIN value stored in the PIN managing unit, and using the random number generated by the random number generating unit 68; determines whether the calculated MAC value is identical to the MAC value received from the information manipulation device 1; and notifies the information manipulation device 1 about the determination result (Step S1307). If the MAC values are not identical, then the information output device 2 either rejects the receipt of the subsequent device operation commands sent from the information manipulation device 1 or disconnects the WebSocket connection.

In case the determination result from the information output device 2 indicates a failure (failure at Step S1308), the information manipulation device 1 performs error processing (Step S1309). On the other hand, if the determination result from the information output device 2 indicates a success (success at Step S1308), then the Web application being executed by the WEB application executing unit 22m sends a device operation command using the WebSocket connection #2 (Step S1310). More particularly, according to an instruction from the Web application #3, the WebSocket client processing unit 18 of the information manipulation device 1 sends a device operation command to the information output device 2 using a WebSocket connection (the WebSocket connection #2) (Step S1311). Then, the information output device 2 performs device operations according to the received device operation command (Step S1312).

With such a configuration, instead of sending the PIN as plaintext from the information manipulation device 1 to the information output device 2, a MAC value is calculated by encrypting the PIN with the use of a secret key shared by the information manipulation device 1 and the information output device 2; and the MAC value is sent from the information manipulation device 1 to the information output device 2. For that reason, even if an unauthorized device is present in between the information manipulation device 1 and the information output device 2, the PIN is not delivered to the unauthorized device thereby enabling protection of the PIN of the user.

Moreover, even if an unauthorized Web application is running in the information manipulation device 1 and attempts to perform authentication with the information output device 2; the information manipulation device 1 verifies the origin information of the Web application running therein before issuing a usage permit. Hence, it becomes possible to prevent a situation from occurring in which the unauthorized Web application sends an unauthorized device operation command to the information output device 2.

With reference to FIG. 36, the application origin verifying unit 43 verifies whether the domain name (the origin information) of the Web application included in the WebSocket header of a device operation command matches with the domain name of the Web application being executed by the WEB application executing unit 22 (of the information output device 2). Alternatively, it can be verified whether the domain name (the origin information) of the Web application included in the WebSocket header of a device operation command is specified in a domain list included in the broadcasting waves.

Figure 42:
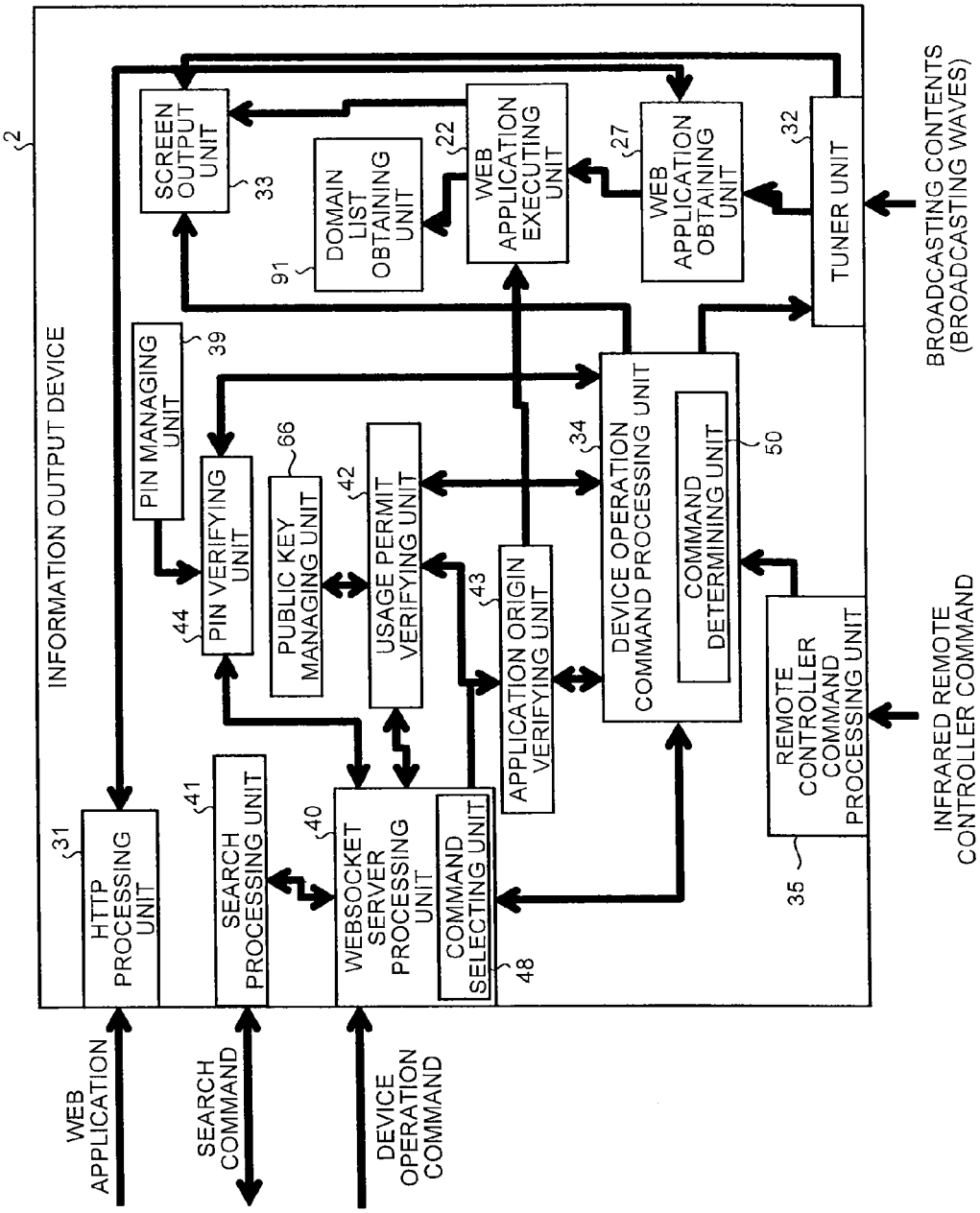
FIG. 42 is a block diagram illustrating an internal configuration of the information output device according to a modification example of the second embodiment.

A configuration for that case is illustrated in FIGS. 42 and 43. FIG. 42 is a block diagram illustrating an internal configuration of the information output device 2. As compared to the configuration illustrated in FIG. 36, the configuration illustrated in FIG. 42 differs in the way that the information output device 2 includes a domain list obtaining unit 91, which extracts a domain list included in the broadcasting waves and manages that domain list.

FIG. 43 is a diagram illustrating an exemplary format of the domain list. Either the domain list is included in the broadcasting waves and is downloaded in the information output device 2; or the URL of the domain list is included in a Web application that is included in the broadcasting waves, and, when the Web application is executed by the WEB application executing unit 22, the Web application downloads the domain list from a domain list distribution server (not illustrated) located on the Internet.

The domain list contains the Web application origin (domain name) 92 as a mandatory field. Besides, the domain list contains a list of allowed operation commands, a period of validity, a signature, and a signature format as the optional fields. Herein, the list of allowed operation commands, the signature, and the signature format are identical to the contents of the usage permit illustrated in FIG. 32. The period of validity indicates the period for which the domain list remains valid. As described earlier, the broadcast programs (the broadcasting contents) change according to the time. Depending on that, there is a change in whether or not to allow the device operation command sent by a particular Web application from among the Web applications running in the WEB application executing unit 22m of the information manipulation device 1, as well as there is a change in the Web application allowed to operate the information output device 2. Thus, the period of validity indicates the time slot from which the domain list is valid up to the time slot till which the domain list is valid.

With reference to FIG. 38, as part of verifying the origin, the application origin verifying unit 43 verifies whether the domain name (the origin information) of the Web application included in the WebSocket header of a device operation command matches with the domain name of the Web application being executed by the WEB application executing unit 22 (of the information output device 2). In contrast, with reference to FIG. 42, the application origin verifying unit 43 verifies whether the domain name (the origin information) of the Web application included in the WebSocket header of a device operation command is specified in the domain list stored by the domain list obtaining unit 91. If the domain name is specified in the domain list, then the verification is determined to be successful.

As described earlier, either the domain list is included in the broadcasting waves, or the domain list is obtained by a Web application included in the broadcasting waves. Hence, the broadcasting station that produces the broadcasting contents can create the domain list. In that case, naturally, the origin information of the Web applications executed by the WEB application executing unit 22 of the information output device 2 need not be the same as the domains included in the domain list. Thus, the Web applications to be executed in the information manipulation device 1 and the Web applications running in the information output device 2 can be distributed from servers having different domains. As a result, it becomes possible to reduce the application development cost regardless of the locations of the Web applications. Moreover, since the domain list can be changed according to the time slots or the broadcast programs, it becomes possible to dynamically specify the Web application for sending a device operation command.

Meanwhile, at least some portion of each constituent element of the information manipulation device 1, the information output device 2, the Web application distribution server 4, the PF application distribution server 5, and the usage permit distribution server 6 described above in the embodiments can be configured either using hardware or using software. In a configuration done using software, computer programs implementing at least some functions of the devices/servers can be stored in a recording medium such as a floppy (registered trademark) disk or a compact disk read only memory (CD-ROM), as a computer program product. Then, a computer can be instructed to read and execute those computer programs. Herein, the recording medium is not limited to portable recording medium such as a magnetic disk or an optical disk, and can also be a fixed mount type recording medium such as a hard disk device or a memory.

Alternatively, the computer programs that implement at least some functions of the information manipulation device 1, the information output device 2, the Web application distribution server 4, the PF application distribution server 5, and the usage permit distribution server 6 can be distributed via a communication line (including wireless communication) such as the Internet. Moreover, the computer programs can be encrypted, modulated, and compressed before either being distributed via a wired line or a wireless line, such as the Internet 8, or being stored in a recording medium and distributed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information output device, comprising: a processor including,
    device operation command receiving circuitry configured to receive a device operation command via a first network interface by which the information output device is connected to an information manipulation device;
    origin information receiving circuitry configured to receive first origin information of a first application that sends the device operation command, via the first network interface, the first application being executed in the information manipulation device;
    tuner circuitry configured to perform a decoding process of a broadcast program and program related information from broadcasting waves that are received;
    private code managing circuitry configured to store a private code on a device-by-device basis;
    private code verifying circuitry configured to obtain the private code from the information manipulation device, and verify whether the obtained private code matches with the private code stored in the private code managing circuitry;
    application executing circuitry configured to execute a second application;
    application origin verifying circuitry configured to determine whether the first origin information that has been received matches with second origin information of the second application; and
    device operation command processing circuitry configured to allow execution of the device operation command when the application origin verifying circuitry verifies that the first origin information and the second origin information match and when the private code verifying circuitry verifies that the private codes match, and execute the device operation command when the execution is allowed, wherein
    the device operation command includes either a broadcast related command for performing a predetermined operation related to a broadcast program received by the information output device from broadcasting waves or an independent operation command, being independent of the broadcasting waves, for operating the information output device,
    the processor further comprises command selecting circuitry configured to determine whether the device operation command sent from the information manipulation device is the broadcast related command or the independent operation command,
    when the device operation command is the broadcast related command, the command selecting circuitry verifies the broadcast related command based on the first origin information and the second origin information, and
    when the device operation command is the independent operation command, the command selecting circuitry verifies the independent operation command based on the private code, the first origin information and the second origin information.

2. The device according to claim 1, wherein
    the information output device is further connected to an application distribution server by a second network interface, and the second application is obtained from the application distribution server via the second network interface, the application distribution server being identified from an URL included in the program related information.

3. The device according to claim 1, wherein
the information output device is further connected to an application distribution server by a second network interface, and
the second application is obtained from the application distribution server via the second network interface, the application distribution server being identified from an URL included in the broadcast program.

4. The device according to claim 1, wherein the first network interface is connected by a WebSocket connection.

5. The device according to claim 2, wherein the second network interface is connected by TCP/IP.

6. The device according to claim 4, wherein the private code and the device operation command are obtained using different WebSocket connections.

7. The device according to claim 1, wherein the processor further comprises:
random number sending circuitry configured to generate a random number and send the random number to the information manipulation device; and
message authentication code verifying circuitry configured to
calculate a first message authentication code value using the random number, using the private code, and a message authentication code key,
receive a second message authentication code value from the information manipulation device, and
verify whether the first message authentication code value and the second message authentication code value are identical.

8. The device according to claim 1, wherein the processor further comprises:
WEB application executing circuitry configured to execute a WEB application which is capable of sending an application transition command for performing transition of a state of the first application; and
WebSocket processing circuitry configured to send the application transition command to the information manipulation device, the WebSocket processing circuitry being connected to the information manipulation device using a WebSocket connection.

9. The device according to claim 1, wherein the first origin information and the second origin information includes a domain name of an application distribution server from which the first application and the second application are downloaded and obtained.

10. The device according to claim 1, wherein
the device operation command processing circuitry is configured to
allow execution of the device operation command when the device operation command is determined to be the broadcast related command, when the application origin verifying circuitry verifies that the first origin information and the second origin information match, and when the private code verifying circuitry verifies that the private codes match, and
execute the device operation command when the execution is allowed.

11. The device according to claim 1, wherein
the device operation command processing circuitry is configured to allow execution of the device operation command when the device operation command is determined to be the independent operation command, when the application origin verifying circuitry verifies that the first origin information and the second origin information match, and when the private code verifying circuitry verifies that the private codes match, and
execute the device operation command when the execution is allowed.

12. The information manipulation device comprising:
another processor including,
Web application executing circuitry configured to execute a Web application that sends the device operation command to the information output device according to claim 1; and
device command sending circuitry configured to send origin information of the Web application and a private code set in advance with respect to the information output device to the information output device along with the device operation command.

13. A computer program product comprising a non-transitory computer-readable medium containing a program executed by a computer associated with an information output device, the program causing the computer to execute:
receiving a device operation command via a first network interface by which the computer is connected to an information manipulation device;
receiving first origin information of a first application that sends the device operation command, via the first network interface, the first application being executed in the information manipulation device;
performing a decoding process of a broadcast program and program related information from broadcasting waves that are received;
obtaining a private code from an information manipulation device, the private code being stored in a private code managing unit on a device-by-device basis;
verifying whether the obtained private code matches with the private code stored in the private code managing unit;
executing a second application;
determining whether first origin information of the first application that sends the device operation command and that is included in the device operation command matches with second origin information of the second application;
allowing execution of the device operation command when the first origin information and the second origin information match and when the private codes match; and
executing the device operation command when the execution is allowed, wherein
the device operation command includes either a broadcast related command for performing a predetermined operation related to a broadcast program received by the information output device from broadcasting waves or an independent operation command, being independent of the broadcasting waves, for operating the information output device,
the program causes the computer to further execute:
determining whether the device operation command sent from the information manipulation device is the broadcast related command or the independent operation command,
when the device operation command is the broadcast related command, the determining includes verifying the broadcast related command based on the first origin information and the second origin information, and when the device operation command is the independent operation command, the determining includes verifying the independent operation command based on the private code, the first origin information and the second origin information.

14. The computer program product according to claim 13, wherein
the computer is further connected to an application distribution server by a second network interface, and
the second application is obtained from the application distribution server via the second network interface, the application distribution server being identified from an URL included in the program related information.

15. The computer program product according to claim 13, wherein
the computer is further connected to an application distribution server by a second network interface, and
the second application is obtained from the application distribution server via the second network interface, the application distribution server being identified from an URL included in the broadcast program.

16. The computer program product according to claim 13, wherein the first network interface is connected by a WebSocket connection.

17. The computer program product according to claim 14, wherein the second network interface is connected by TCP/IP.

18. The computer program product according to claim 16, wherein the private code and the device operation command are obtained using different WebSocket connections.

19. The computer program product according to claim 13, wherein the first origin information and the second origin information includes a domain name of an application distribution server from which the first application and the second application are downloaded and obtained.

20. Another computer program product comprising another non-transitory computer-readable medium containing another program executed by another computer, the another program causing the another computer to execute:
executing a Web application that sends the device operation command to the computer associated with the information output device according to claim 13; and
sending origin information of the Web application and a private code set in advance with respect to the information output device to the information output device along with the device operation command.

* * * * *